(12) United States Patent
Tinkham et al.

(10) Patent No.: US 12,502,174 B2
(45) Date of Patent: Dec. 23, 2025

(54) SYSTEMS, DEVICES, AND METHODS FOR FORMING ANASTOMOSES

(71) Applicant: G.I. Windows, Inc., Westwood, MA (US)

(72) Inventors: Brian P. Tinkham, Scituate, MA (US); Shani Mann, Needham, MA (US)

(73) Assignee: G.I. Windows, Inc., Westwood, MA (US)

( * ) Notice: Subject to any disclaimer, the term of this patent is extended or adjusted under 35 U.S.C. 154(b) by 143 days.

(21) Appl. No.: 18/384,635

(22) Filed: Oct. 27, 2023

(65) Prior Publication Data

US 2024/0148381 A1     May 9, 2024

Related U.S. Application Data

(63) Continuation of application No. PCT/US2022/025370, filed on Apr. 19, 2022.

(60) Provisional application No. 63/191,146, filed on May 20, 2021.

(51) Int. Cl.
*A61B 17/11*     (2006.01)
*A61B 17/00*     (2006.01)

(52) U.S. Cl.
CPC ........ *A61B 17/11* (2013.01); *A61B 17/00234* (2013.01); *A61B 2017/00367* (2013.01); *A61B 2017/00876* (2013.01); *A61B 2017/00982* (2013.01)

(58) Field of Classification Search
CPC .............. A61B 17/11; A61B 17/00234; A61B 2017/00367; A61B 2017/00876; A61B 2017/00982
See application file for complete search history.

(56) References Cited

U.S. PATENT DOCUMENTS

| | | | |
|---|---|---|---|
| 4,197,840 | A | 4/1980 | Beck et al. |
| 4,538,130 | A | 8/1985 | Gluckstern et al. |
| 5,300,910 | A | 4/1994 | Unkelbach et al. |
| 5,320,629 | A | 6/1994 | Noda et al. |
| 5,381,784 | A | 1/1995 | Adair |
| 5,431,670 | A | 7/1995 | Holmes |
| 5,595,562 | A | 1/1997 | Grier |
| 5,690,656 | A | 11/1997 | Cope et al. |
| 6,129,668 | A | 10/2000 | Haynor et al. |
| 6,132,458 | A | 10/2000 | Staehle et al. |
| 6,190,303 | B1 | 2/2001 | Glenn et al. |
| 6,273,895 | B1 | 8/2001 | Pinchuk et al. |

(Continued)

FOREIGN PATENT DOCUMENTS

| | | |
|---|---|---|
| CN | 105011985 A | 11/2015 |
| CN | 205379345 U | 7/2016 |

(Continued)

OTHER PUBLICATIONS

European Extended Supplementary Search Report for Patent Application No. 22805143 dated May 27, 2025 (16 pages).

(Continued)

*Primary Examiner* — Phong Son H Dang
(74) *Attorney, Agent, or Firm* — Nutter McClennen & Fish LLP

(57) ABSTRACT

The invention provides systems, devices, and methods for the delivery, deployment, and positioning of magnetic compression devices at a desired site so as to improve the accuracy of anastomoses creation between tissues, organs, or the like.

24 Claims, 71 Drawing Sheets

(56) References Cited

U.S. PATENT DOCUMENTS

| | | |
|---|---|---|
| 6,352,543 B1 | 3/2002 | Cole |
| 6,371,964 B1 | 4/2002 | Vargas et al. |
| 6,478,210 B2 | 11/2002 | Adams et al. |
| 6,537,284 B1 | 3/2003 | Inoue |
| 6,632,229 B1 | 10/2003 | Yamanouchi et al. |
| 6,652,540 B1 | 11/2003 | Cole et al. |
| 6,699,263 B2 | 3/2004 | Cope |
| 6,719,768 B1 | 4/2004 | Cole et al. |
| 6,802,847 B1 | 10/2004 | Carson et al. |
| 6,827,718 B2 | 12/2004 | Hutchins et al. |
| 6,932,827 B2 | 8/2005 | Cole |
| 7,282,057 B2 | 10/2007 | Surti et al. |
| 7,618,427 B2 | 11/2009 | Oritz et al. |
| 7,641,638 B2 | 1/2010 | Waxman et al. |
| 7,760,059 B2 | 7/2010 | Higuchi |
| 7,909,837 B2 | 3/2011 | Crews et al. |
| 8,043,290 B2 | 10/2011 | Harrison et al. |
| 8,118,821 B2 | 2/2012 | Mouw |
| 8,142,454 B2 | 3/2012 | Harrison et al. |
| 8,262,680 B2 | 9/2012 | Swain et al. |
| 8,439,915 B2 | 5/2013 | Harrison et al. |
| 8,506,516 B2 | 8/2013 | Kassab et al. |
| 8,518,062 B2 | 8/2013 | Cole et al. |
| 8,556,919 B2 | 10/2013 | Aguirre et al. |
| 8,603,121 B2 | 12/2013 | Surti et al. |
| 8,623,036 B2 | 1/2014 | Harrison et al. |
| 8,679,139 B2 | 3/2014 | Aguirre et al. |
| 8,685,046 B2 | 4/2014 | Viola |
| 8,728,105 B2 | 5/2014 | Aguirre |
| 8,794,243 B2 | 8/2014 | Deem et al. |
| 8,828,031 B2 | 9/2014 | Fox et al. |
| 8,828,032 B2 | 9/2014 | McWeeney et al. |
| 8,845,663 B2 | 9/2014 | Chmura |
| 8,864,781 B2 | 10/2014 | Surti et al. |
| 8,870,899 B2 | 10/2014 | Beisel et al. |
| 8,915,915 B2 | 12/2014 | Harrison et al. |
| 9,168,041 B2 | 10/2015 | Zaritsky et al. |
| 9,226,753 B2 | 1/2016 | Surti et al. |
| 9,320,524 B2 | 4/2016 | Gagner et al. |
| 9,421,015 B2 | 8/2016 | Gagner et al. |
| 9,456,820 B2 | 10/2016 | Gagner et al. |
| 9,492,173 B2 | 11/2016 | McWeeney et al. |
| 9,539,010 B2 | 1/2017 | Gagner et al. |
| 9,763,664 B2 | 9/2017 | Beisel et al. |
| 9,801,635 B2 | 10/2017 | Gagner et al. |
| 9,877,724 B2 | 1/2018 | Gagner et al. |
| 9,943,335 B2 | 4/2018 | Gittard et al. |
| 10,039,550 B2 | 8/2018 | Altman |
| 10,159,487 B2 | 12/2018 | Gagner et al. |
| 10,182,821 B2 | 1/2019 | Lukin et al. |
| 10,285,703 B2 | 5/2019 | Viola |
| 10,342,544 B2 | 7/2019 | Bakos et al. |
| 10,376,400 B2 | 8/2019 | McGuckin, Jr. |
| 10,448,954 B2 | 10/2019 | McWeeney et al. |
| 10,517,600 B2 | 12/2019 | Beisel et al. |
| 10,555,735 B2 | 2/2020 | Bakos et al. |
| 10,568,630 B2 | 2/2020 | Hernandez et al. |
| 10,595,869 B2 | 3/2020 | Beisel et al. |
| 10,624,643 B2 | 4/2020 | Hunt et al. |
| 10,624,644 B2 | 4/2020 | Bakos et al. |
| 10,631,865 B2 | 4/2020 | Bakos et al. |
| 10,667,817 B2 | 6/2020 | Gagner et al. |
| 10,682,143 B2 | 6/2020 | Hernandez et al. |
| 10,779,831 B2 | 9/2020 | Lukin et al. |
| 10,813,642 B2 | 10/2020 | Beisel et al. |
| 10,952,732 B2 | 3/2021 | Binmoeller et al. |
| 11,039,838 B2 | 6/2021 | Binmoeller et al. |
| 11,311,298 B2 | 4/2022 | Gagner et al. |
| 11,432,873 B2 | 9/2022 | Brown et al. |
| 2002/0055674 A1 | 5/2002 | Ben-Haim et al. |
| 2002/0143347 A1 | 10/2002 | Cole et al. |
| 2003/0149422 A1 | 8/2003 | Muller |
| 2003/0176767 A1 | 9/2003 | Long et al. |
| 2004/0034377 A1 | 2/2004 | Sharkawy et al. |
| 2004/0059280 A1 | 3/2004 | Makower et al. |
| 2005/0020958 A1 | 1/2005 | Paolini et al. |
| 2005/0080439 A1 | 4/2005 | Carson et al. |
| 2005/0256503 A1 | 11/2005 | Hall |
| 2005/0277966 A1 | 12/2005 | Ewers et al. |
| 2005/0283235 A1 | 12/2005 | Kugler et al. |
| 2006/0036267 A1 | 2/2006 | Saadat et al. |
| 2006/0271107 A1 | 11/2006 | Harrison et al. |
| 2006/0282106 A1 | 12/2006 | Cole et al. |
| 2007/0106312 A1 | 5/2007 | Vargas et al. |
| 2007/0276378 A1 | 11/2007 | Harrison et al. |
| 2008/0051626 A1 | 2/2008 | Sato et al. |
| 2008/0086192 A1 | 4/2008 | WasDyke et al. |
| 2008/0114384 A1 | 5/2008 | Chang et al. |
| 2008/0183272 A1 | 7/2008 | Wood et al. |
| 2008/0200933 A1 | 8/2008 | Bakos et al. |
| 2008/0200934 A1 | 8/2008 | Fox |
| 2008/0208105 A1 | 8/2008 | Zelickson et al. |
| 2008/0208224 A1 | 8/2008 | Surti et al. |
| 2008/0243225 A1 | 10/2008 | Satasiya et al. |
| 2008/0262523 A1 | 10/2008 | Makower et al. |
| 2009/0048618 A1 | 2/2009 | Harrison et al. |
| 2009/0062824 A1 | 3/2009 | Berg et al. |
| 2009/0125042 A1 | 5/2009 | Mouw |
| 2009/0227828 A1 | 9/2009 | Swain et al. |
| 2010/0010508 A1 | 1/2010 | Takahashi et al. |
| 2010/0010610 A1 | 1/2010 | Grevious |
| 2010/0036399 A1 | 2/2010 | Viola |
| 2010/0056861 A1 | 3/2010 | Spivey |
| 2010/0099947 A1 | 4/2010 | Sato et al. |
| 2010/0179510 A1 | 7/2010 | Fox et al. |
| 2011/0009886 A1 | 1/2011 | Gagner et al. |
| 2011/0098731 A1 | 4/2011 | Whitbrook et al. |
| 2011/0118765 A1 | 5/2011 | Aguirre |
| 2011/0144560 A1 | 6/2011 | Gagner et al. |
| 2011/0160751 A1 | 6/2011 | Granja Filho |
| 2011/0160752 A1 | 6/2011 | Aguirre |
| 2011/0295055 A1 | 12/2011 | Albrecht et al. |
| 2011/0295285 A1 | 12/2011 | Mcweeney et al. |
| 2012/0022572 A1 | 1/2012 | Braun et al. |
| 2012/0197062 A1 | 8/2012 | Requarth |
| 2012/0238796 A1 | 9/2012 | Conlon |
| 2012/0259350 A1 | 10/2012 | Gagner et al. |
| 2012/0330330 A1 | 12/2012 | Gagner et al. |
| 2013/0138126 A1 | 5/2013 | Gagner et al. |
| 2013/0150873 A1 | 6/2013 | Gagner et al. |
| 2013/0253548 A1 | 9/2013 | Harrison et al. |
| 2013/0253550 A1 | 9/2013 | Beisel et al. |
| 2013/0325042 A1 | 12/2013 | Fabian et al. |
| 2014/0005689 A1 | 1/2014 | Griffiths |
| 2014/0018824 A1 | 1/2014 | Julian et al. |
| 2014/0019468 A1 | 1/2014 | Federoff et al. |
| 2014/0066709 A1 | 3/2014 | Mirza et al. |
| 2014/0188246 A1 | 7/2014 | Aronson et al. |
| 2014/0194689 A1 | 7/2014 | Carrillo, Jr. et al. |
| 2014/0236064 A1 | 8/2014 | Binmoeller et al. |
| 2014/0243592 A1 | 8/2014 | Kato et al. |
| 2014/0277342 A1 | 9/2014 | Roeder et al. |
| 2014/0303657 A1 | 10/2014 | Kim et al. |
| 2014/0309669 A1 | 10/2014 | Fabian et al. |
| 2014/0309670 A1 | 10/2014 | Bakos et al. |
| 2014/0343583 A1 | 11/2014 | McWeeney et al. |
| 2014/0379065 A1 | 12/2014 | Johnson et al. |
| 2015/0057687 A1 | 2/2015 | Gittard et al. |
| 2015/0164508 A1 | 6/2015 | Hernandez et al. |
| 2015/0182224 A1 | 7/2015 | Altman |
| 2016/0022266 A1 | 1/2016 | Lukin et al. |
| 2016/0235442 A1 | 8/2016 | Palese et al. |
| 2016/0262761 A1 | 9/2016 | Beisel et al. |
| 2016/0287257 A1 | 10/2016 | Fabian et al. |
| 2016/0324523 A1 | 11/2016 | Lukin et al. |
| 2016/0367236 A1 | 12/2016 | Leeflang et al. |
| 2016/0374683 A1 | 12/2016 | Gagner et al. |
| 2017/0035425 A1 | 2/2017 | Fegelman et al. |
| 2017/0265866 A1 | 9/2017 | Ryou et al. |
| 2018/0028186 A1 | 2/2018 | Yamanouchi |
| 2018/0028187 A1 | 2/2018 | Gagner et al. |
| 2018/0193061 A1 | 7/2018 | Gittard et al. |
| 2018/0214149 A1 | 8/2018 | Hunt et al. |
| 2018/0214150 A1 | 8/2018 | Bakos et al. |

(56) References Cited

U.S. PATENT DOCUMENTS

| | | |
|---|---|---|
| 2018/0214152 A1 | 8/2018 | Bakos et al. |
| 2018/0263625 A1 | 9/2018 | Lukin et al. |
| 2018/0296218 A1 | 10/2018 | Binmoeller et al. |
| 2018/0361127 A1 | 12/2018 | Gray et al. |
| 2019/0133587 A1 | 5/2019 | Gagner et al. |
| 2019/0133678 A1 | 5/2019 | Pate et al. |
| 2019/0183507 A1 | 6/2019 | Baillargeon |
| 2019/0216460 A1 | 7/2019 | Kopelman |
| 2019/0261998 A1 | 8/2019 | Altman et al. |
| 2019/0274687 A1 | 9/2019 | Wang et al. |
| 2019/0328392 A1 | 10/2019 | Sharma |
| 2020/0008834 A1 | 1/2020 | Cauche et al. |
| 2020/0129283 A1 | 4/2020 | Swensgard et al. |
| 2020/0138438 A1 | 5/2020 | Harrison et al. |
| 2020/0170776 A1 | 6/2020 | Folan |
| 2020/0187947 A1 | 6/2020 | Hernandez et al. |
| 2020/0222049 A1 | 7/2020 | McWeeney et al. |
| 2020/0229968 A1 | 7/2020 | Galloway |
| 2020/0246009 A1 | 8/2020 | Gagner et al. |
| 2020/0323530 A1 | 10/2020 | Sharma |
| 2021/0100554 A1 | 4/2021 | Seddon et al. |
| 2021/0161532 A1 | 6/2021 | Beisel et al. |
| 2021/0169485 A1 | 6/2021 | Beisel et al. |
| 2021/0169486 A1 | 6/2021 | Gagner et al. |
| 2021/0244414 A1 | 8/2021 | Lukin et al. |
| 2022/0087678 A1 | 3/2022 | Gagner et al. |
| 2022/0104956 A1 | 4/2022 | Pham et al. |
| 2022/0257252 A1 | 8/2022 | Todd et al. |
| 2023/0165585 A1 | 6/2023 | McWeeney et al. |
| 2023/0172608 A1 | 6/2023 | Lukin et al. |
| 2023/0190269 A1 | 6/2023 | Tinkham et al. |
| 2023/0255624 A1 | 8/2023 | Wallace et al. |
| 2023/0389923 A1 | 12/2023 | Tinkham et al. |
| 2023/0389924 A1 | 12/2023 | Seddon et al. |
| 2024/0041460 A1 | 2/2024 | Seddon |
| 2024/0041461 A1 | 2/2024 | Tinkham et al. |
| 2024/0065694 A1 | 2/2024 | Seddon |
| 2024/0074751 A1 | 3/2024 | Tinkham et al. |
| 2024/0074755 A1 | 3/2024 | Mann et al. |
| 2024/0074759 A1 | 3/2024 | Sugar et al. |

FOREIGN PATENT DOCUMENTS

| | | |
|---|---|---|
| DE | 3011742 A1 | 10/1981 |
| EP | 1894514 A2 | 3/2008 |
| EP | 1493391 B1 | 12/2009 |
| EP | 2207488 B1 | 9/2012 |
| EP | 2538852 A1 | 1/2013 |
| EP | 3267905 A1 | 1/2018 |
| EP | 2260752 B1 | 3/2018 |
| EP | 3573542 A1 | 12/2019 |
| EP | 3487418 A4 | 4/2020 |
| EP | 4115949 A1 | 1/2023 |
| JP | 2003530916 A | 10/2003 |
| JP | 2006271832 A | 10/2006 |
| JP | 2008508939 A | 3/2008 |
| JP | 2011500159 A | 1/2011 |
| JP | 2015139592 A | 8/2015 |
| JP | 2017/521223 A | 8/2017 |
| JP | 202198077 A | 7/2021 |
| KR | 20150102567 A | 9/2015 |
| RU | 2018266 C1 | 8/1994 |
| SU | 1708313 A1 | 1/1992 |
| SU | 1725851 A1 | 4/1992 |
| WO | 01/087398 A2 | 11/2001 |
| WO | 01/93920 A2 | 12/2001 |
| WO | 2009048954 A1 | 4/2009 |
| WO | 2011085006 A2 | 7/2011 |
| WO | 2011/103400 A1 | 8/2011 |
| WO | 2013009886 A1 | 1/2013 |
| WO | 2013/176993 A1 | 11/2013 |
| WO | 2014055193 A1 | 4/2014 |
| WO | 2016082481 A1 | 6/2016 |
| WO | 2016/145414 A1 | 9/2016 |
| WO | 2018022180 A1 | 2/2018 |
| WO | 2018/138632 A1 | 8/2018 |
| WO | 2019077218 A1 | 4/2019 |
| WO | 2019232526 A1 | 12/2019 |
| WO | 2019232527 A1 | 12/2019 |
| WO | 2020/196336 A1 | 10/2020 |
| WO | 2021/203910 A1 | 10/2021 |
| WO | 2021/207821 A1 | 10/2021 |
| WO | 2022/061117 A1 | 3/2022 |
| WO | 2022/132351 A1 | 6/2022 |
| WO | 2022/171349 A1 | 8/2022 |

OTHER PUBLICATIONS

European Partial Supplementary Search Report for Patent Application No. 22805143 dated Mar. 3, 2025 (18 pages).

Author Unknown, "An Innovative Implant for the Creation of Anastomosis," PLIO, retrieved from the internet at: https://pliosurgical.com/, Jan. 19, 2024 (13 pages).

European Patent Office, Communication pursuant to Article 94(3) EPC for Application No. 19810895.3, dated Feb. 13, 2023 (3 pages).

Extended European Search Report of the European Patent Office, Application No. 19810895.3, dated Feb. 7, 2022, 10 pages.

Gagner, M., "Duodeno-Ileal Anastomosis with Self-Assembling Magnets: Initial Concepts and Basis of This Operation", Obesity Surgery 32, 932-933 (2022).

International Search Report and Written Opinion of the International Searching Authority, Application No. PCT/US2019035202, mailed Aug. 8, 2019, 6 pages.

International Search Report and Written Opinion of the International Searching Authority, Application No. PCT/US2022/25343, mailed Jul. 18, 2022, 14 pages.

International Search Report and Written Opinion of the International Searching Authority, Application No. PCT/US2022/25353, mailed Jun. 30, 2022, 12 pages.

International Search Report and Written Opinion of the International Searching Authority, for Application No. PCT/US2011/020229, with a date of mailing of Jun. 21, 2013, 6 pages.

International Search Report and Written Opinion of the International Searching Authority, for Application No. PCT/US2013/041641, dated Oct. 18, 2013, 4 pages.

International Search Report and Written Opinion of the International Searching Authority, for Application No. PCT/US2015/041498 dated Nov. 17, 2015, 17 pages.

International Search Report and Written Opinion of the International Searching Authority, for Application PCT/US2016/022209, dated May 30, 2016.

International Search Report and Written Opinion of the International Searching Authority, for Application PCT/US22/25338, dated Aug. 19, 2022, 14 pages.

International Search Report and Written Opinion of the International Searching Authority, for Application PCT/US23/29416, dated Dec. 7, 2023, 9 pages.

International Search Report and Written Opinion of the International Searching Authority, for Application PCT/US23/29432, dated Nov. 14, 2023, 7 pages.

International Search Report and Written Opinion issued for Application No. PCT/US2016/031547 dated Oct. 18, 2016, 18 pages.

Invitation to Pay Additional Fees and, Where Applicable, Protest Fee, from the International Search Authority, Application No. PCT/US2022/025338, mailed Jun. 23, 2022, 2 pages.

Invitation to Pay Additional Fees and, Where Applicable, Protest Fee, from the International Search Authority, Application No. PCT/US2022/025370, mailed Jun. 24, 2022, 3 pages.

Japanese Office Action for Japanese Patent Application No. 2021-034336 dated Dec. 17, 2021, 3 pages.

Japanese Penultimate Office Action for Japanese Patent Application No. 2021-034336 dated Aug. 1, 2022, 9 pages.

Japanese Office Action, Notice of Reasons for Refusal, Japanese Patent Application No. 2020-567134 dated Feb. 21, 2023.

Japanese Search Report, Japanese Application No. 2020-567134, dated Feb. 13, 2023, 28 pages.

Supplementary Partial European Search Report for Application No. EP 13793804.9 dated Jan. 15, 2016, 9 pages.

(56) References Cited

OTHER PUBLICATIONS

International Search Report and Written Opinion of the International Searching Authority, for Application PCT/2023/031863, dated Jan. 22, 2024, 8 pages.
International Search Report and Written Opinion of the International Searching Authority, for Application PCT/US2023/031861, dated Feb. 2, 2024, 9 pages.
International Search Report and Written Opinion of the International Searching Authority, for Application PCT/US2023/035976, dated Feb. 2, 2024, 11 pages.
Jamshidi, et al., "Magnamosis: magnetic compression anastomosis with comparison to suture and staple techniques," Journal of Pediatric Surgery, vol. 4, Issue 1, pp. 222-228. Jan. 20, 2009 (Jan. 20, 2009). [Retrieved on Dec. 5, 2023]. Retrieved from the Internet: <URL: https://dotorg/10.1016/j.jpedsurg.2008.10.044>. entire document.

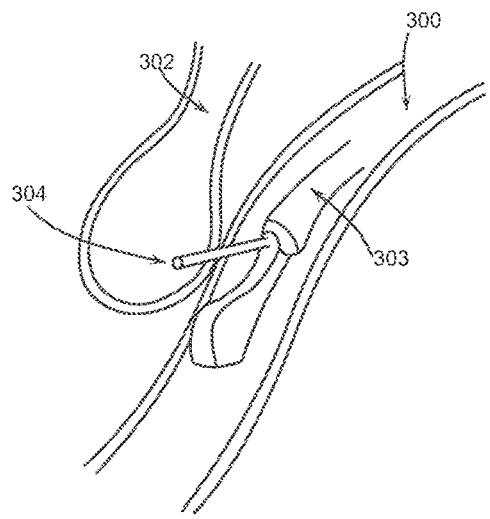
FIG. 21A
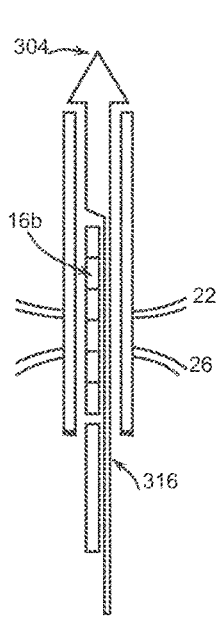 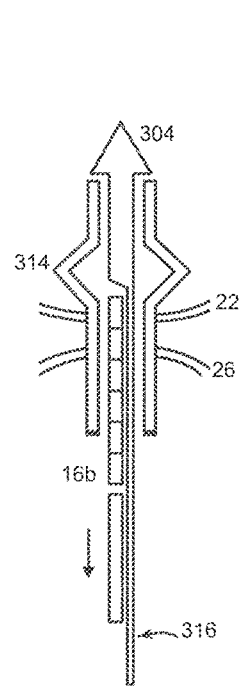 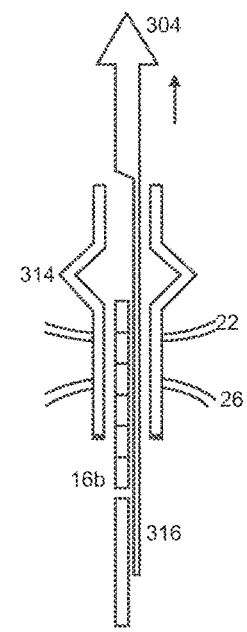
FIG. 21B    FIG. 21C    FIG. 21D

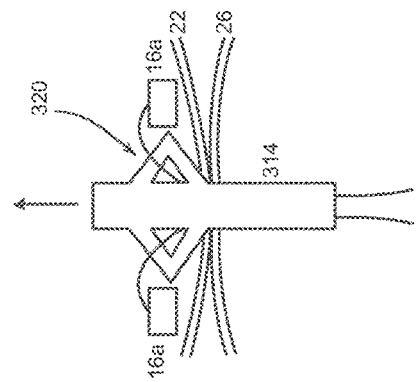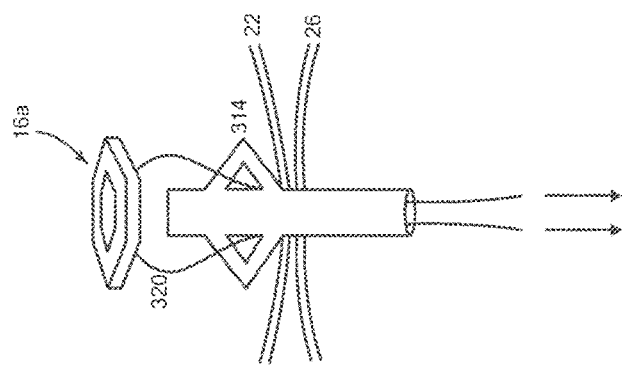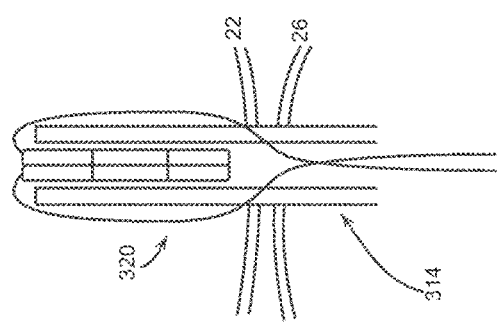

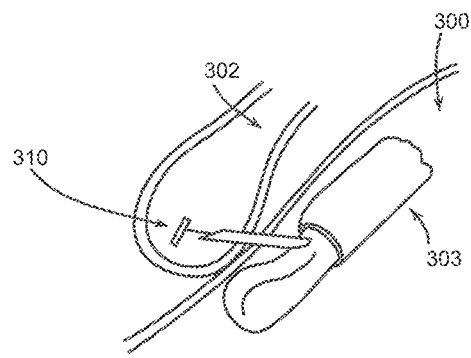
FIG. 25A
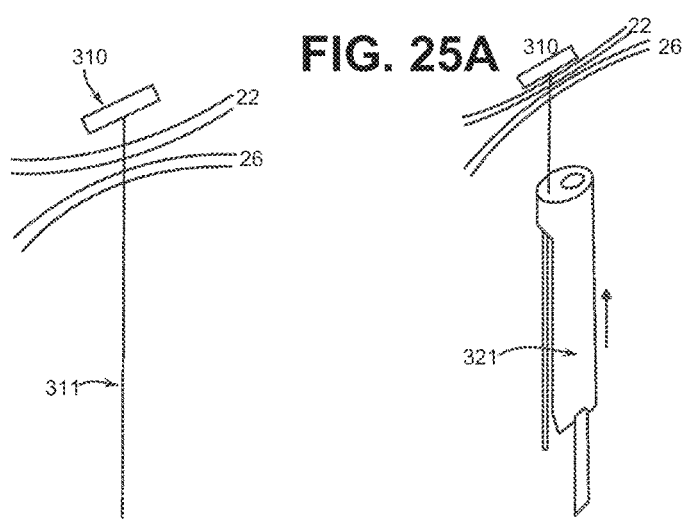
FIG. 25B  FIG. 25C

FIG. 45  Flexible Endoscopes General Diameter Guide for Endoscopy Brushes

| SCOPE TYPE | INSERTION TUBE OUTER DIAMETER | WORKING LENGTH | INSTRUMENT CHANNEL INTERNAL DIAMETER | HEALTHMARK ENDO BRUSHES | ENDOBRUSH DIAMETER RANGE | OLYMPUS COLOR GUIDE |
|---|---|---|---|---|---|---|
| ADULTS | | | | | | |
| GASTROSCOPE | 9.0 mm - 11.4 mm | 1030 mm - 1050 mm | 2.8mm - 3.8mm | CC-250, CC-374 | 2.6 - 3.2 mm, 3.7 - 4.3 mm | |
| DUODENSCOPE | 10.8 mm - 12.5 mm | 1235 mm - 1250 mm | 3.2mm - 4.2mm | CC-250, CC374 | 2.6 - 3.2 mm, 3.7 - 4.3 mm | |
| COLONOSCOPE | 12.9 mm - 13.7 mm | 1330 mm - 1680 mm | 3.7 mm - 4.2mm | CC-374 | 3.7 - 4.3 mm | |
| SIGMOIDOSCOPE | 12.8 mm - 13.2 mm | 700 mm - 730 mm | 3.7 mm - 4.2mm | CC-374 | 3.7 - 4.3 mm | |
| ENTEROSCOPE | 10.5 mm - 11.7 mm | 2200 mm - 2500 mm | 2.8mm - 3.8mm | CC-250, CC-374 | 2.6 - 3.2 mm, 3.7 - 4.3 mm | |
| BRONCHOSCOPE | 5.7 mm - 6.0 mm | 550 mm - 660 mm | 2.0mm - 2.8mm | CC-172, CC-250 | 1.7 - 2.2 mm, 2.6 - 3.2 mm | |
| URETEROSCOPE | 2.8 mm - 3.3 mm | 670 mm - 700 mm | 1.2mm | CC-172 | 1.7 - 2.2 mm | |
| CYSTOSCOPE | 5.4 mm - 5.5 mm | 380 mm | 2.2mm - 2.4mm | CC-172, CC-250 | 1.7 - 2.2 mm, 2.6 - 3.2 mm | |
| RHINO-LARYNGOSCOPE | 2.6 mm - 4.9 mm | 300 mm - 365 mm | N/A - 2.0 | CC-172 | 1.7 - 2.2 mm | |
| LAPARO-THORACOSCOPE | 7.0 mm | 270 mm | 2.8 mm | CC-250 | 2.6 - 3.2 mm | |
| MOBILE AIRWAY SCOPE | 4.1 mm - 5.2 mm | 600 mm | 1.5 mm - 2.6 mm | CC-172, CC-250 | 1.7 - 2.2 mm, 2.6 - 3.2 mm | |
| CHOLEDOCHOSCOPE | 2.8 mm - 5.2 mm | 380 mm - 700 mm | 1.2 mm - 2.2 mm | CC-110, CC-172 | 1.2 mm, 1.7 - 2.2 mm | white |
| PEDIATRICS | | | | | | |
| GASTROSCOPE | 5.9 mm - 6.0 mm | 1030 mm - 1050 mm | 2.0 mm | CC-172 | 1.7 - 2.2 mm | |
| COLONOSCOPE | 11.5 mm - 11.6mm | 1680 mm - 1700 mm | 3.2 mm - 3.8 mm | CC-250, CC-374 | 2.6 - 3.2 mm, 3.7 - 4.3 mm | |
| BRONCHOSCOPE | 4.4 mm - 5.1 mm | 600 mm | 2.0 mm | CC-172 | 1.7 - 2.2 mm | |

SYSTEMS, DEVICES, AND METHODS FOR FORMING ANASTOMOSES

CROSS-REFERENCE TO RELATED APPLICATIONS

This patent application is a continuation of International Application No. PCT/US2022/025370 entitled SYSTEMS, DEVICES, AND METHODS FOR FORMING ANASTOMOSES filed Apr. 19, 2022, which claims the benefit of U.S. Provisional Patent Application No. 63/191,146 entitled SYSTEMS, DEVICES, AND METHODS FOR FORMING ANASTOMOSES filed May 20, 2021, each of which is hereby incorporated by reference herein in its entirety.

The subject matter of this patent application may be related to the subject matter of U.S. patent application Ser. No. 17/108,840 entitled SYSTEMS, DEVICES, AND METHODS FOR FORMING ANASTOMOSES filed Dec. 1, 2020, which is a continuation-in-part of, and therefore claims priority from, International Patent Application No. PCT/US2019/035202 having an International Filing Date of Jun. 3, 2019, which claims the benefit of, and priority to, U.S. Provisional Application Ser. No. 62/679,810, filed Jun. 2, 2018, U.S. Provisional Application Ser. No. 62/798,809, filed Jan. 30, 2019, and U.S. Provisional Application Ser. No. 62/809,354, filed Feb. 22, 2019, the contents of each of which are hereby incorporated by reference herein in their entireties.

FIELD OF THE INVENTION

The invention relates to deployable magnetic compression devices, and, more particularly, to systems, devices, and methods for the delivery, deployment, and positioning of magnetic compression devices at a desired site so as to improve the accuracy of anastomoses creation between tissues, organs, or the like.

BACKGROUND

Bypasses of the gastroenterological (GI), cardiovascular, or urological systems are typically formed by cutting holes in tissues at two locations and joining the holes with sutures or staples. A bypass is typically placed to route fluids (e.g., blood, nutrients) between healthier portions of the system, while bypassing diseases or malfunctioning tissues. The procedure is typically invasive, and subjects a patient to risks such as bleeding, infection, pain, and adverse reaction to anesthesia. Additionally, a bypass created with sutures or staples can be complicated by post-operative leaks and adhesions. Leaks may result in infection or sepsis, while adhesions can result in complications such as bowel strangulation and obstruction. While traditional bypass procedures can be completed with an endoscope, laparoscope, or robot, it can be time consuming to join the holes cut into the tissues. Furthermore, such procedures require specialized expertise and equipment that is not available at many surgical facilities.

As an alternative to sutures or staples, surgeons can use mechanical couplings or magnets to create a compressive anastomosis between tissues. For example, compressive couplings or paired magnets can be delivered to tissues to be joined. Because of the strong compression, the tissue trapped between the couplings or magnets is cut off from its blood supply. Under these conditions, the tissue becomes necrotic and degenerates, and at the same time, new tissue grows around points of compression, e.g., on the edges of the coupling. With time, the coupling can be removed, leaving a healed anastomosis between the tissues.

Nonetheless, the difficulty of placing the magnets or couplings limits the locations that compressive anastomosis can be used. In most cases, the magnets or couplings have to be delivered as two separate assemblies, requiring either an open surgical field or a bulky delivery device. For example, existing magnetic compression devices are limited to structures small enough to be deployed with a delivery conduit e.g., an endoscopic instrument channel or laparoscopic port. When these smaller structures are used, the formed anastomosis is small and suffers from short-term patency. Furthermore, placement of the magnets or couplings can be imprecise, which can lead to anastomosis formation in locations that is undesirable or inaccurate.

Thus, there still remains a clinical need for reliable devices and minimally-invasive procedures that facilitate compression anastomosis formation between tissues in the human body.

SUMMARY

Various embodiments of the invention provide improved devices and techniques for minimally-invasive formation of anastomoses within the body. Such devices and techniques facilitate faster and less-expensive treatments for chronic diseases such as obesity and diabetes. Such techniques also reduce the time and pain associated with palliative treatments for diseases such as cancers.

Various methods of the invention may include piercing a delivery device through a proximal tissue wall into a proximal lumen, creating an enterotomy. The delivery device may then be advance through a distal tissue wall of the proximal lumen, creating an exit incision. The delivery device may then be advanced through the tissue wall of a distal lumen, creating an entry incision, and thereby entering the distal lumen. A distal compression anastomosis device may then be deployed from the delivery device into the distal lumen. The delivery device may then be retracted from the distal lumen through the entry incision, through the exit incision, and into the proximal lumen. While in the proximal lumen, a proximal anastomosis device may be deployed from the delivery device into the proximal lumen. Subsequently, a control member may be deployed through the delivery device into the proximal lumen. Utilizing the control member, the proximal compression anastomosis device may be manipulated so as to push the proximal anastomosis device to a first target site against a tissue wall of the proximal lumen and align the proximal anastomosis device with the distal anastomosis device. A tensile force may then be applied to an articulable tensioning member to bring the distal anastomosis device to a second target site against a tissue wall of the distal lumen, thereby bringing the anastomosis devices together to form an anastomosis. The articulable tensioning member may then be cut, and retracted into the delivery device, thereby releasing the anastomosis devices. The delivery device may then be retracted from the proximal lumen into the body cavity through the enterotomy for removal from the patient.

In some embodiments, the delivery device may be a laparoscope or an endoscope.

In some embodiments, the distal compression anastomosis device may be manipulated using a laparoscope.

In an embodiment, the proximal anastomosis device may be deployed before the distal anastomosis device.

Various methods of the invention may include piercing a delivery device through a tissue wall f a distal lumen and advancing into the distal lumen, deploying a distal compression anastomosis device from the distal end of the delivery device. A magnetail device may then be deployed from the delivery device such that the distal end of the magnetail is connected to the distal anastomosis device inside the distal lumen, and the proximal end of the magnetail is outside of the distal lumen in the body cavity. The delivery device may then be retracted from the distal lumen into the body cavity, and then may pierce a proximal tissue wall of a proximal lumen, advancing into the proximal lumen wherein a proximal compression anastomosis device may be deployed. The delivery device may then pierce through a distal tissue wall of the proximal lumen thereby creating a distal enterotomy. A laparoscope may be utilized to manipulate the proximal end of the magnetail device, bringing it through the distal enterotomy and attaching it to the delivery device. The delivery device may then be retracted so as to bring the distal magnetic anastomosis device into proximity with the proximal anastomosis device, thereby forming an anastomosis therebetween.

In some embodiments, the magnetail device may comprise one or more sutures, a balloon control member, a deployable/retractable umbrella control member, a cap control member, and/or a basket control member.

Various embodiments of the invention may include an apparatus for manipulating the placement of a compression anastomosis device comprising a magnetail device, a compression anastomosis device at the distal end of the magnetail, a pulley mechanism or shaft member attached to the sutures, a pulley translation member at the proximal end attached to the pulley mechanism having capabilities to extend or retract the sutures in order to manipulate the compression anastomosis device.

In some embodiments, the control member comprises one or more sutures. In some embodiments, the control member may be a balloon, a deployable/retractable umbrella, a cap, and/or a basket.

In various embodiments, the invention may include an apparatus for manipulation of sutures and/or guide elements within a patient comprising a handle, the distal end of which may be connected to a conduit including but not limited to an endoscope or laparoscope. The handle may have a conduit through the center, wherein sutures or guidewires run through the conduit from the distal end to the proximal end. One or more suture wheels may be attached to the handle, capable of manipulating the tension applied to the sutures. In some embodiments, a suture cutting button may be attached to the handle, capable of severing the sutures. A catch/release and/or locking mechanism may be attached to the handle capable of maintaining applied tension to the sutures, holding them in place.

Some embodiments of the invention may include an apparatus for placement and control of a compression anastomosis device comprising a wand member capable of being deployed from a delivery device. The distal end of the wand member may be key or hook shaped capable of engaging a compression anastomosis device. The wand member may have a conduit running from the distal end to the proximal end, wherein one or more sutures run through the conduit, capable of controlling a compression anastomosis device. The wand member may have one or more magnets on its face, on the proximal side of the hook, arranged linearly along a proximal to distal axis, capable of engaging with a compression anastomosis device to manipulate the placement of the device at a target site within a patient. The magnets may have a magnetic force less than that of the compression anastomosis device, so as to disengage with the compression anastomosis device. The wand member may be capable of being retracted into the delivery device for removal from the patient.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 9 illustrates the use of monopolar energy for piercing and accessing the gallbladder.

FIG. 10 illustrates the use of a fine aspiration needle (FNA) for piercing and accessing the gallbladder.

FIG. 11 illustrates the use of a corkscrew-type needle for piercing and accessing the gallbladder.

FIG. 12 illustrates the use of a guidewire passed through the bile duct.

FIG. 14 illustrates a T-bar member.

FIG. 15 illustrates a nitinol coil (e.g., "pig tail").

FIG. 16 illustrates a balloon member of a catheter.

FIG. 17 illustrates a malecot catheter.

FIGS. 21A, 21B, 21C, 21D, and 21E illustrate a technique of accessing the gallbladder and delivering a pair of magnetic anastomosis devices for the formation of an anastomosis in the gallbladder tissue and adjacent tissue.

FIGS. 22A, 22B, and 22C illustrate a variation of the procedure and devices illustrated in FIGS. 21A-21E in that the magnetic anastomosis device is preloaded into a distal end of the malecot catheter of the delivery device resulting in delivery and deployment of the device upon transitioning of the malecot end into an anchored position.

FIGS. 25A, 25B, 25C, 25D, 25E illustrate a technique of accessing the gallbladder and delivering a pair of magnetic anastomosis devices for the formation of an anastomosis in the gallbladder tissue and adjacent tissue (i.e., stomach or duodenum tissue).

FIG. 45 provides a listing of some exemplary working channel sizes considered usable/feasible to deploy a magnetic array with a cage to produce an anastomosis.

Figure 1:
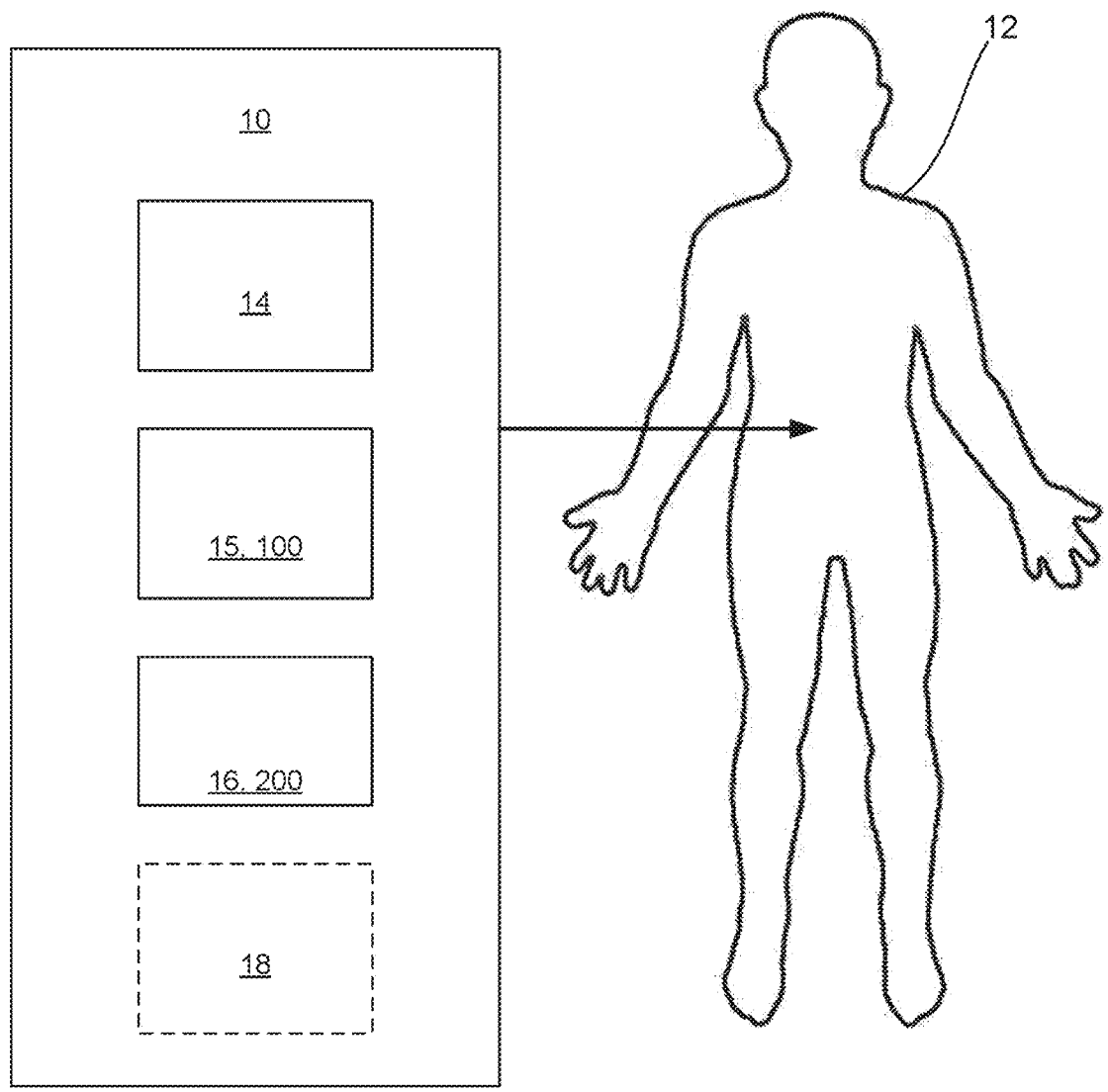
FIG. 1 is a schematic illustration of an anastomosis formation system consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

Exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

The system generally includes an access device configured to be provided within a hollow body of a patient and assist in the formation of an anastomosis at a target site (a desired anatomical location) within the hollow body for formation of an anastomosis between a first portion of tissue of the hollow body at the target site and a second portion of tissue of the hollow body. The access device is configured to provide access to the first and second portions of tissue of the hollow body and further deliver and position first and second implantable magnetic anastomosis devices relative to the first and second portions of tissue or adjacent tissue for the formation of an anastomosis between tissues at the target site. The first and second implantable magnetic anastomosis devices are configured to be magnetically attracted to one another through a defined tissue area of the combined thickness of a wall of the tissues at the target site and exert compressive forces on the defined area to form the anastomosis.

The systems, devices, and methods described herein include, but are not limited to, various access devices for accessing a hollow body of the patient, such as a gallbladder, and securing positioning of the access device for the subsequent placement of one of a pair of magnetic anastomosis compression devices. The systems, devices, and methods described herein further include various delivery devices for delivering at least one of the pair of magnetic anastomosis compression devices to the target site, wherein, in some instances, a delivery device consistent with the present disclosure may assist in the deployment of at least one of the pair of magnetic anastomosis compression devices and subsequent securing to the target site and/or coupling the pair of magnetic anastomosis compression devices to one another. The systems, devices, and methods described herein include various embodiments of magnetic anastomosis compression devices and various designs for transitioning from a compact delivery configuration to a larger deployed configuration, generally by way of self-assembling design.

More specifically, exemplary embodiments provide a system including a delivery device for introducing and delivering, via a minimally-invasive technique, a pair of magnetic assemblies between adjacent organs to bridge walls of tissue of each organ together to thereby form a passage therebetween (i.e., an anastomosis). The delivery device is particularly useful in delivering the pair of magnetic assemblies to a target site within the gastrointestinal tract to thereby form anastomosis between gastric and gallbladder walls to provide adequate drainage from the gallbladder when blockage is occurring (due to disease or other health-related issues).

Accordingly, exemplary embodiments provide improved devices and techniques for minimally invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

FIG. 1 is a schematic illustration of an anastomosis formation system 10 for providing improved placement of magnetic anastomosis devices at a desired site so as to improve the accuracy of anastomoses creation between tissues within a patient 12. The system 10 generally includes an access device 14, a delivery device 15, 100, magnetic anastomosis devices 16, 200, and an imaging modality 18.

The access device 14 may generally include a scope, including, but not limited to, an endoscope, laparoscope, catheter, trocar, or other delivery device. For most applications described herein, the access device 14 is an endoscope, including a delivery needle configured to deliver the magnetic anastomosis devices 16, 200. Accordingly, the system 10 of the present disclosure relies on a single endoscope 14 for the delivery of the two magnetic devices 16, 200. As will be described in greater detail herein, a surgeon may advance the endoscope 14 within a hollow body of the patient 12 and position the endoscope 14 at the desired anatomical location for formation of the anastomosis based on a visual depiction of the location of the target site as provided by an imaging modality. For example, the imaging modality may include a display in which an image, or other visual depiction, is displayed to the surgeon illustrating a target site when performing a medical imaging procedure, including, but not limited to, ultrasound (US), wavelength detection, X-ray-based imaging, illumination, computed tomography (CT), radiography, and fluoroscopy, or a combination thereof. The surgeon may then rely on such a visual depiction when advancing the endoscope through the hollow body so as to position the access device 14 at a portion of tissue adjacent to the other portion of tissue at the target site, thereby ensuring the placement of the magnetic devices 16, 200 is accurate.

It should be noted that the hollow body through which the access device 14 may pass includes, but is not limited to, the stomach, gallbladder, pancreas, duodenum, small intestine, large intestine, bowel, vasculature, including veins and arteries, or the like.

Figure 2:
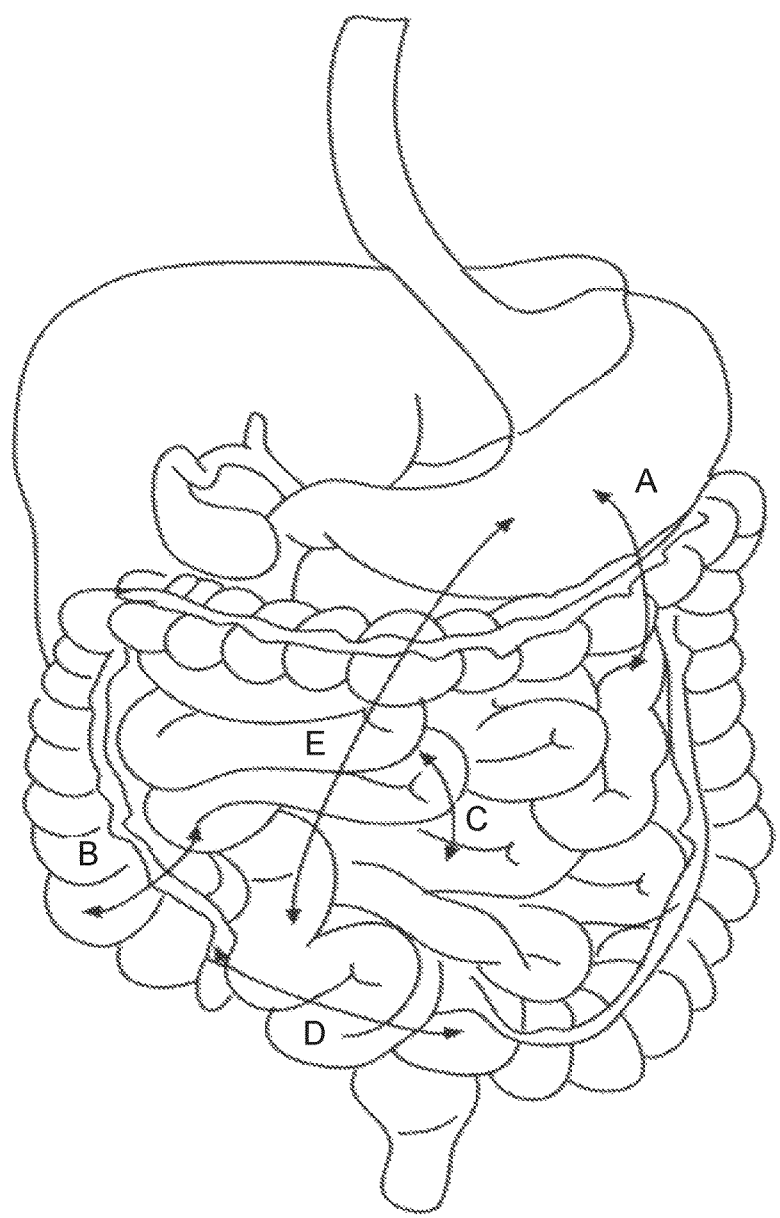
FIG. 2 shows several potential anatomical targets for anastomosis formation, where arrow A is stomach to small intestine, arrow B is small intestine to large intestine, arrow C is small intestine to small intestine, arrow D is large intestine to large intestine, and arrow E is stomach to large intestine.

In some embodiments, self-assembling magnetic devices 16 are used to create a bypass in the gastrointestinal tract. Such bypasses can be used for the treatment of a cancerous obstruction, weight loss or bariatrics, or even treatment of diabetes and metabolic disease (i.e. metabolic surgery). FIG. 2 illustrates the variety of gastrointestinal anastomotic targets that may be addressed with the devices of certain exemplary embodiments, such targets include stomach to small intestine (A), stomach to large intestine (E), small intestine to small intestine (C), small intestine to large intestine (B), and large intestine to large intestine (D). Accordingly, exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer.

For example, if the hollow body through which the access device 14 may pass is a bowel of the patient 12, the first portion may be a distal portion of the bowel and the second portion may be a proximal portion of the bowel. The bowel includes any segment of the alimentary canal extending from the pyloric sphincter of the stomach to the anus. In some embodiments, an anastomosis is formed to bypass diseased, mal-formed, or dysfunctional tissues. In some embodiments, an anastomosis is formed to alter the "normal" digestive process in an effort to diminish or prevent other diseases, such as diabetes, hypertension, autoimmune, or musculoskeletal disease. It should be noted that the system may be used for the formation of an anastomosis between a first portion of tissue of the hollow body at the target site and an adjacent tissue of a second hollow body (e.g., portal between the stomach and the gallbladder, the duodenum and the gallbladder, stomach to small intestine, small intestine to large intestine, stomach to large intestine, etc.).

Figure 3:
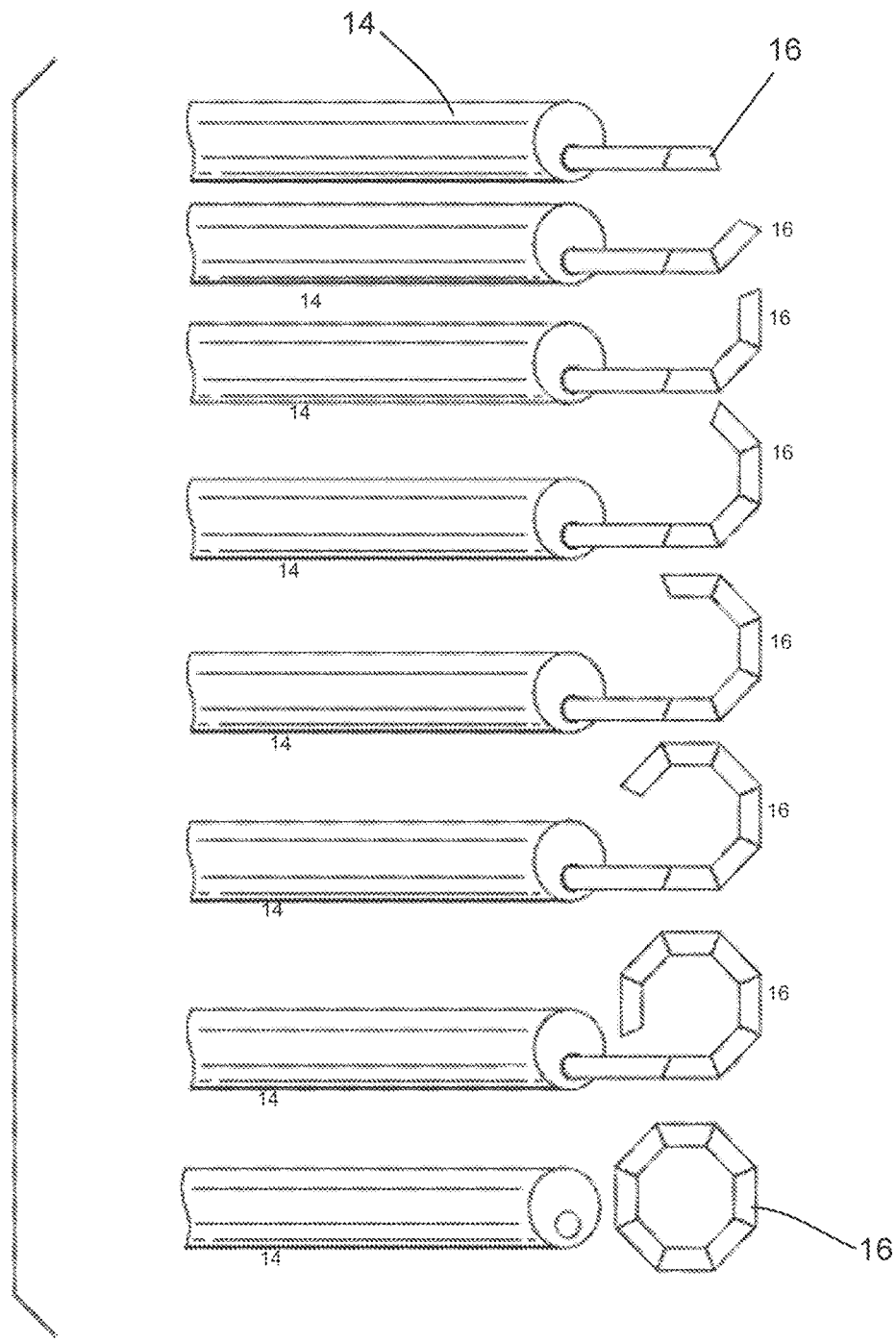
FIG. 3 shows an exemplary magnetic anastomosis device delivered through an endoscope instrument channel such that the individual magnet segments self-assemble into a larger magnetic structure—in this particular case, an octagon.

In an endoscopic procedure, the self-assembling magnetic devices can be delivered using a single endoscope 14. Deployment of a magnetic device 16 is generally illustrated in FIG. 3. As shown, exemplary magnetic anastomosis devices 16 may be delivered through an endoscope 14 such that individual magnet segments self-assemble into a larger magnetic structure—in this particular case, an octagon. When used with the techniques described herein, the devices 16 allow for the delivery of a larger magnetic structures than would otherwise be possible via a small delivery conduit, such as in a standard endoscope, if the devices were deployed as a completed assembly. Larger magnet structures, in turn, allow for the creation of larger anastomoses that are more robust, and achieve greater surgical success. For example, in some cases, resulting anastomosis may have a 1:1 aspect ratio relative to the final dimensions of the assembled magnetic devices. However, exemplary embodiments allow for larger aspect ratios (i.e., a larger anastomosis to form relative to the dimensions of the magnetic assemblies). In particular, prior art systems and methods that include the use of magnets for creating anastomosis are generally limited based on the dimensions of the working channel of the scope or catheter used for delivering such magnets, which, in turn, limits the resulting size of the anastomosis. However, the magnetic assembly design of exemplary embodiments overcome such limitations. For example, the design of the magnetic assembly, notably the coupling of multiple magnetic segments to one another via an exoskeleton, allow for any number of segments to be included in a single assembly, and thus the resulting anastomosis has a greater size relative to the dimensions of the working channel of the scope. For example, in some embodiments, the resulting anastomosis may include an aspect ratio in the range of 2:1 to 10:1 or greater. Such aspect ratios are described in greater detail with regard to FIGS. 44A, 44B, 44C, and 44D.

Because the magnetic devices are radiopaque and echogenic, the devices can be positioned using fluoroscopy, direct visualization (trans-illumination or tissue indentation), and ultrasound, e.g., endoscopic ultrasound. The devices 16 can also be ornamented with radiopaque paint or other markers to help identify the polarity of the devices during placement.

The magnetic anastomosis devices 16 generally comprise magnetic segments that can assume a delivery conformation and a deployed configuration. The delivery configuration is typically linear so that the device can be delivered to a tissue via a laparoscopic "keyhole" incision or with delivery via a natural pathway, e.g., via the esophagus, with an endoscope 14 or similar device. Additionally, the delivery conformation is typically somewhat flexible so that the device can be guided through various curves in the body. Once the device is delivered, the device will assume a deployed configuration of the desired shape and size by converting from the delivery configuration to the deployed configuration automatically. The self-conversion from the delivery configuration to the deployment configuration is directed by coupling structures that cause the magnetic segments to move in the desired way without intervention. Exemplary self-assembling magnetic anastomosis devices 16, such as self-closing, self-opening, and the like, are described in U.S. Pat. Nos. 8,870,898, 8,870,899, 9,763,664, and 10,182,821, the contents of each of which are incorporated by reference herein in their entirety.

Figure 4A:
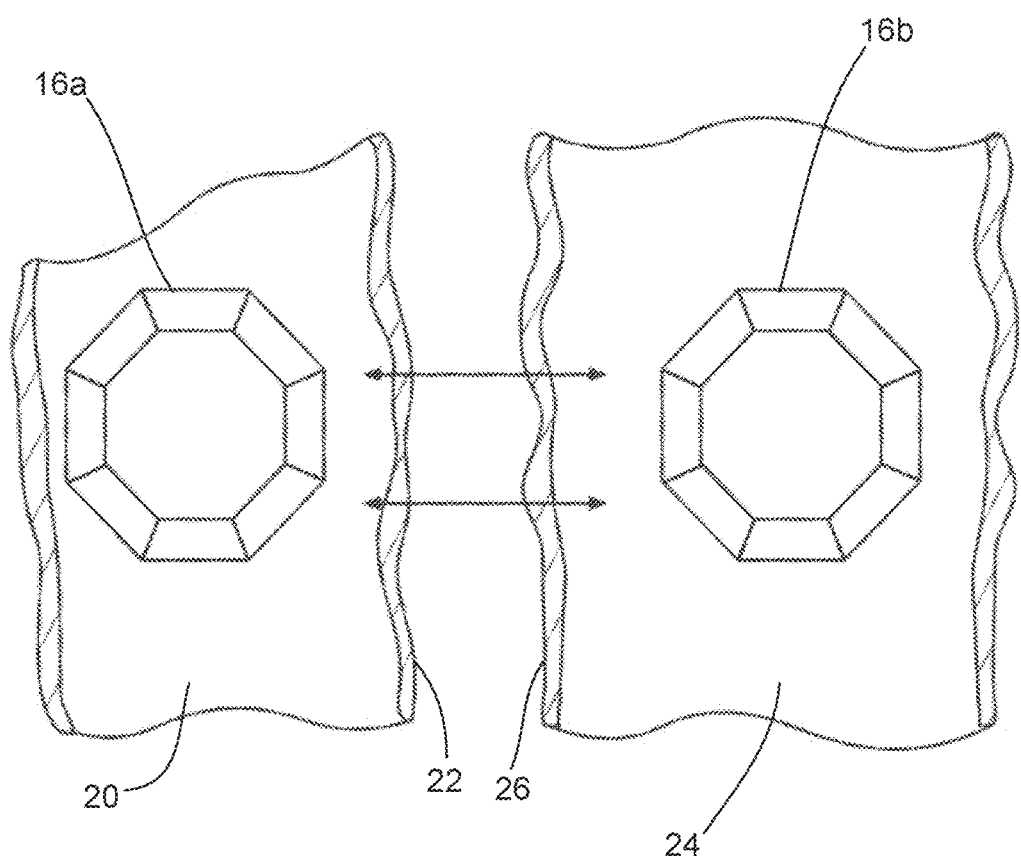
FIG. 4A depicts two magnetic anastomosis devices attracting each other through tissue. As shown, the devices each comprise eight magnetic segments, however alternate configurations are possible. Once the two devices mate, the tissue that is trapped between the devices will necrose, causing an anastomosis to form. Alternatively, the tissue bound by the devices may be perforated after the devices mate to create an immediate anastomosis.

In general, as shown in FIG. 4A, a magnetic anastomosis procedure involves placing a first and a second magnetic structures 16a, 16b adjacent to first and second portions 20, 24 of tissues 22, 26, respectively, thus causing the tissues 22 and 26 to come together. Once the two devices 16a, 16b are brought into proximity, the magnetic structures 16a, 16b mate and bring the tissues 22, 26 together. With time, an anastomosis of the size and shape of the devices 16a, 16b will form and the devices will fall away from the tissue. In particular, the tissues 22, 26 circumscribed by the devices will be allowed to necrose and degrade, providing an opening between the tissues.

Figure 4B:
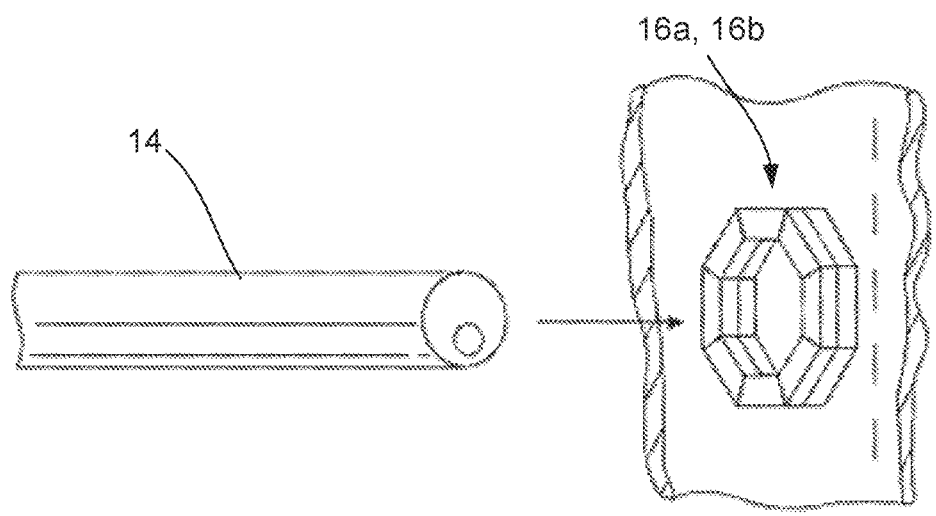
FIG. 4B shows the two magnetic anastomosis devices coupled together by magnetic attraction, capturing the intervening tissue. In some instances, the endoscope can be used to cut through the circumscribed tissue.

Alternatively, because the mated devices 16a and 16b create enough compressive force to stop the blood flow to the tissues 22, 26 trapped between the devices, a surgeon may create an anastomosis by making an incision in the tissues 22, 26 circumscribed by the devices, as shown in FIG. 4B.

In yet another embodiment, as will be described in greater detail herein, and shown in FIGS. 43A-43I, a surgeon may first cut into, or pierce, the tissues 22, 26, and then deliver a magnetic device 16a, 200a into a portion 20 of the hollow body so as to place device 16a, 200a around the incision on tissue 22. The surgeon may then place device 16b, 200b into portion 24 of the hollow body so as to deliver device 16b, 200b around the incision on tissue 26, and then allow the devices 16a, 200a and 16b, 200b to couple to one another, so that the devices 16a, 16b (200a, 200b) circumscribe the incision. As before, once the devices 16a, 16b (200a, 200b) mate, the blood flow to the incision is quickly cut off.

While the figures and structures of the disclosure are primarily concerned with annular or polygonal structures, it is to be understood that the delivery and construction techniques described herein can be used to make a variety of deployable magnetic structures. For example, self-assembling magnets can re-assemble into a polygonal structure such as a circle, ellipse, square, hexagon, octagon, decagon, or other geometric structure creating a closed loop. The devices may additionally include handles, suture loops, barbs, and protrusions, as needed to achieve the desired performance and to make delivery (and removal) easier. Yet still, in other embodiments, such as magnetic assembly 200 of FIG. 42, a magnetic assembly may comprise a pair of magnetic segments generally arranged in a linear alignment with one another (e.g., aligned in an end-to-end fashion) and coupled together via a flexible exoskeleton element. Such an embodiment will be described in greater detail herein.

Figure 5A:
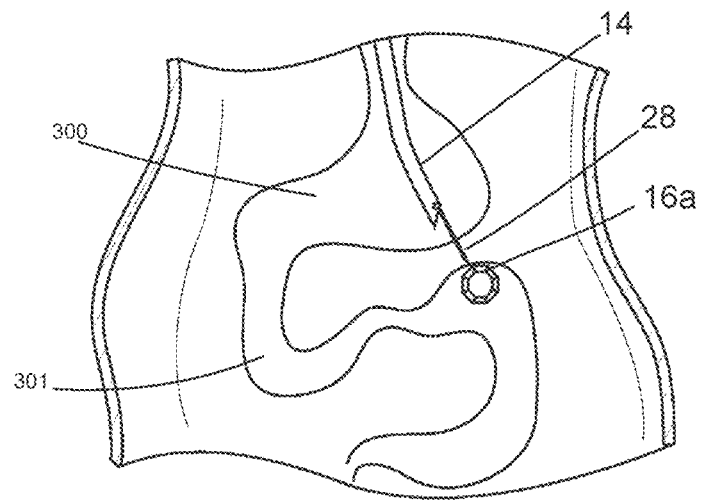
FIG. 5A shows the needle delivering a first magnetic device into a first portion of the hollow body at the target site.
Figure 5B:
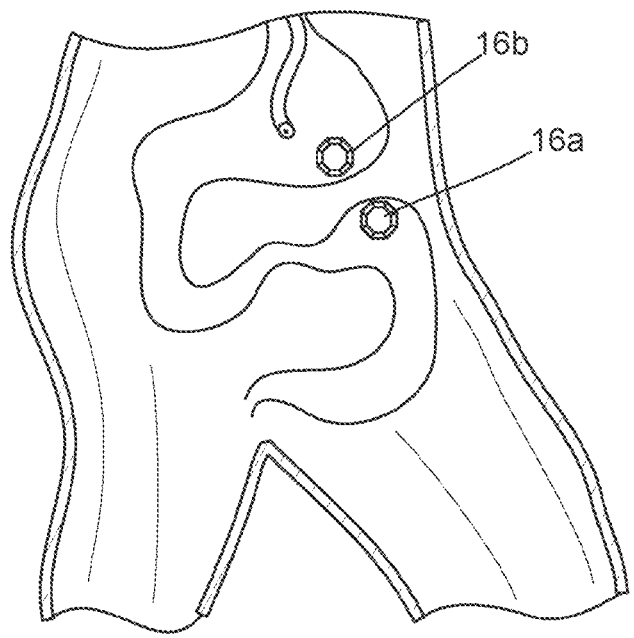
FIG. 5B shows subsequent deployment to of a second magnetic device into a second portion of the hollow body adjacent to the target site.

As previously described, the self-assembling magnetic anastomosis devices can be delivered to the target site via the access device 14. For example, as shown in FIG. 5A, the access device 14 may include a delivery needle 28 (e.g., an aspiration needle) used to deliver the first magnetic anastomosis device 16a into the lower small intestine (through the puncture), which is then followed by deployment to of a second magnetic device 16b into the upper small intestine at a location on the tissue adjacent to the target site (shown in FIG. 5B). It should be noted that the delivery can be guided with fluoroscopy or endoscopic ultrasound. Following self-assembly, these small intestine magnetic devices 16a, 16b couple to one another (e.g., magnetically attracted to one another) through a defined tissue area of the combined thickness of a wall of the tissues at the target site and exert compressive forces on the defined area to form the anastomosis.

Figure 6A:
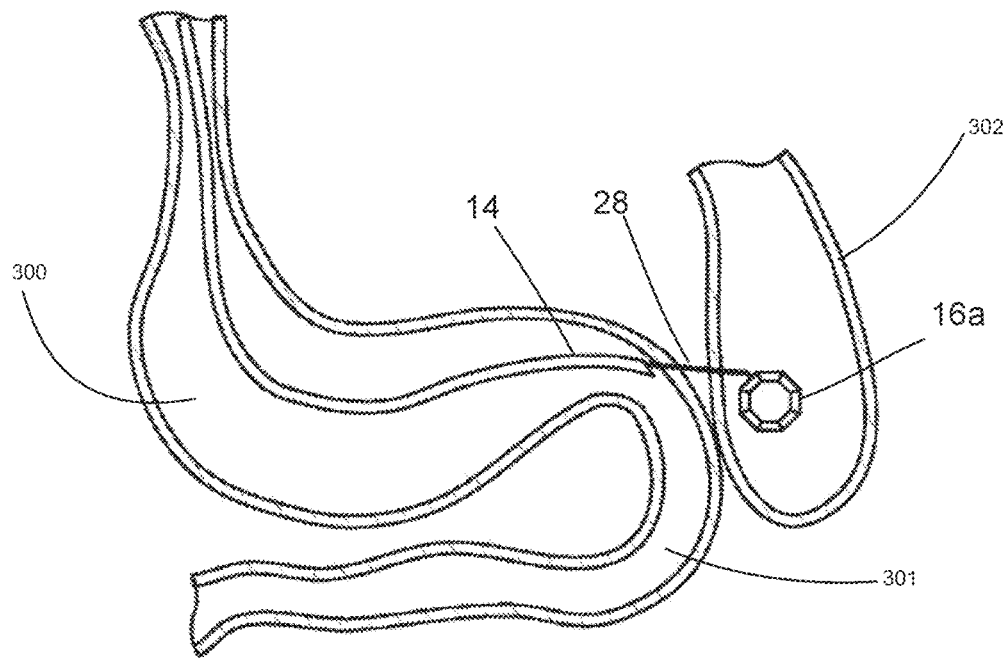
FIG. 6A shows endoscopic ultrasound guided needle delivery of a magnet assembly into the gallbladder which then couples with a second magnet assembly in the stomach or duodenum as shown in FIG. 6B.
Figure 6B:
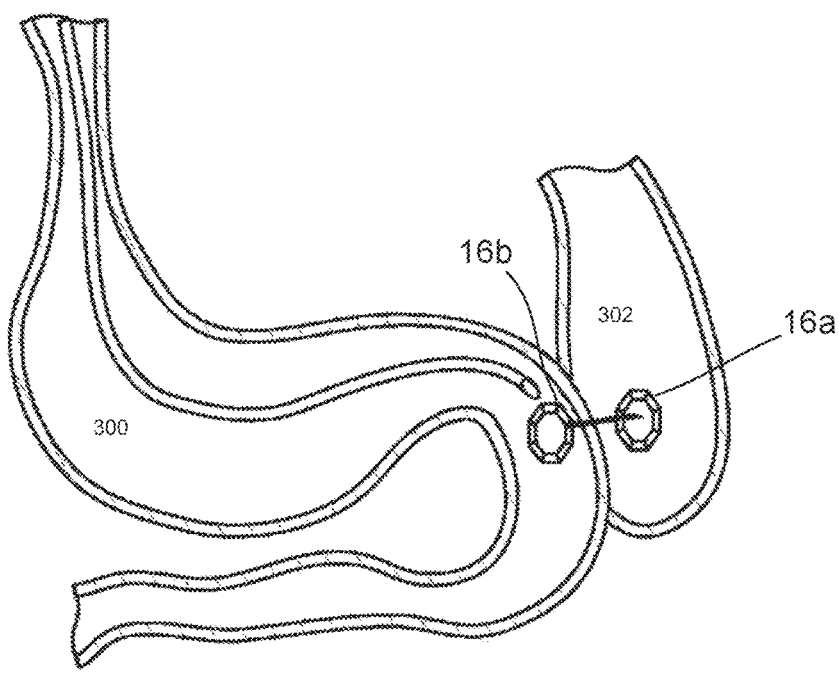

FIG. 6A shows endoscopic ultrasound guided needle delivery of a magnet assembly into the gallbladder 302 which then couples with a second magnet assembly in the stomach 300 or duodenum 301 as shown in FIG. 6B. Accordingly, the described procedures may also be used with procedures that remove or block the bypassed tissues. For example, endoscopic ultrasound (EUS) can be used to facilitate guided transgastric or transduodenal access into the gallbladder 302 for placement of a self-assembling magnetic anastomosis device 16. Once gallbladder 302 access is obtained, various strategies can be employed to maintain a patent portal between the stomach 300 and the gallbladder 302 or the duodenum 301 and the gallbladder 302. In another embodiment, gallstones can be endoscopically retrieved and fluid drained. For example, using the described methods, an anastomosis can be created between the gallbladder 302 and the stomach. Once the gallbladder 302 is accessed in a transgastric or transduodenal fashion, the gallstones can be removed. Furthermore, the gallbladder mucosa can be ablated using any number of modalities, including but not limited to argon plasma coagulation (APC), photodynamic therapy (PDT), sclerosant (e.g. ethanolamine or ethanol).

Figure 7:
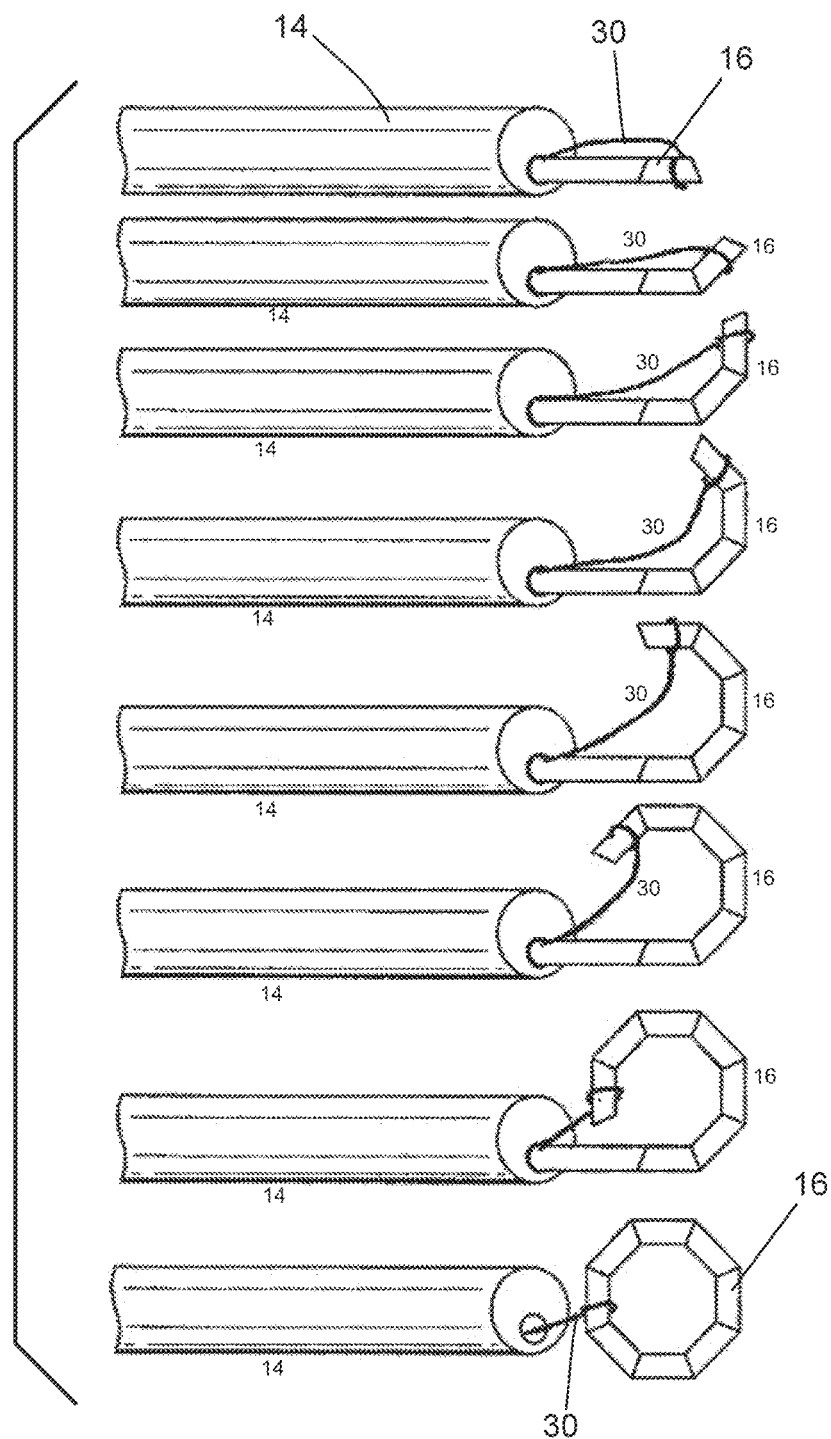
FIG. 7 illustrates a single guide element for deploying and manipulating a magnetic anastomosis device.
Figure 8A:
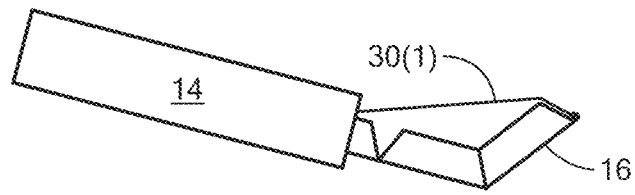
FIGS. 8A, 8B, 8C, 8D, 8E, and 8F each depict the deployment of the self-closing magnetic anastomosis device with a plurality of guide elements.
Figure 8B:
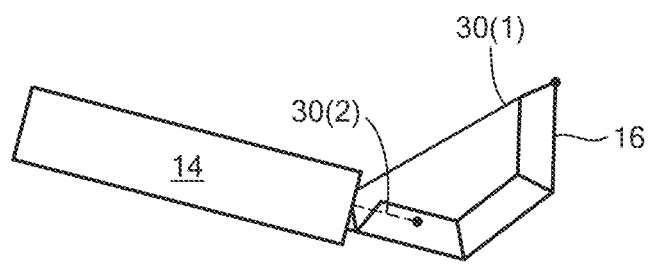
Figure 8C:
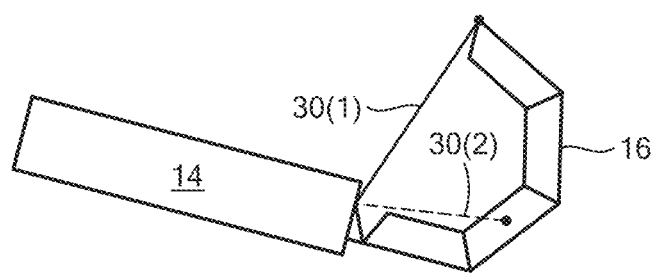
Figure 8D:
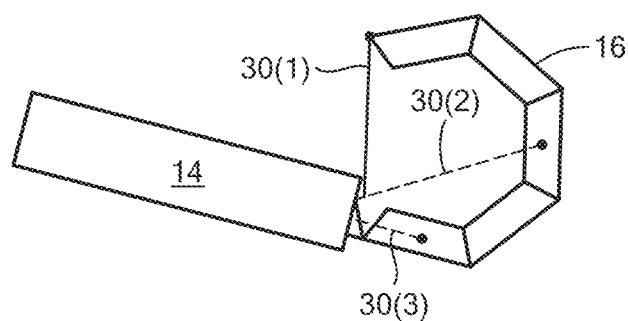
Figure 8E:
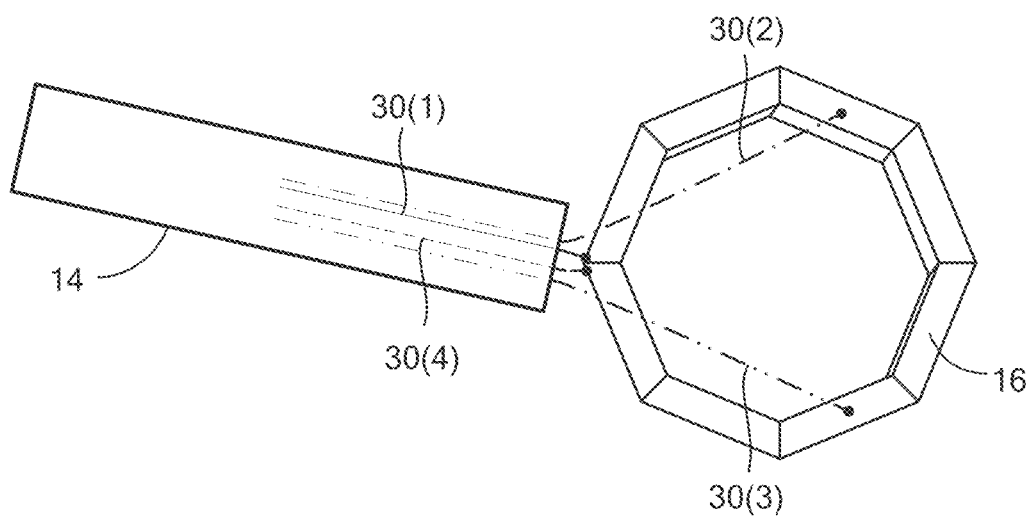
Figure 8F:
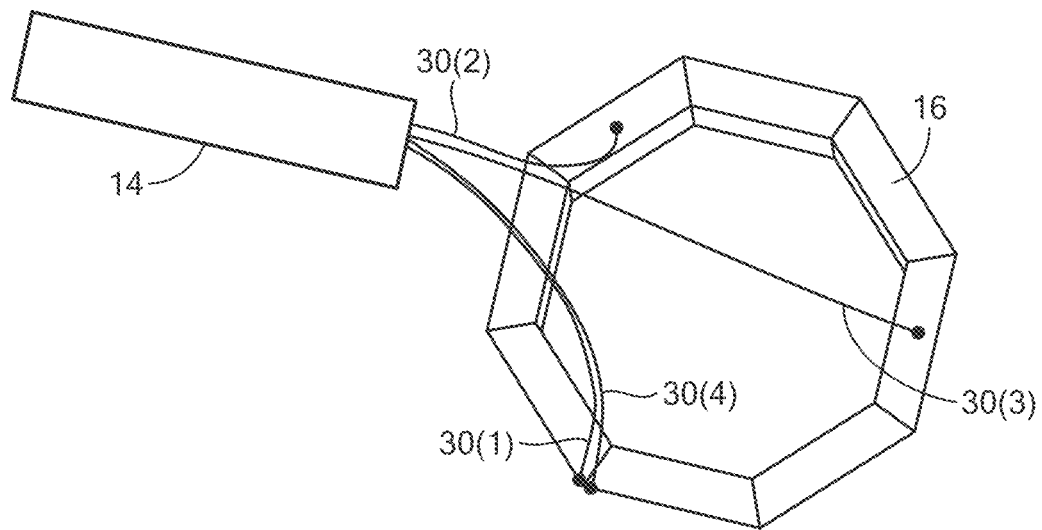

FIG. 7 illustrates a single guide element 30 for deploying and manipulating a magnetic anastomosis device 16. For example, once the self-assembling magnetic device 16 has been delivered to a tissue, it is beneficial to be able to manipulate the location of the device 16. While the device 16 can be manipulated with conventional tools such as forceps, it is often simpler to manipulate the location of the deployed device 16 with a guide element 30, such as a suture or wire. As shown in FIGS. 7 and 8A-8F, a variety of attachment points can be used to provide control over the location and deployment of a self-assembling magnetic anastomosis device 16. For example, as shown in FIG. 7, the guide element 30 may be coupled to a single distal segment such that, upon self-assembly, the single distal segment results in an attachment point that provides translational freedom of movement. It is also notable that the configuration shown in FIG. 7 also allows a closing force to be applied to the distal-most segment. That is, in the event that one or more segments should become entangled with tissue, or otherwise prevented from self-assembling, a proximal pulling force with the guide element 30 can help the device 16 to complete self-assembly. Once self-assembly is completed, the device 16 can be positioned with the guide element 30 to be mated with another device (not shown) to form an anastomosis, as described above. While it is not shown in FIG. 7, it is envisioned that additional structures, such as a solid pusher or a guide tube can be used to deploy the device 16 in the desired location.

The guide element 30 can be fabricated from a variety of materials to achieve the desired mechanical properties and bio-compatibility. The guide element 30 may be constructed from metal, e.g., wire, e.g., stainless steel wire, or nickel alloy wire. The guide element may be constructed from natural fibers, such as cotton or an animal product. The guide element may be constructed from polymers, such as biodegradable polymers, such as polymers including repeating lactic acid, lactone, or glycolic acid units, such as polylactic acid (PLA). The guide element may also be constructed from high-tensile strength polymers, such as Tyvek™ (high density polyethylene fibers) or Kevlar™ (para-aramid fibers). In an embodiment, guide element 30 is constructed from biodegradable suture, such as VICRYL™ (polyglactin 910) suture available from Ethicon Corp., Somerville, N.J.

In some embodiments, a magnetic anastomosis device 16 may include multiple guide elements 30. For example, as shown in FIGS. 8A, 8B, 8C, 8D, 8E, and 8F, a variety of attachment points can be used to provide control over the location and deployment of a self-assembling magnetic anastomosis device 16. As shown, four guide elements 30(1)-30(4) may be coupled to four separate segments of the device 16, respectively. Each guide element may include a distal end coupled to a respective portion of the anastomosis device, and a proximal end that can be manipulated (i.e., increased or decreased tension) to thereby manipulate the positioning and orientation of the anastomosis device once it has self-assembled into the predetermined shape (i.e., a polygon). For example, as shown, guide element 30(1) is coupled to the most distal end segment, guide elements 30(2) and 30(3) are coupled to middle segments (segments between the most distal end segment and most proximal end segment), and guide element 30(4) is coupled to the most proximal end segment.

Figure 9:
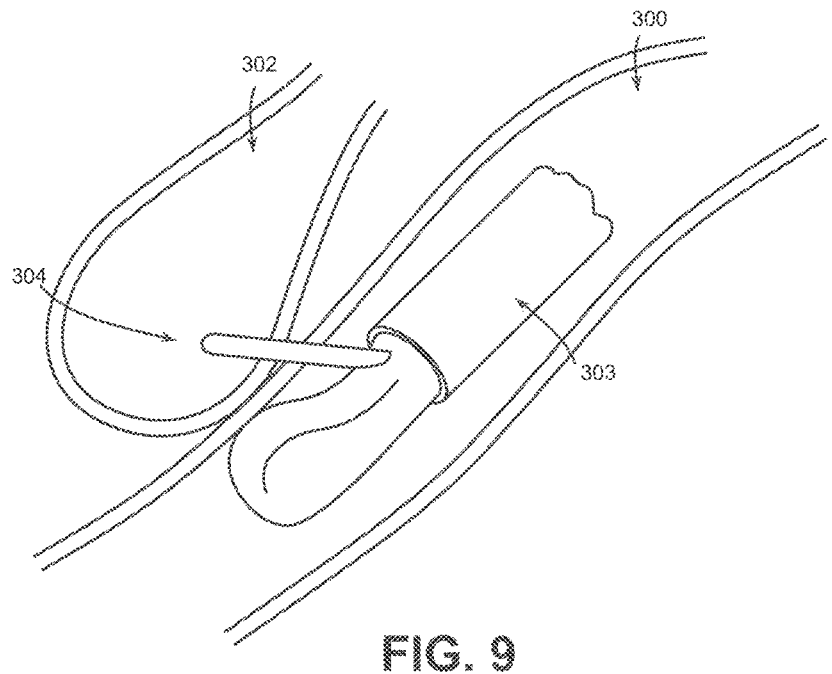
FIGS. 9, 10, 11, and 12 illustrate various methods of accessing the target site, specifically accessing a gallbladder via an endoscopic ultrasound guided procedure.

FIGS. 9-12 illustrates various methods of accessing the target site, specifically accessing a gallbladder 302 via an endoscopic ultrasound guided procedure. FIG. 9 illustrates the use of monopolar energy for piercing and accessing the gallbladder 302. An endoscopic ultrasound scope (EUS scope) 303 accesses the stomach 10/duodenum 301. A hot probe or guide wire 304 utilizing monopolar or bipolar energy pierces the tissue of the stomach 300/duodenum 301 and the gallbladder 302 in order to deliver an anastomosis device 16.

Figure 10:
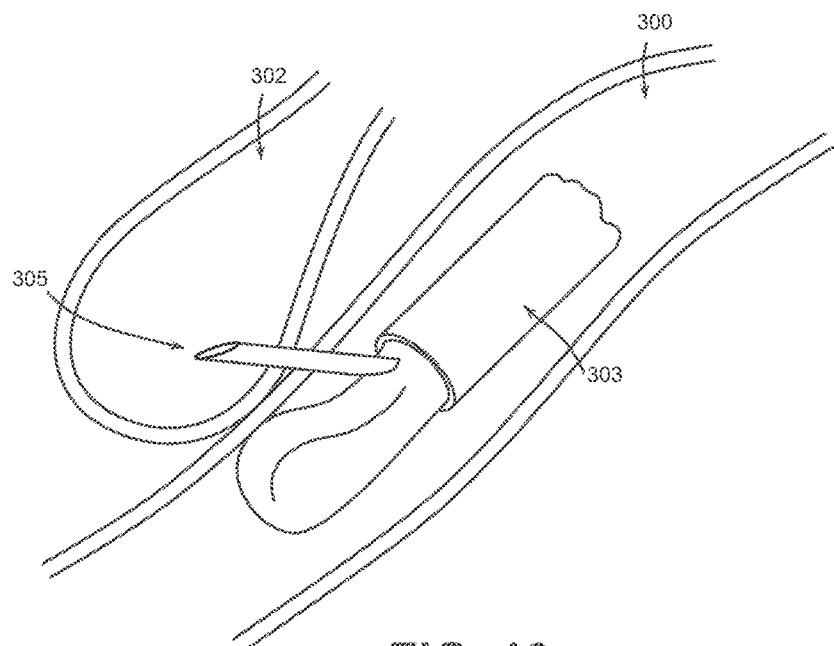

FIG. 10 illustrates the use of a fine aspiration needle (FNA) for piercing and accessing the gallbladder 302. An FNA accesses the stomach 300/duodenum 301 and a hypotube with a cutting edge 305 pierces the tissue of the stomach 300/duodenum 301 and the gallbladder 302 in order to deliver an anastomosis device 16.

Figure 11:
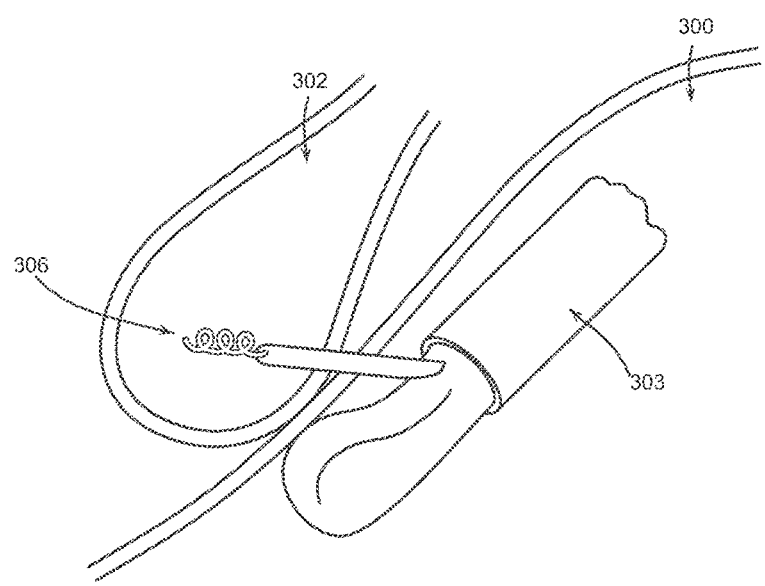

FIG. 11 illustrates the use of a corkscrew-type needle 306 for piercing and accessing the gallbladder 302. An EUS scope 303 accesses the stomach 300/duodenum 301. A corkscrew needle 306 pierces the stomach 300/duodenum 301 tissue and the gallbladder 302 tissue in order to deliver an anastomosis device 16.

Figure 12:
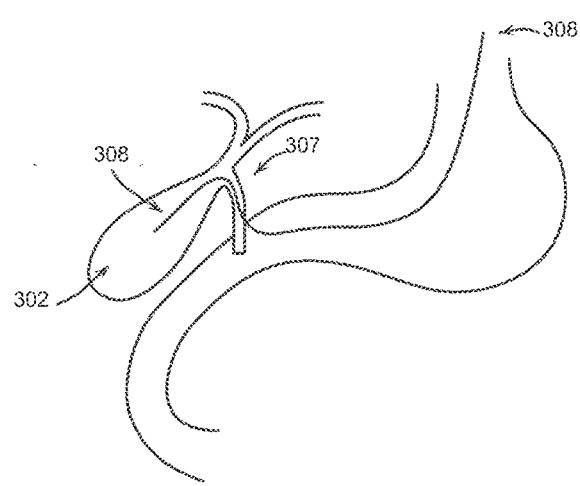

FIG. 12 illustrates the use of a guide wire 308 passed through the bile duct 307. A guide wire 308 accesses the stomach 300/duodenum 301. A guide wire 308 pierces the tissue of the stomach 300/duodenum 301 into the bile duct 307 in order to deliver an anastomosis device 16 into the gallbladder 302.

Figure 13:
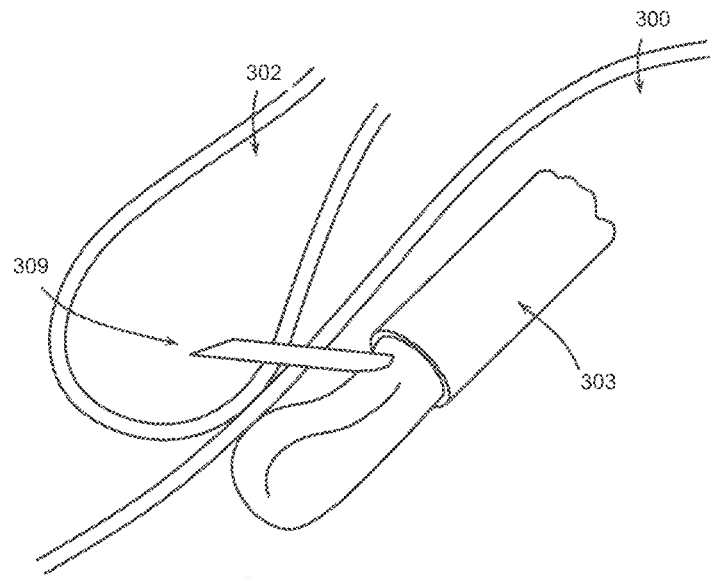
FIG. 13 shows endoscopic ultrasound guided needle piercing of the gallbladder to access the interior of the gallbladder for subsequent delivery of a magnet assembly therein.

FIG. 13 shows endoscopic ultrasound guided needle 303 piercing of the gallbladder 302 to access the interior of the gallbladder 302 for subsequent delivery of a magnet assembly 16 therein.

FIGS. 14, 15, 16 and 17 illustrate various devices for anchoring the access device and/or delivery device 14 to the target site at the gallbladder 302.

Figure 14:
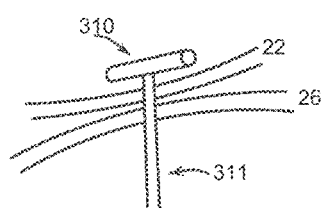
FIGS. 14, 15, 16 and 17 illustrate various devices for anchoring the access device and/or delivery device to the target site at the gallbladder.

FIG. 14 illustrates a T-bar member 310 tethered to the delivery device by a tether 311 acting as an anchoring device to bring the tissues 22, 26 together.

Figure 15:
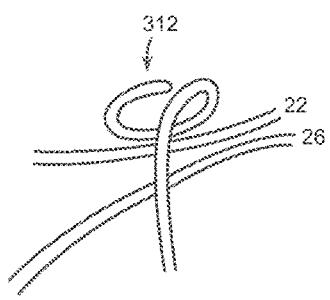

FIG. 15 illustrates a nitinol coil 312 (e.g., "pig tail") acting as an anchoring device to bring the tissues 22, 26 together.

Figure 16:
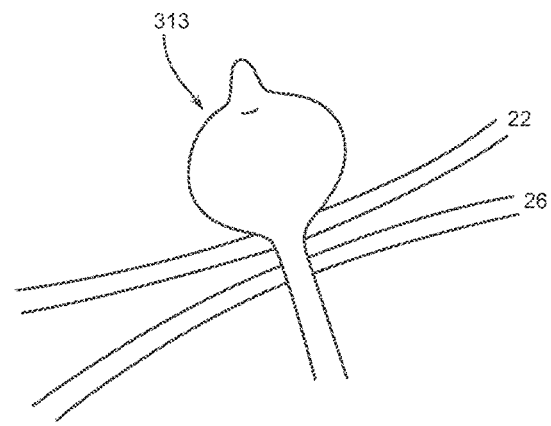

FIG. 16 illustrates a balloon member 313 of a catheter acting as an anchoring device to bring the tissues 22, 26 together.

Figure 17:
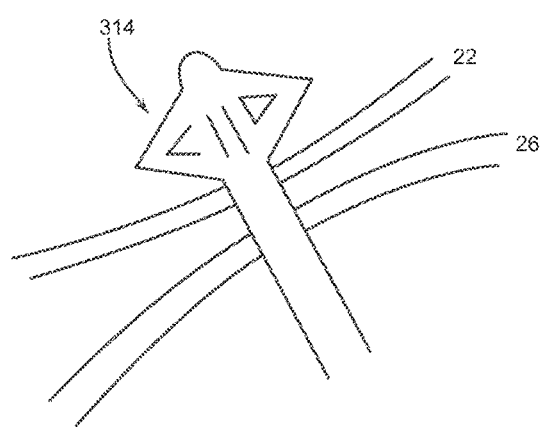

FIG. 17 illustrates a malecot catheter 314 acting as an anchoring device to bring the tissues 22, 26 together.

FIGS. 18A-18F illustrate a method of accessing the gallbladder 302, via endoscopic ultrasound guided access 303 and utilizing an access device emitting monopolar energy, anchoring a delivery device 15 via the use of a balloon catheter 313, and subsequently delivering a pair of magnetic anastomosis devices 16a, 16b within the balloon 313 while the balloon 313 is anchored within the formed enterotomy between the gallbladder 302 tissue and adjacent tissue (i.e., stomach 300 or duodenum tissue 301), thereby deploying the devices 16a, 16b on either side of the respective tissues (i.e., first device 16a within the gallbladder 302 and second device 16b within stomach 300 or duodenum 301) for the formation of an anastomosis there between.

Figure 18A:
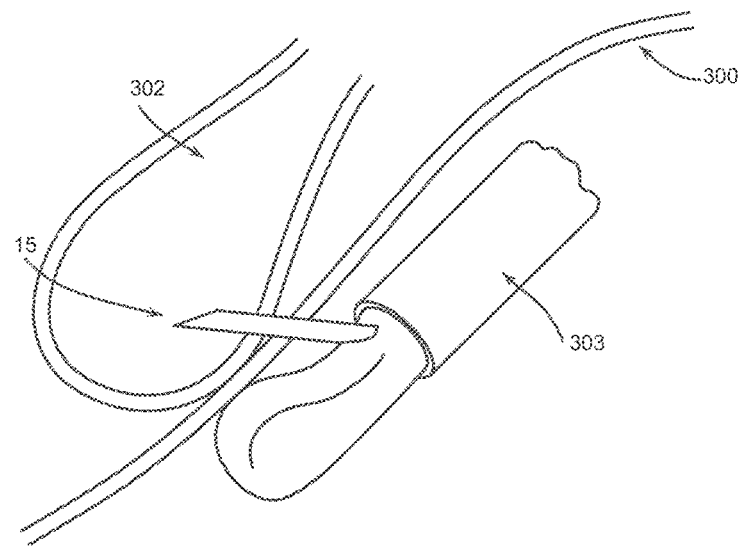
FIGS. 18A, 18B, 18C, 18D, 18E, and 18F illustrate a technique of accessing the gallbladder and delivering a pair of magnetic anastomosis devices for the formation of an anastomosis between the gallbladder tissue and adjacent tissue.

FIG. 18A illustrates an EUS scope 303 accessing the stomach 300/duodenum 301 and a monopolar energy tip 304 piercing the stomach 300/duodenum 301 tissue 26 into the gallbladder 302 tissue 22 in order to deliver an anastomosis device therein.

Figure 18B:
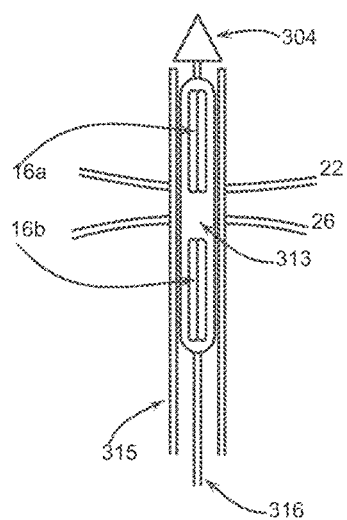

FIG. 18B illustrates a cutaway view of the delivery device 15. The monopolar energy tip 304 pierces the stomach 300/duodenum 301 tissue 26 into the gallbladder 302 tissue 22. The device 15 is positioned within the enterotomy between the tissues. Within the delivery device 15, the magnetic anastomosis devices 16a, 16b are collapsed within a balloon catheter 313 within a sheath 315 in the delivery device 15. A conductor 316 is utilized to later remove the sheath 315 and stabilize the balloon catheter 313 in place.

Figure 18C:
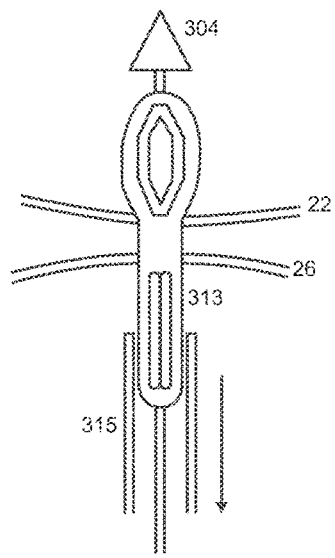

FIG. 18C illustrates the sheath 315 being removed from the balloon catheter 313 to position and inflate the catheter 313 within the enterotomy.

Figure 18D:
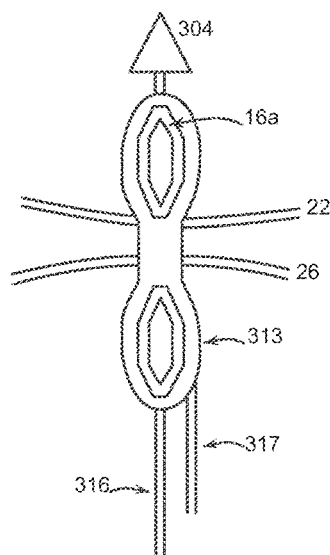

FIG. 18D illustrates the sheath 315 being fully removed and the balloon catheter 313 being inflated by an inflation line 317. The once compressed anastomosis devices 16a, 16b expand within the lumens.

Figure 18E:
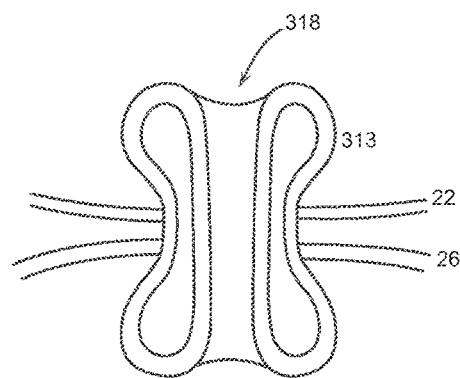

FIG. 18E illustrates a cross-section of the fully inflated balloon catheter 313. The "donut" shaped balloon has a thin inner hole or inner channel 318 to allow fluid or other material to flow through an anastomosis.

Figure 18F:
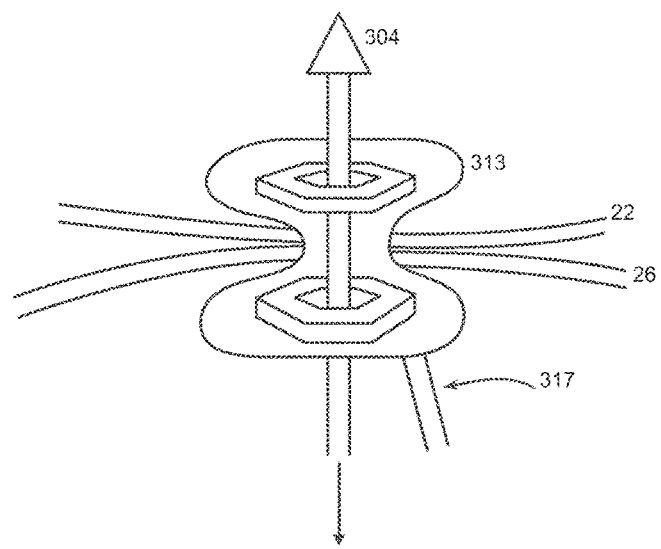

FIG. 18F illustrates a fully deployed balloon catheter 313 being inflated by an inflation line 317. When the balloon 313 is fully inflated, the monopolar energy tip 304 is removed, leaving the catheter 313 and anastomosis device 16a, 16b.

Figure 19:
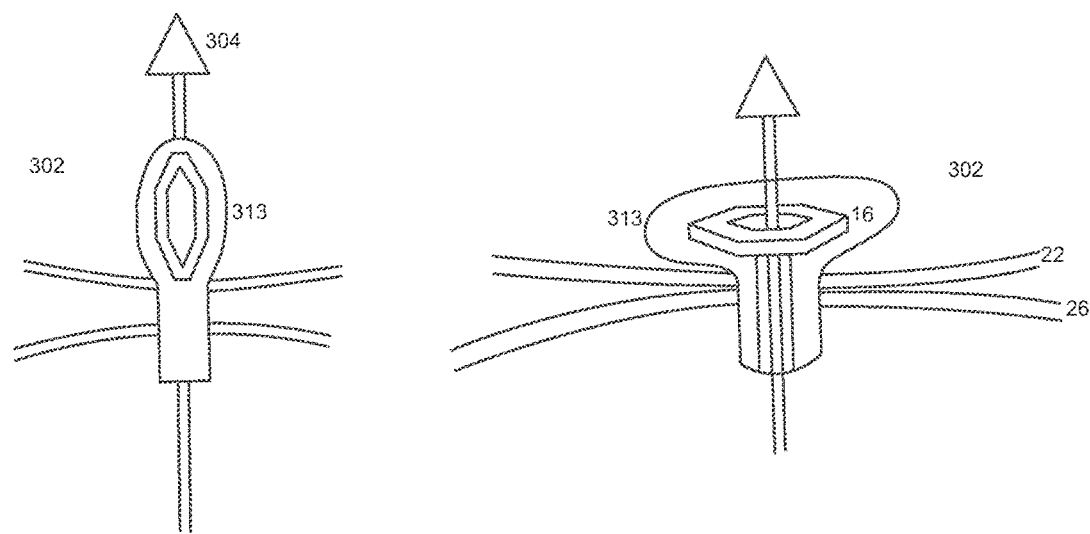
FIG. 19 illustrates a variation of design of FIGS. 18A-18F, specifically utilizing a balloon to deliver a single magnetic anastomosis device within the gallbladder, rather than delivering the pair.

FIG. 19 illustrates a variation of design of FIGS. 18A-18F, specifically utilizing a balloon 313 to deliver a single magnetic anastomosis device 16 within the gallbladder 302, rather than delivering the pair.

Figure 20A:
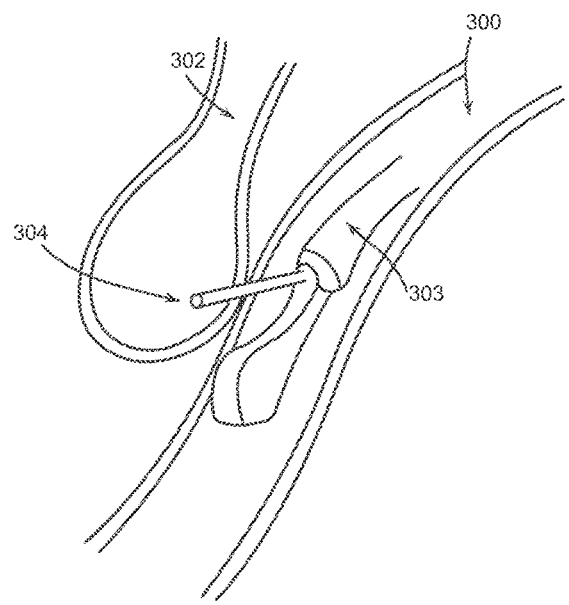
FIGS. 20A, 20B, and 20C illustrate a method of accessing the gallbladder, via endoscopic ultrasound guided access and utilizing a hot insertion tube emitting monopolar energy, and subsequently delivering a magnetic anastomosis device within the gallbladder via the hot tube.
Figure 20B:
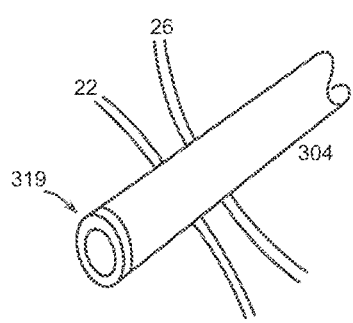
Figure 20C:
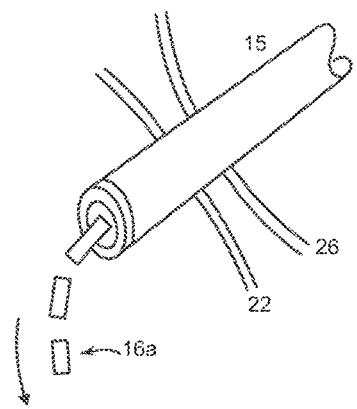

FIGS. 20A-20C illustrate a method of accessing the gallbladder 302, via endoscopic ultrasound guided access 303 and utilizing a hot insertion tube emitting monopolar energy 304, and subsequently delivering a magnetic anastomosis device 16 within the gallbladder 302 via the hot tube 304. As shown in FIG. 20B, a user need only activate monopolar energy to advance the insertion tube 304 into the gallbladder 302.

FIG. 20A illustrates an EUS scope 303 accessing the stomach 300/duodenum 301 and utilizing a hot insertion tube 304 to access the gallbladder 302 in order to deliver an anastomosis device 16 therein.

FIG. 20B illustrates the activation of a monopolar energy tip 319 to advance the insertion tube 304 to access the gallbladder 302.

FIG. 20C illustrates the distal tip of the delivery device 15 deploying the magnetic anastomosis device 16a.

FIGS. 21A-21E illustrate a method of accessing the gallbladder 302, via endoscopic ultrasound guided access 303 and utilizing an access device 14 having a conductor 316 including a "hot" tip emitting monopolar energy 304, anchoring the delivery device via the use of a malecot catheter 314, and subsequently utilizing the malecot catheter 314 as a conduit for delivering a magnetic anastomosis device 16a therethrough and into the gallbladder 302 while the malecot catheter 314 is anchored within the formed enterotomy between the gallbladder tissue 22 and adjacent tissue 26 (i.e., stomach or duodenum tissue).

FIG. 21A illustrates an EUS scope 303 accessing the stomach 300/duodenum 301 and utilizing a hot insertion tube 304 to access the gallbladder 302 in order to deliver an anastomosis 16a device therein.

FIG. 21B illustrates a method of accessing the gallbladder 302, via EUS guided access 303 and utilizing an access device 14 having a conductor 316 including a "hot" tip 304 emitting monopolar energy, anchoring the delivery device 15 via the use of a malecot catheter 314, and subsequently utilizing the malecot catheter 314 as a conduit for delivering a magnetic anastomosis device 16a therethrough and into the gallbladder 302 while the malecot catheter 314 is anchored within the formed enterotomy between the gallbladder tissue 22 and adjacent tissue 26 (i.e. stomach 300 or duodenum 301 tissue). The user pulls back on the access device 14 in order to open the magnets 16a, 16b (FIG. 21C), and advance the tip 304 (FIG. 21D).

Figure 21E:
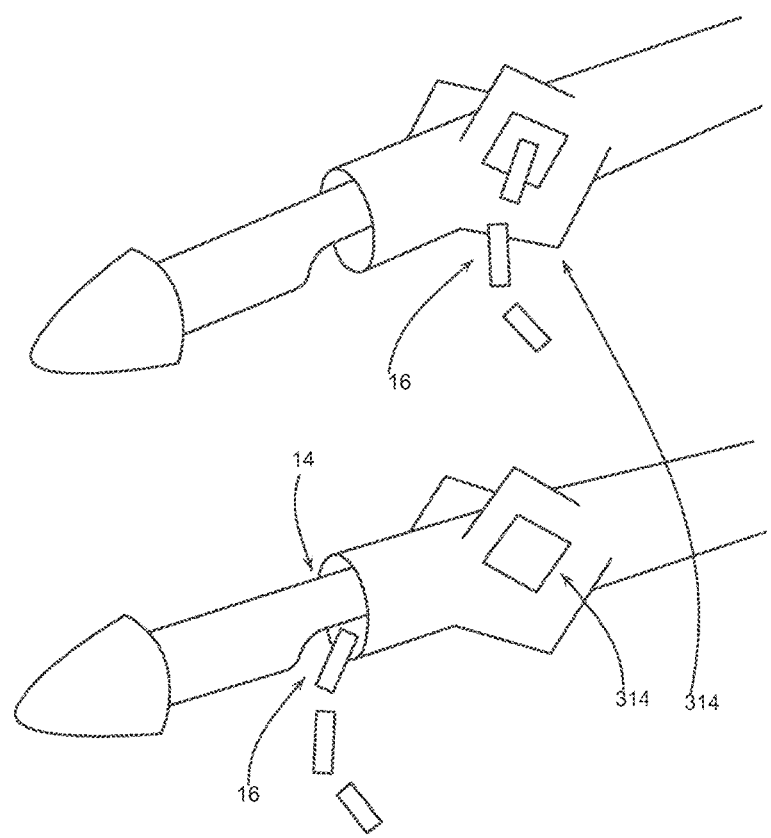

FIG. 21E illustrates that the magnetic anastomosis device 16 can be deployed through the end of the access device 14 or through a window in the catheter 314. In some embodiments, the window in the catheter 314 can be radio opaque in order to keep oriented properly.

FIGS. 22A-22C illustrate a variation of the procedure and devices illustrated in FIGS. 21A-21E in that the magnetic anastomosis device 16a is preloaded into a distal end of the malecot catheter 314 of the delivery device 15 resulting in delivery and deployment of the device 16a upon transitioning of the malecot 314 end into an anchored position.

FIG. 22A illustrates the magnetic anastomosis device 16a preloaded into a distal end of the malecot catheter 314 of the delivery device 15 with sutures 320 securing the magnet 16a within the delivery device 15.

FIG. 22B illustrates how a user pulls back on the sutures 320 resulting in delivery and deployment of the device 16a upon transitioning the malecot 314 end into an anchored position.

FIG. 22C illustrates how pushing the delivery device 15 forward cuts the sutures 320 in the malecot catheter's 314 windows.

Figure 23:
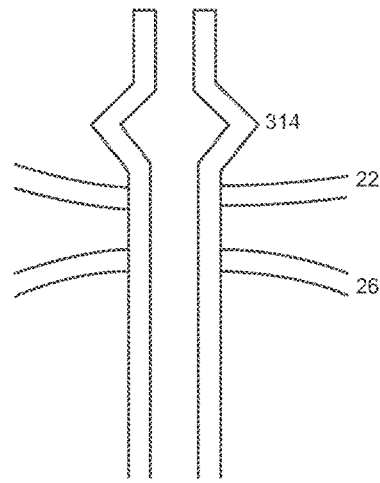
FIG. 23 illustrates a malecot catheter having a distal end that expands into the anchored position on one side of the gallbladder tissue wall.

FIG. 23 illustrates a malecot catheter 314 having a distal end that expands into the anchored position on one side of the gallbladder tissue wall 22.

Figure 24:
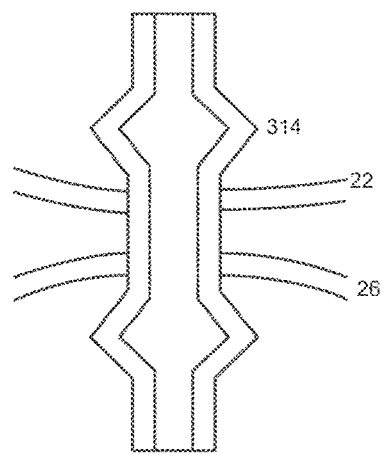
FIG. 24 illustrates a malecot catheter having a distal end that expands into the anchored position on both sides of the gallbladder tissue wall.

FIG. 24 illustrates a malecot catheter 314 having a distal end that expands into the anchored position on both sides of the gallbladder tissue wall 22. In both instances, a temporary malecot 314 may be placed inside of the gallbladder 302 to create a temporary conduit, which allows for drainage to occur immediately and could further allow for insufflation of the gallbladder 302 as well. It should be noted that, any of the embodiments that provide access from the GI tract into the gallbladder 302 (malecot 314, hot tube 305, nitinol coil 312, balloon 313, etc.), specifically any of the devices that creates a channel through which the magnetic anastomosis device 16 will pass, can also serve as a drainage channel. More specifically, after the access channel has been created, any fluid of material within the gallbladder 302 could be evacuated (either on its own or if suction is applied) before delivery of the magnetic anastomosis device 16 begins. The channel could also be used to push fluid into the gallbladder 302 prior to draining out the gallbladder (potentially doing the fill/drain cycle a number of times) in order to 'clean' out the gallbladder 302 in the event that the gallbladder 302 has excess fluid and contents within (i.e., bile or other contents).

FIGS. 25A-25E illustrate a method of accessing the gallbladder 302, via endoscopic ultrasound guided access needle access 303, anchoring the delivery device 15 via the use of a T-bar 310 assembly and stabilizer member 321, and subsequently delivering a magnetic anastomosis device 16 therethrough, via a deployment sheath 315, and into the gallbladder 302 while the T-bar 310 is anchored within the formed enterotomy between the gallbladder tissue 22 and adjacent tissue 26 (i.e., stomach 300 or duodenum 301 tissue).

As shown in FIG. 25A, the T-bar 310 is tethered to the gallbladder wall 22. The stabilizer member 321 is then advanced to the wall of the duodenum 301 or stomach 300 for traction, as shown in FIG. 25B. The deployment sheath 315 is then advanced into the gallbladder 302, at which point the magnetic anastomosis device 16a can be delivered, as illustrated in FIG. 25C.

FIG. 25C illustrates the stabilizer member 321. The stabilizer member 321 is advanced into the wall of the duodenum 301 or stomach 300 for traction. The deployment sheath 315 is then advanced into the gallbladder 302 as shown in FIG. 25D, at which point the magnetic anastomosis device 16a can be delivered. In some embodiments, the system can rotate in order to help deploy the magnetic anastomosis devices 16a, 16b.

Figure 25E:
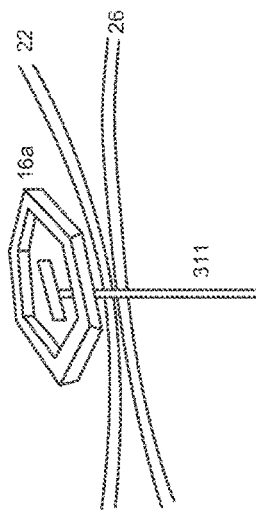
Figure 25D:
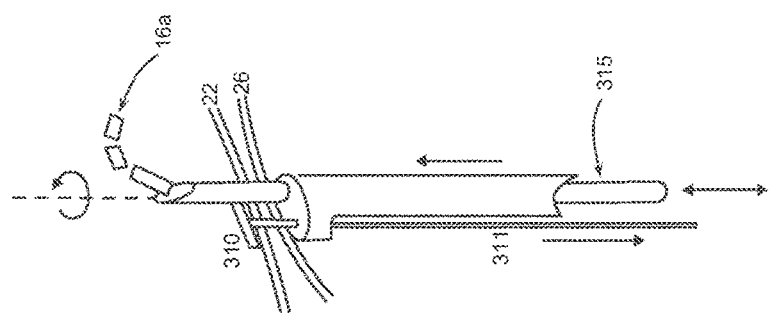

FIG. 25E illustrates the fully formed magnetic anastomosis device 16a surrounding the T-bar 310. In some embodiments, the T-bar 310 is metallic and can be attracted to and stick to the magnet 16a.

Figure 26C:
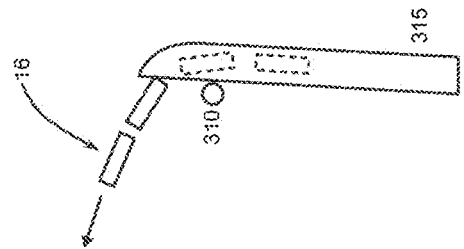
FIGS. 26A, 26B, 26C illustrate a variation of the procedure and devices illustrated in FIGS. 25A-25E in that the deployment sheath includes a notch on a distal end thereof configured to engage the T-bar upon advancement through the enterotomy, thereby pushing the T-bar to the side to allow for subsequent delivery and deployment of the magnetic anastomosis device.
Figure 26B:
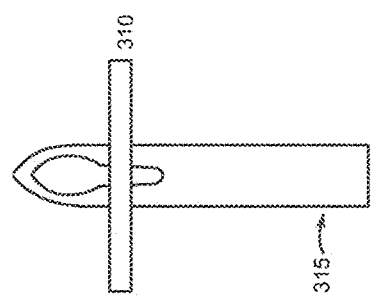
Figure 26A:
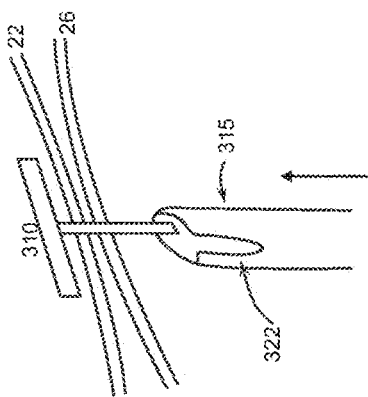

FIGS. 26A-26C illustrate a variation of the procedure and devices illustrated in FIGS. 25A-25E in that the deployment sheath 315 includes a notch 322 on a distal end thereof configured to engage the T-bar 310 upon advancement through the enterotomy, thereby pushing the T-bar 310 to the side to allow for subsequent delivery and deployment of the magnetic anastomosis device 16.

FIG. 26A illustrates that the deployment sheath 315 includes a notch 322 on a distal end thereof configured to engage the T-bar 310 upon advancement through the enterotomy.

FIG. 26B illustrates the notch 322 in the deployment sheath 315 pushing the T-bar 310 to the side to allow for subsequent delivery and deployment of the magnetic anastomosis device 16.

FIG. 26C illustrates the magnetic anastomosis device 16 being deployed with the T-bar 310 pushed to the side.

Figure 27C:
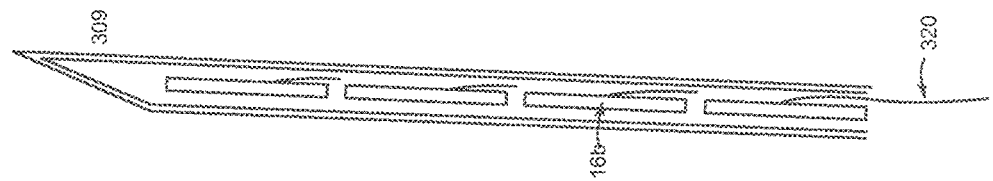
FIGS. 27A, 27B, and 27C illustrate another variation of the procedure and devices illustrated in FIGS. 25A-25E in that, rather than including a deployment sheath for delivering a self-assembling magnetic anastomosis device, as previously described herein, the assembly of FIGS. 27A-27C relies on the depositing of T-bars through an access needle, such that a grouping of T-bars are configured to self-assemble into an array and serve as the distal anastomosis device to correspondingly mate with a proximal magnetic anastomosis device positioned on the other side to subsequently compress tissue there between to form an anastomosis.
Figure 27B:
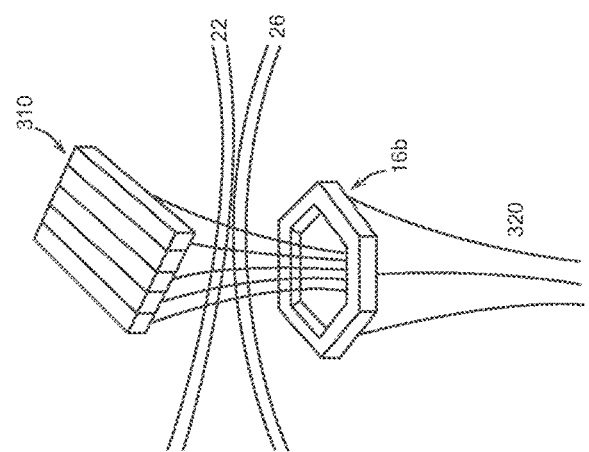
Figure 27A:
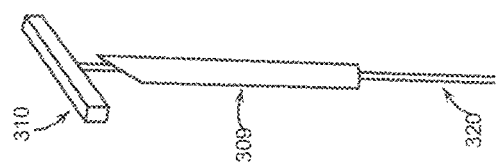

FIGS. 27A-27C illustrate another variation of the procedure and devices illustrated in FIGS. 25A-25E in that, rather than including a deployment sheath 315 for delivering a self-assembling magnetic anastomosis device 16, as previously described herein, the assembly of FIGS. 27A-27C relies on the depositing of T-bars 310 through an access needle 309, such that a grouping of T-bars 310 are configured to self-assemble into an array and serve as the distal anastomosis device 16a to correspondingly mate with a proximal magnetic anastomosis device 16b positioned on the other side to subsequently compress tissues 22, 26 there between to form an anastomosis.

FIG. 27A illustrates a T-bar 310 assembly being delivered through an access needle 309. In some embodiments the T-bars 310 are magnetic. By pulling back on the delivery device 14, a user is able to deploy the T-bar 310 in the lumen. The T-bar 310 is secured in place by sutures 320.

FIG. 27B illustrates a fully deployed array of T-bar 310 magnets. In this embodiment, the T-bars 310 are magnetic and able to attract to the proximal anastomosis device 16b. By pulling on the sutures 320, the user is able to bring the T-bar 310 array to the proximal anastomosis device 16b in order to create an anastomosis therein.

FIG. 27C illustrates the T-bar 310 array and sutures 320 loaded linearly into the access needle 309. Loading the T-bars 310 linearly allows for a minimally invasive creation of an anastomosis. Because the magnetic assemblies 310, 16b are loaded linearly and then self-assemble, the aspect ratio of the resulting anastomosis can be greater than 1:1 as the magnetic assemblies 310, 16b assemble to a size greater than the diameter of the access needle 309. This allows for the creation of larger anastomoses while still maintaining a minimally invasive procedure.

Figure 28A:
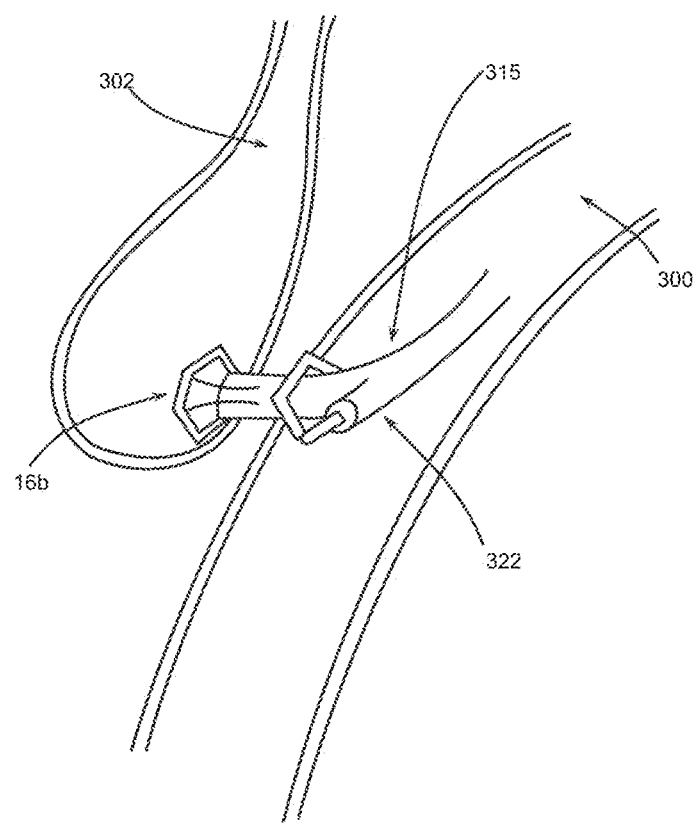
FIGS. 28A, 28B, and 28C illustrate a method of accessing the gallbladder, via endoscopic ultrasound guided access needle access, utilizing a side port deployment sheath for delivery and deployment of a pair of magnetic anastomosis devices.
Figure 28B:
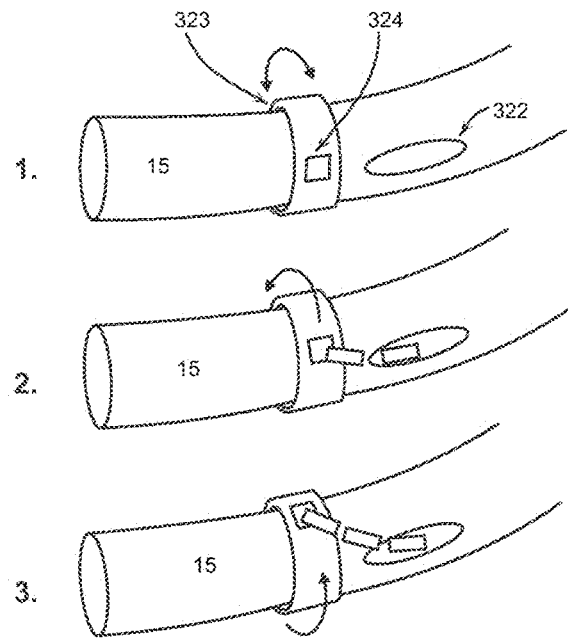
Figure 28C:
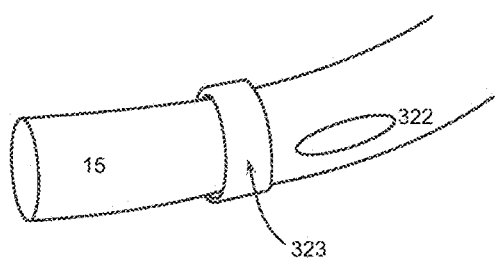

FIGS. 28A-28C illustrate a method of accessing the gallbladder 302, via endoscopic ultrasound guided access needle access 303, utilizing a side port deployment sheath 315 for delivery and deployment of a pair of magnetic anastomosis devices 16a, 16b.

FIG. 28A illustrates a method of accessing the gallbladder 302 in order to deploy a distal magnetic anastomosis device 16a. The delivery device 15 access the stomach 300/duodenum 301 and pierces through the stomach tissue wall 26 into the gallbladder 302. The delivery device 15 in this has a side port 322 for deployment of the proximal magnetic anastomosis device 16b.

FIG. 28B illustrates a rotating ring 323 with a metal insert 324 consistent with some embodiments of the invention. The rotating ring 323 is capable of rotating around the shaft of the delivery device 15. As the magnetic devices 16a, 16b are deployed from the side port 322 of the delivery device 15, the metal insert 324 on the rotating ring 323 catches the magnetic devices 16a, 16b and guides the magnets 16a, 16b out of the delivery device 15 and around the shaft of the delivery device 15 in order to aid self-assembly of the magnetic anastomosis devices 16a, 16b. The rotating ring 323 in some embodiments may be free spinning, or may rotate when the magnet 16 is pushed out of the delivery device 15. In some embodiments, the rotating ring 323 may be actively rotated to pull the magnetic device 16 out of the delivery device 15.

FIG. 28C is a close-up view of the rotating ring 323 on the shaft of the delivery device 15. The rotating ring 323 may be made out of metal in some embodiments.

Figure 29A:
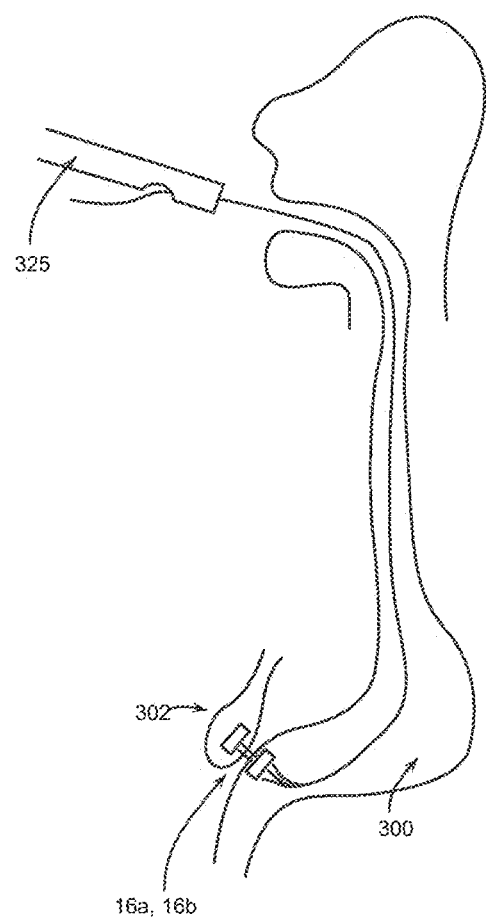
FIGS. 29A, 29B, and 29C illustrate a knotting member configured to secure already deployed and positioned magnetic anastomosis devices to the target site tissues and subsequently cut guide elements or sutures coupled thereto.
Figure 29B:
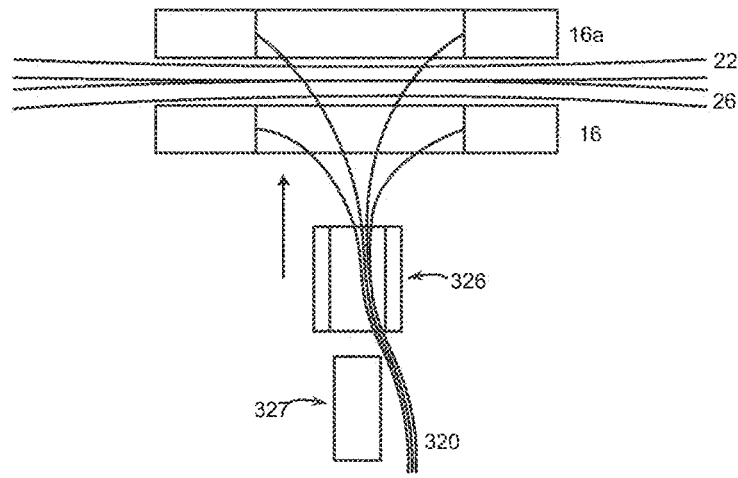
Figure 29C:
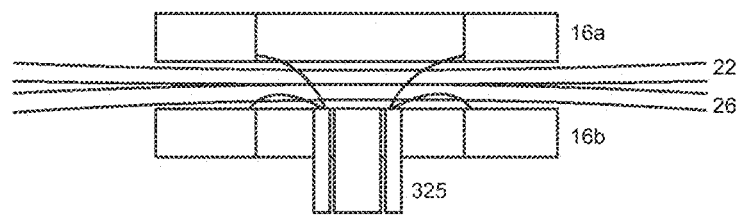

FIGS. 29A-29C illustrate a knotting member 325 configured to secure already deployed and positioned magnetic anastomosis devices 16a, 16b to the target site tissues 22, 26 and subsequently cut guide elements or sutures 320 coupled thereto. As shown in FIG. 29A, the knotting member 325 is advanced over guide elements 320 within a working channel of a scope 14. The guide elements 320 are positioned through the patient 12 to the stomach 300 and connected to the previously positioned anastomosis devices 16a, 16b in the gallbladder 302 and stomach 300.

As shown in FIG. 29B, the knotting member 325 advances towards the magnetic anastomosis devices 16a, 16b, wherein the knotting member 325 generally consists of an outer tube member 326 and an inner rod member 327, such that, upon reaching the devices 16a, 16b, the inner rod 327 member can be pressed towards a distal end of the outer tube member 326, thereby securing a portion of the guide elements 320 there between and further cutting the guide elements 320 in the process.

FIG. 29C illustrates the knotting member 325 being fully advanced to the magnetic anastomosis devices 16a, 16b thereby securing the guide elements 320 and further cutting the guide elements 320.

FIGS. 30A-30D illustrate a method of accessing the gallbladder 302, via endoscopic ultrasound guided access needle access 303, and delivering a magnetic coil 308 or ring configured to transition from a substantially linear shape to a substantially annular shape upon delivery into the gallbladder 302 and is configured to serve the distal anastomosis device to correspondingly mate with a proximal magnetic anastomosis device 16b positioned on the other side to subsequently compress tissue 22, 26 therebetween to form an anastomosis.

Figure 30A:
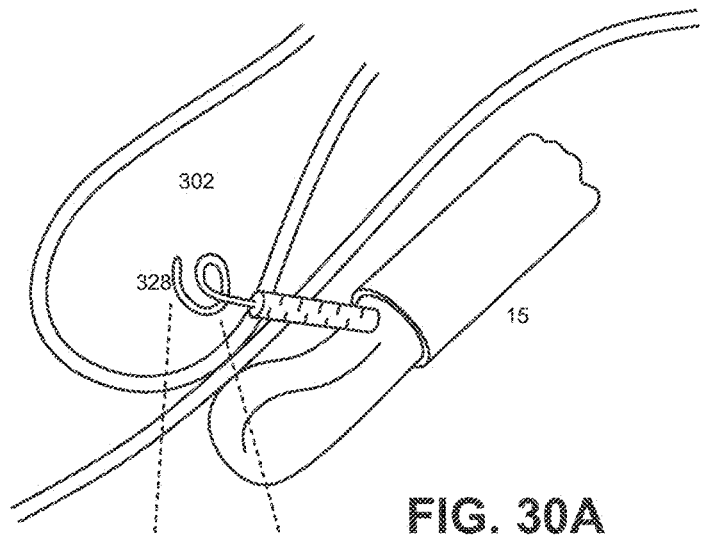
FIGS. 30A, 30B, 30C, and 30D illustrate a technique of accessing the gallbladder and delivering a pair of magnetic anastomosis devices for the formation of an anastomosis between the gallbladder tissue and adjacent tissue.
Figure 30B:
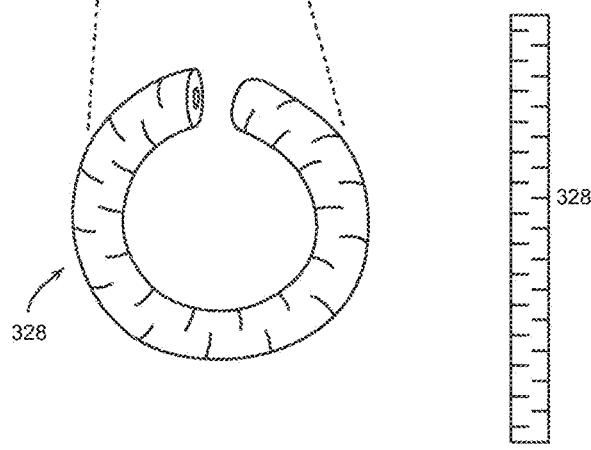

FIG. 30A illustrates a delivery device 15 accessing the stomach 10 and deploying through the stomach tissue wall 26 into the gallbladder 302 a magnetic coil 328 or ring to serve as the distal anastomosis device.

FIG. 20B illustrates a close-up view of the magnetic coil 328 or ring in the annular and straight positions. The magnetic device 328 is loaded into the delivery device 15 in the straight position. Once deployed, the magnetic device 328 self-assembles into a coil or ring shape in order to serve as the distal magnetic anastomosis device. In some embodiments, the coil 328 is a laser cut hypotube, allowing the magnetic device 328 to flex.

Figure 30C:
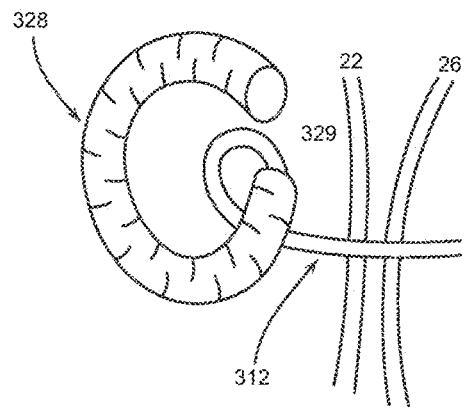

FIG. 30C illustrates a hypotube magnetic device 328 being deployed into the distal lumen 329 via a nitinol or pigtail wire 312. The nitinol wire 312 pierces through the stomach tissue wall 26 into the gallbladder 302 to deliver the distal anastomosis device, in this embodiment a magnetic hypotube 328.

Figure 30D:
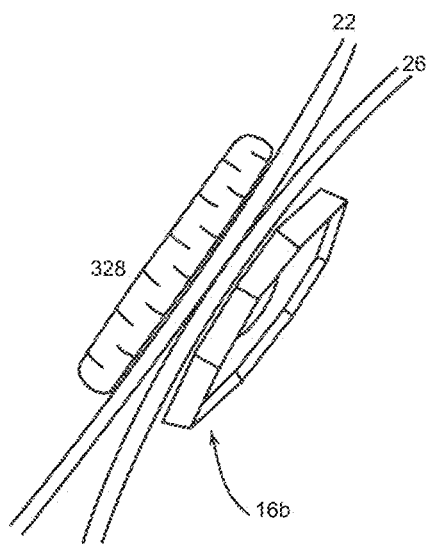

FIG. 30D illustrates a proximal magnet 16b mating with the magnetic hypotube 328. Once deployed, the hypotube 328 self-assembles into an annular shape. Due to corresponding polarities in the proximal 16b and distal 328 magnets, the magnets 16b, 328 mate and compress the tissue 22, 26 therebetween, forming an anastomosis.

Figure 31A:
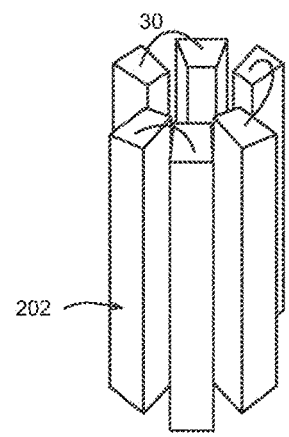
FIGS. 31A and 31B illustrate a set of magnetic segments prepackaged in an unstable polarity including a plurality of guide elements, tethers, or sutures coupling adjacent segments to one another to assist in self-assembly of the magnetic segments into a polygon deployed shape.
Figure 31B:
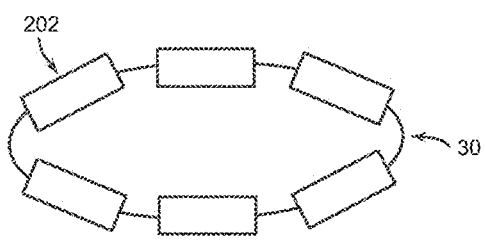

FIGS. 31A and 31B illustrate a set of magnetic segments 202, 204 prepackaged in an unstable polarity including a plurality of guide elements 30, tethers, or sutures 320 coupling adjacent segments to one another to assist in self-assembly of the magnetic segments into a polygon deployed shape.

FIG. 31A illustrates a set of magnetic segments 202, 204 prepackaged in an unstable polarity including a plurality of guide elements 30, tethers, or sutures 320 coupling adjacent segments 202, 204 to one another to assist in self-assembly of the magnetic segments 202, 204 into a polygon deployed shape.

FIG. 31B illustrates a self-assembled magnetic anastomosis device 16. Upon deployment from the delivery device 15, the magnetic anastomosis device 16 self-assembles into a polygon shape. The magnetic segments 202, 204 are help in a polygon deployed shape by the guide elements 30.

Figure 32A:
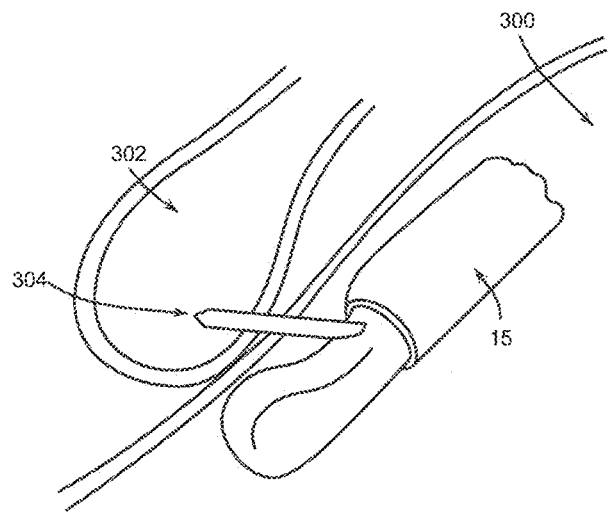
FIGS. 32A and 32B illustrate a method of accessing the gallbladder, via endoscopic ultrasound guided access and utilizing an access device having a conductor including a "hot" tip emitting monopolar energy, and subsequently delivering the prepackaged magnetic segments of FIGS. 31A and 31B into the gallbladder by way of a sheath.
Figure 32B:
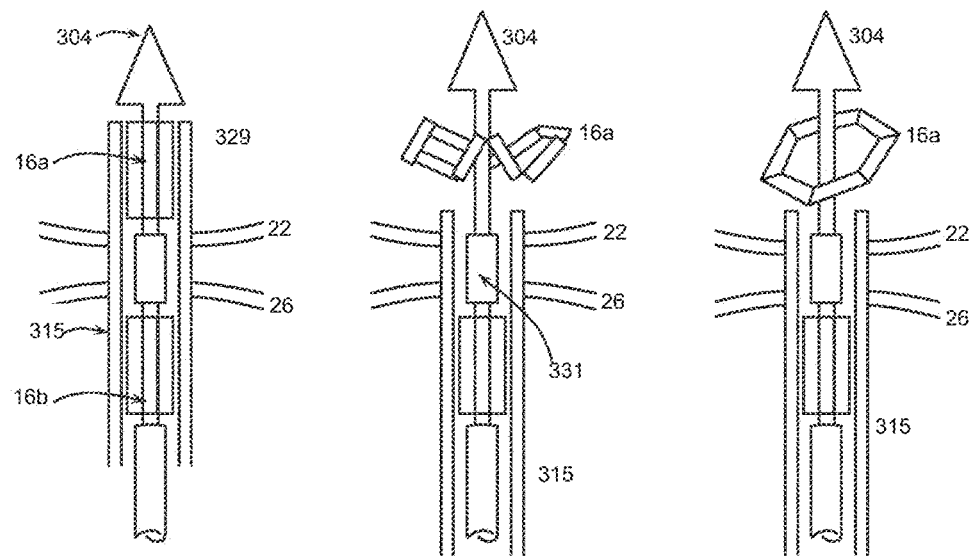

FIGS. 32A and 32B illustrate a method of accessing the gallbladder 302, via endoscopic ultrasound guided access 303 and utilizing an access device 15 having a conductor including a "hot" tip 304 emitting monopolar energy, and subsequently delivering the prepackaged magnetic segments 202, 204 of FIGS. 31A-31B into the gallbladder 302 by way of a sheath 315.

FIG. 32A illustrates an EUS scope 303 guided into the stomach 300. The scope 303 deploys a "hot" tip 304 that utilizes monopolar energy to pierce through the tissue 26 of the stomach 300 and into the gallbladder 302 by way of a sheath 315.

FIG. 32B illustrates a close-up view of the "hot" tip 304 deployment mechanism. The "hot" tip 304 utilizing monopolar energy pierces the stomach tissue 26 into the gallbladder 302. The distal magnet 16a, a spacer 331, and the proximal magnet 16b are loaded into the sheath 315. The user pulls back on the delivery device 15 and the distal magnet 16a is deployed and self-assembles in the distal lumen 329.

Figure 33A:
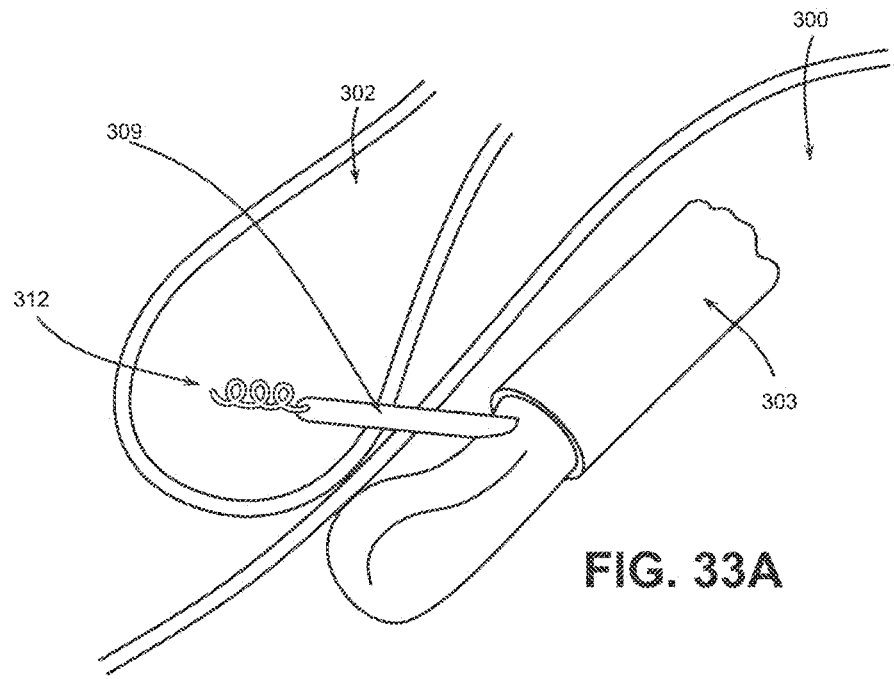
FIGS. 33A, 33B, and 33C illustrate a method of accessing the gallbladder, via endoscopic ultrasound guided access and utilizing a needle for access into the gallbladder, and subsequent delivery of a coiled stack of magnetic segments configured to serve the distal anastomosis device to correspondingly mate with a proximal magnetic anastomosis device positioned on the other side to subsequently compress tissue there between to form an anastomosis.
Figure 33B:
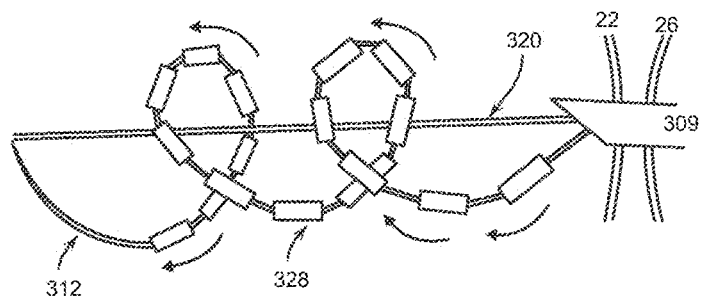
Figure 33C:
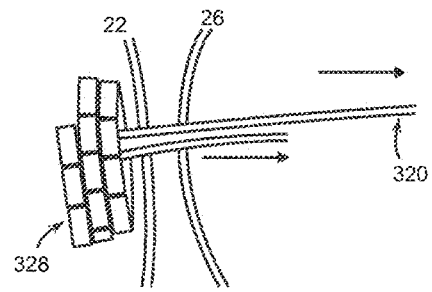

FIGS. 33A-33C illustrate a method of accessing the gallbladder 302, via endoscopic ultrasound guided access 303 and utilizing a needle 309 for access into the gallbladder 302, and subsequent delivery of a coiled stack of magnetic segments 328 configured to serve the distal anastomosis device to correspondingly mate with a proximal magnetic anastomosis device 16b positioned on the other side to subsequently compress tissue there between to form an anastomosis. As shown in FIG. 33A, the nitinol coil 312 is advanced into the gallbladder 302. The magnetic segments 328 are then advanced around the extended nitinol coil 312, as shown in FIG. 33B. Upon pulling a suture 320, as shown in FIG. 33C, the magnetic segments 328 collapse upon one another (due to magnetic attraction forces) and form a coiled stack of magnets upon removal of the nitinol coil.

Figure 34A:
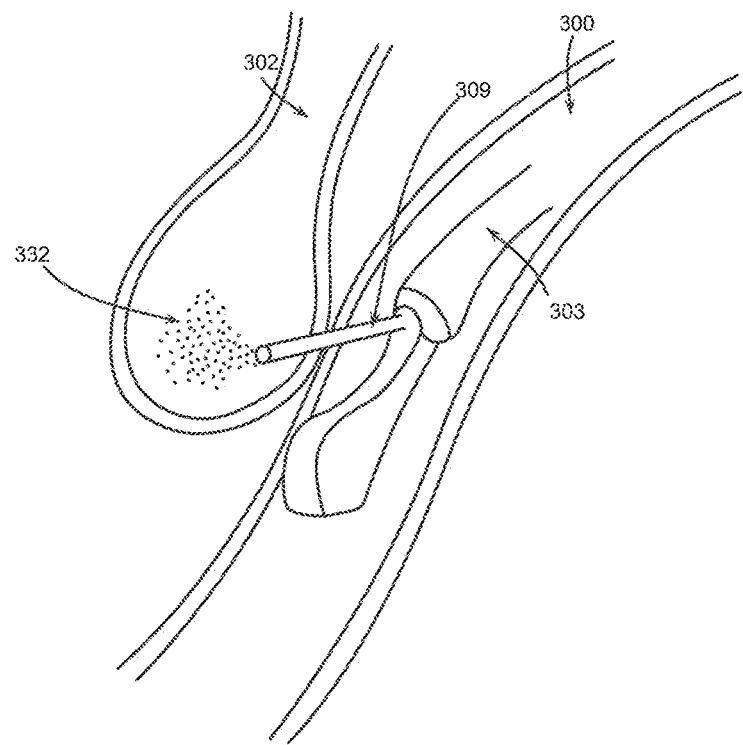
FIGS. 34A and 34B illustrate a technique of accessing the gallbladder and delivering a pair of magnetic anastomosis devices for the formation of an anastomosis between the gallbladder tissue and adjacent tissue.
Figure 34B:
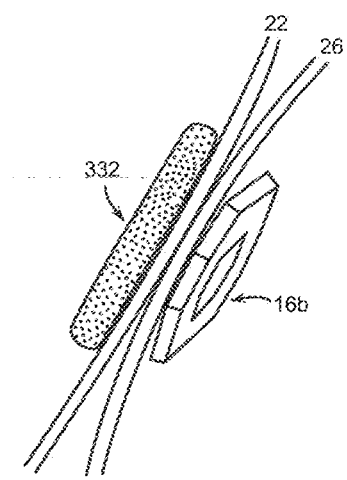

FIGS. 34A-34B illustrate a method of accessing the gallbladder 302, via endoscopic ultrasound guided access 303 and utilizing a needle 309 for access into the gallbladder 302, and subsequent delivery of a magnetic fluid 332 or suspension of magnetic particles into the gallbladder 302 configured to serve as the distal anastomosis device to correspondingly mate with a proximal magnetic anastomosis device 16b positioned on the other side to subsequently compress tissue 22, 26 there between to form an anastomosis.

FIG. 34A illustrates an EUS scope 303 accessing the stomach 300. An access needle 309 having piercing capabilities pierces the stomach tissue 26 into the gallbladder 302 to deliver magnetic fluid or particles 332 into the gallbladder 302.

FIG. 34B illustrates that when in proximity to the proximal magnet 16b, the magnetic particles 332 will attract to the proximal magnet 16b, compressing the tissue 22, 26 therebetween and form an anastomosis.

Figure 35:
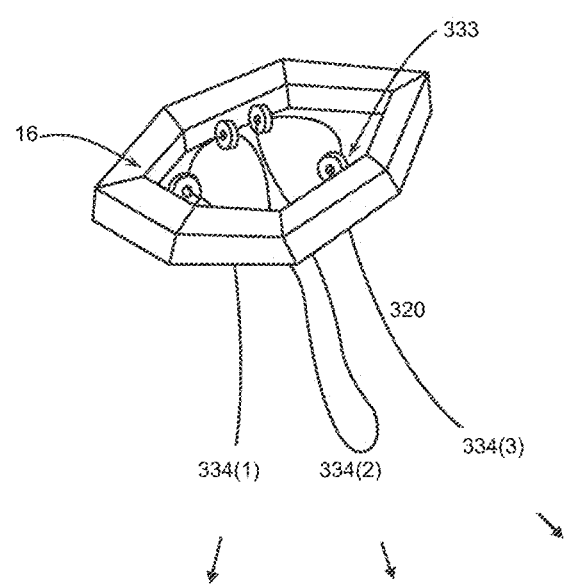
FIG. 35 illustrates a magnetic anastomosis device comprising a continuous guide element or suture that is coupled to a plurality of the magnetic segments of the device by way of eyelets positioned on each of the plurality of magnetic segments.

FIG. 35 illustrates a magnetic anastomosis device 16 comprising a continuous guide element 30 or suture 320 that is coupled to a plurality of the magnetic segments 202, 204 of the device by way of eyelets 333 positioned on each of the plurality of magnetic segments 202, 204. The magnets 16 have eyelets 333 on the inside circumference in order to prevent sutures 320 from getting trapped or pinched between magnets 16. The sutures 320 run through the eyelets 333 and have a plurality of legs 334(1)-(3) that can be pulled by the user either individually or simultaneously for manipulation of the magnet 16. Legs 334(1) and 334(3) may be pulled individually for removal of the sutures 320.

Figure 36:
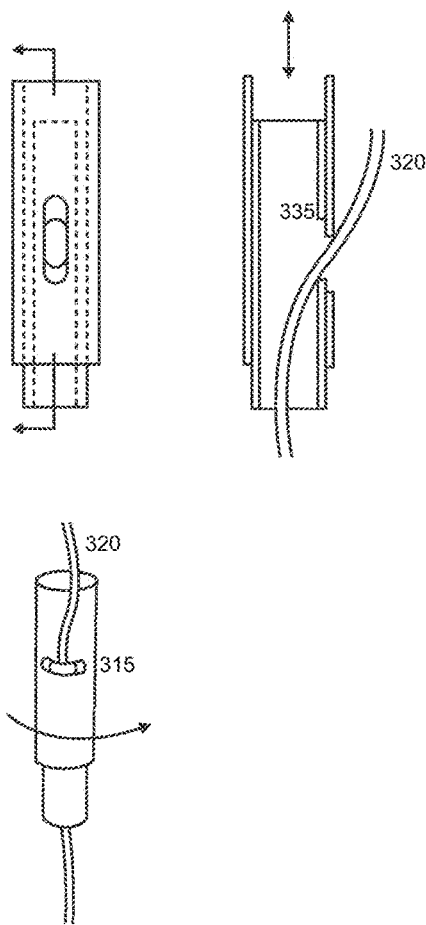
FIG. 36 illustrates one embodiment of a suture cutting arrangement within a deployment sheath of the delivery device, or a secondary device, for cutting the sutures coupled to the magnetic anastomosis devices.

FIG. 36 illustrates one embodiment of a suture 320 cutting arrangement within a deployment sheath 315 of the delivery device 15, or a secondary device, for cutting the sutures 320 coupled to the magnetic anastomosis devices 16a, 16b. The user pushes/pulls on the delivery device 15 in order to expose an anvil 335 and sharp 336 edge for cutting sutures 320. Pulling the sutures 320 with tension over the anvil 335 and sharp 336 edges severs the sutures 320. In another embodiment, the user may twist the delivery device 15 in order to expose a sharp edge for cutting the sutures 320.

Figure 37A:
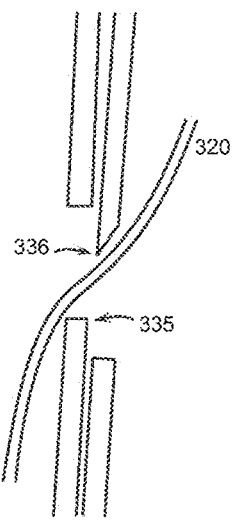
FIGS. 37A and 37B are enlarged side views illustrating an anvil/sharp arrangement and a sharp/sharp arrangement for cutting sutures.
Figure 37B:
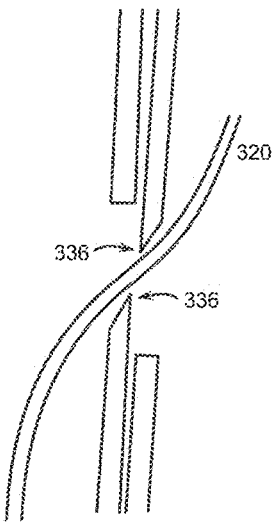

FIGS. 37A and 37B are enlarged side views illustrating an anvil 335/sharp 336 arrangement and a sharp 336/sharp 336 arrangement for cutting sutures 320.

FIG. 37A illustrates the deployment sheath 315 utilizing a push/pull guillotine method to bring together an anvil 335/sharp 336 system to cut the sutures 320. A knife edge is exposed by pushing on the deployment sheath 315 and pulling the sutures 320, introducing tension to the sutures 320. The tensed sutures 320 are then pulled over the sharp edges 336 and cut.

FIG. 37B illustrates a sharp 336/sharp 336 system wherein a knife edge is exposed by pushing on the deployment sheath 315 and pulling the sutures 320 to introduce tension. The tensed sutures 320 are then pulled over the sharp edges 336 and cut.

Figure 38:
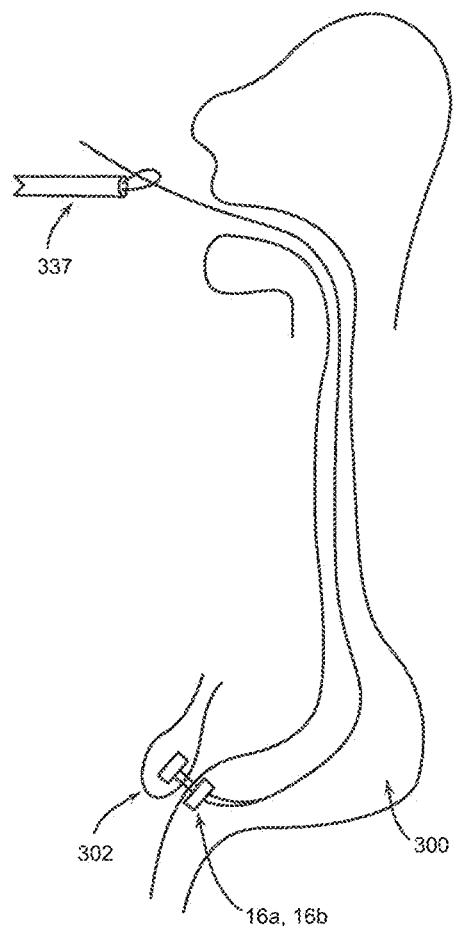
FIG. 38 illustrates a snare device (secondary device) configured to be inserted over the guide elements or sutures coupled to the magnetic anastomosis devices and configured to cut said sutures or guide elements once they have been deployed and positioned at a target site.

FIG. 38 illustrates a snare device 337 (secondary device) configured to be inserted over the guide elements 30 or sutures 320 coupled to the magnetic anastomosis devices 16a, 16b and configured to cut said sutures 320 or guide elements 30 once they have been deployed and positioned at a target site.

Figure 39A:
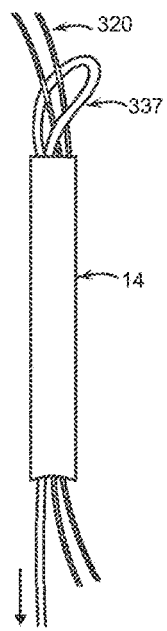
FIG. 39A illustrates a snare device comprising a resistive heating element for cutting guide elements.

FIG. 39A illustrates a snare device comprising a resistive heating element for cutting guide elements. The snare device 337 is guided through the support tube of the access device 14. Once the snare device 337 is in place over the sutures 320, the snare device 337 is pulled back and energy is applied to cut the sutures 320. The energy applied may be low voltage from a battery or generator.

Figure 39B:
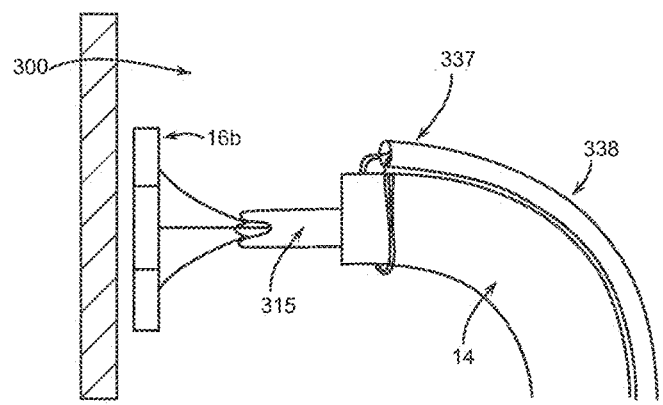
FIGS. 39B and 39C illustrate a snare device comprising a ring member having a cutting edge for cutting guide elements.
Figure 39C:
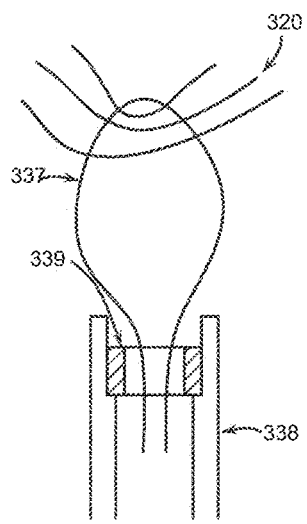

FIGS. 39B and 39C illustrate a snare device comprising a ring member having a cutting edge for cutting guide elements 30.

FIG. 39B illustrates the snare device 337 positioned on the outside of a scope 14, though it may be incorporated into a scope cap, within a snare sleeve 338 advanced into the stomach 300. By pulling back on the scope 14, the user may advance the snare device 337 onto the sutures 320 attached to a deployed magnet 16 by a deployment means 315 and cut the sutures 320.

FIG. 39C illustrates a cross-section of the snare device 337 comprising a ring member 339 having a cutting edge for cutting sutures 320. By pulling back on the snare sleeve 338, the ring 339 with a cutting edge cuts the sutures 320.

Figure 39D:
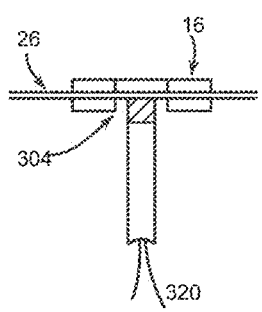
FIG. 39D illustrates a secondary device configured to provide suture or guide element cutting by way of monopolar/bipolar energy.

FIG. 39D illustrates a secondary device configured to provide suture 320 or guide element 30 cutting by way of monopolar/bipolar energy. A monopolar tip 304 is advanced toward the tissue 26 and cuts the sutures 320 attached to the deployed magnetic anastomosis device 16.

Figure 40:
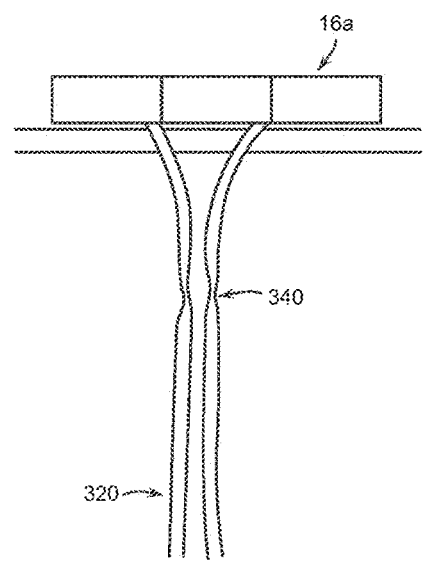
FIG. 40 illustrates breakaway guide elements or sutures.

FIG. 40 illustrates breakaway guide elements 30 or sutures 320. In an exemplary embodiment, the sutures have a necked down or weakened area 340. By pulling back on the sutures 320, the sutures 320 will break away from the deployed anastomosis device 16.

Figure 41:
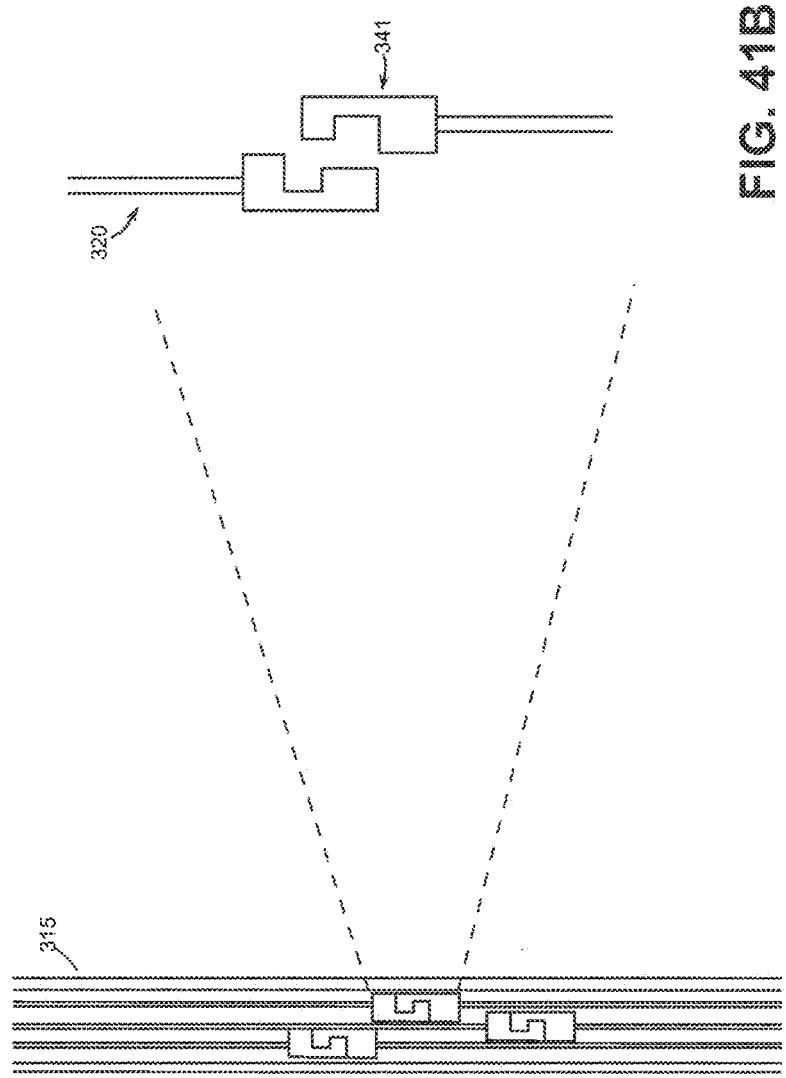
FIGS. 41A and 41B illustrate a detachable suture assembly.

FIGS. 41A and 41B illustrate a detachable suture assembly. Within the sheath 315 there are constrained overmolded drivers 341 attached to the sutures 320. The drivers 341 can be staggered to fit in the sheath 315 as shown in FIG. 41A or could be in individual lumens. By removing the sheath 315, the overmolded drivers 341 are no longer constrained and detach as seen in FIG. 41B.

Accordingly, exemplary embodiments provide improved devices and techniques for minimally invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer. More specifically, exemplary embodiments provide various systems, devices, and methods for the delivery, deployment, and positioning of magnetic compression devices at a desired site so as to improve the accuracy of anastomoses creation between tissues, organs, or the like.

Figure 42:
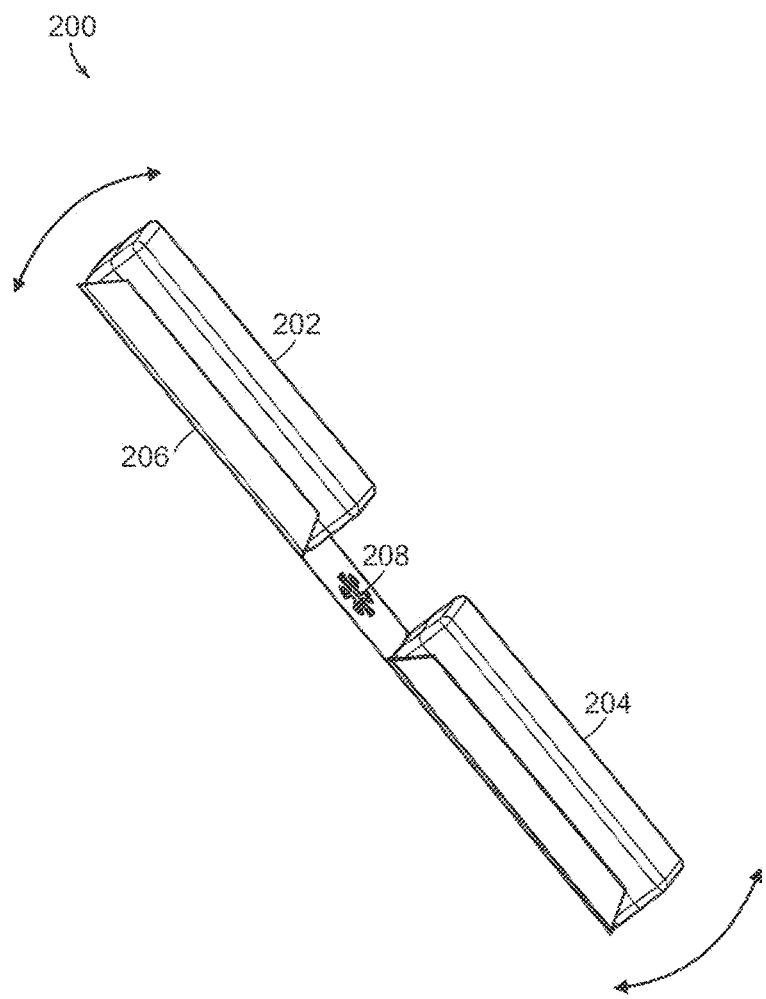
FIG. 42 illustrates a perspective view of another embodiment of a magnetic assembly consistent with the present disclosure.

FIG. 42 illustrates a perspective view of another embodiment of a magnetic assembly 200 consistent with the present disclosure. The magnetic assembly 200 comprises a pair of magnetic segments 202, 204 generally arranged in a linear alignment with one another (e.g., aligned in an end-to-end fashion) and coupled together via a flexible exoskeleton element 206. The segments 202, 204 are spaced apart via a central portion 108 of the exoskeleton 206. The central portion 208 may include a connection member for receiving a corresponding connection member of a placement device to assist in delivery of the magnetic assembly 200, as will be described in greater detail herein. The exoskeleton may be made from a resilient material that will retain its shape after deformation, such as a polymer or metal alloy. In some embodiments, the metal alloy will comprise nickel, such as nitinol. Exemplary exoskeleton embodiments are described in U.S. Pat. Nos. 8,870,898, 8,870,899, 9,763,664, the contents of each of which are incorporated by reference herein in their entirety.

The magnetic assembly 200 is configured to be delivered and deployed at a target site via a delivery device 100. As previously described, exemplary embodiments provide improved devices and techniques for minimally-invasive formation of anastomoses within the body, e.g., the gastrointestinal tract. Such devices and techniques facilitate faster and less-expensive treatments for chronic diseases such as obesity and diabetes. Such techniques also reduce the time and pain associated with palliative treatments for diseases such as cancers, such as stomach or colon cancer. More specifically, exemplary embodiments provide a system including a delivery device 100 for introducing and delivering, via a minimally-invasive technique, a pair of magnetic assemblies between adjacent organs to bridge walls of tissue of each organ together to thereby form a passage therebetween (i.e., an anastomosis). The delivery device 100 is particularly useful in delivering the pair of magnetic assemblies to a target site within the gastrointestinal tract to thereby form anastomosis between gastric and gallbladder walls to provide adequate drainage from the gallbladder when blockage is occurring (due to disease or other health-related issues).

FIGS. 43A-43I illustrate various steps in deploying a pair of magnetic assemblies 200a, 200b to a target site for subsequent formation of anastomosis. In the embodiments described herein, the system generally includes a single scope, such as an endoscope, laparoscope, catheter, trocar, or other access device, through which a delivery device is advanced to a target site for delivering and positioning a pair of magnetic assemblies 200a, 200b for subsequent formation of anastomosis at the target site. In particular, the delivery device 100 comprises an elongate hollow body 102, such as a catheter, shaped and/or sized to fit within the scope. The delivery device includes a working channel in which a pair of magnetic assemblies 200a, 200b is loaded. The delivery device further includes a distal end 104 configured to pierce, or otherwise penetrate, through tissue.

Figure 43A:
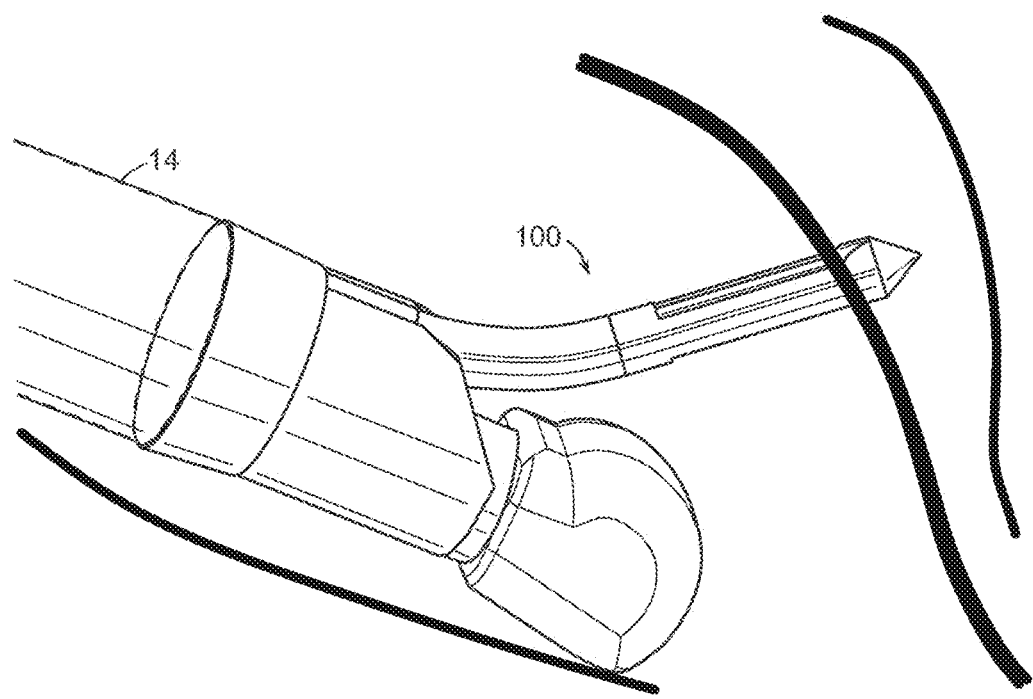
FIG. 43A illustrates advancement of a distal tip of a delivery device through respective tissue walls of adjacent organs at a target site for subsequent formation of an anastomosis therebetween.
Figure 43B:
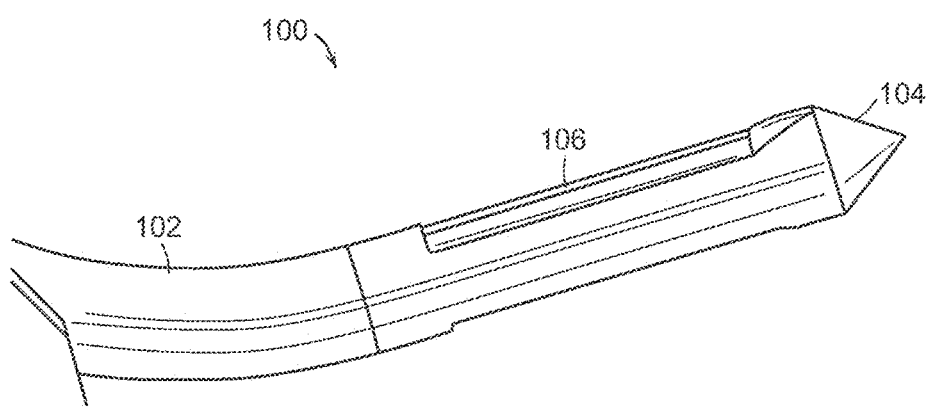
FIG. 43B is an enlarged view of a distal end of the delivery device illustrating the slot extending entirely through a side of the body of the delivery device.

For example, FIG. 43A illustrates advancement of a distal tip of a delivery device 100 through respective tissue walls of adjacent organs at a target site for subsequent formation of an anastomosis therebetween. For example, the distal end 104 may have a sharp tip for piercing tissue and/or may utilize energy to penetrate through tissue (i.e., a hot tip). The body 102 of the delivery device 100 further includes a slot or opening 106 adjacent to the distal end 104, as shown in FIG. 43B. As shown, the slot extends entirely through a side of the body 102 of the delivery device 100. The slot 106 is shaped and/or sized to receive the magnetic assemblies 200a, 200b therethrough, such that the magnetic assemblies 200a, 200b pass through the working channel and exit the delivery device 100 via the slot 106. The delivery device 100 further includes a placement member 108, generally in the form of a wire or the like, that is releasably coupled to one or both of the magnetic assemblies 200a, 200b and provides a means of deploying the magnetic assemblies 200a, 200b from the distal end of the delivery device 100 via the slot 106.

Figure 43C:
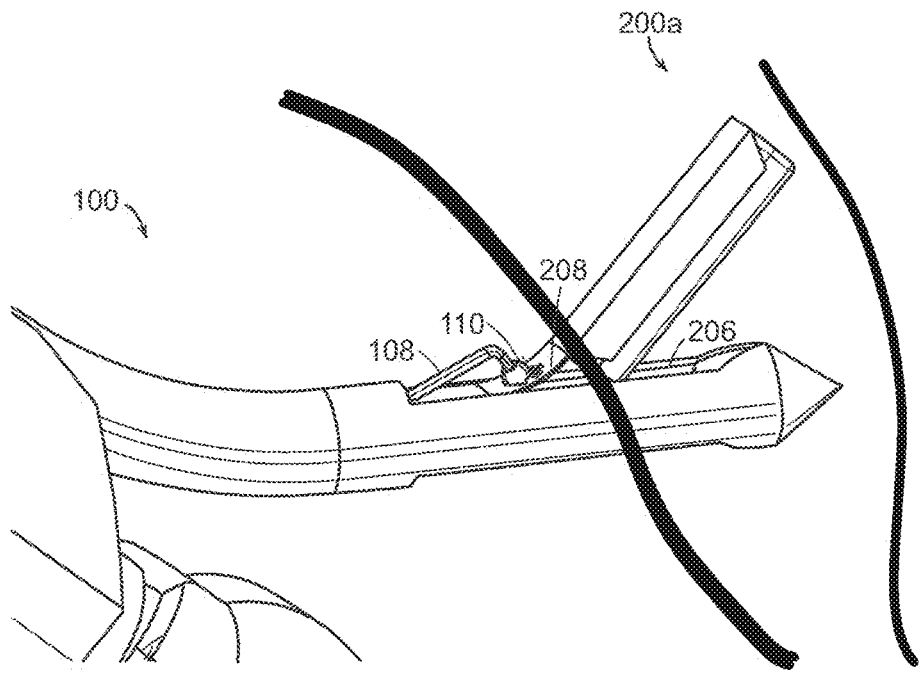
FIG. 43C illustrates delivery of a first magnetic assembly into a first organ.
Figure 43D:
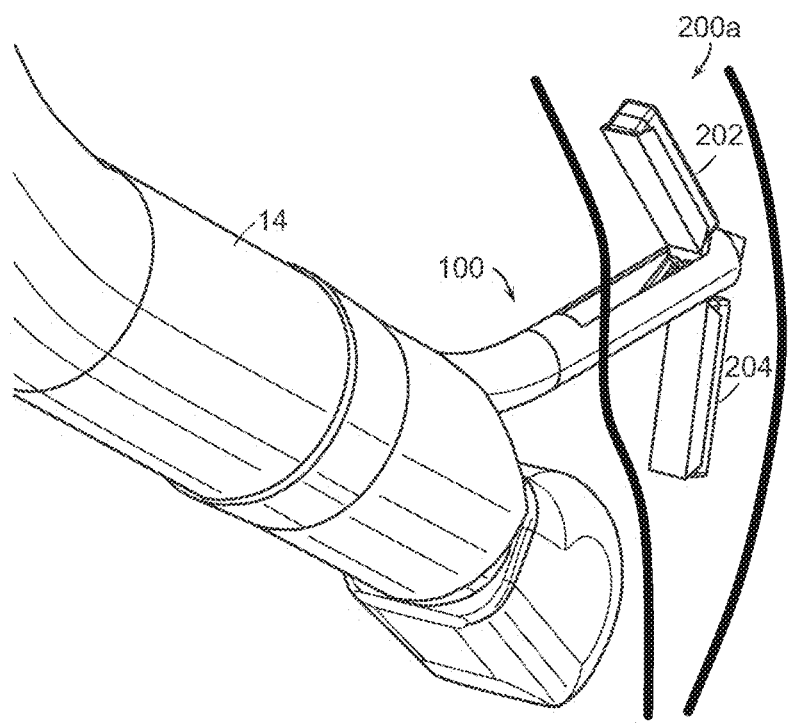
FIG. 43D illustrates deployment of the first magnetic assembly into the first organ while remaining retained within the slot of the delivery device.

During a procedure, a surgeon or other trained medical professional may advance a scope (e.g., endoscope) within a hollow body of the patient and position the scope at a desired anatomical location for formation of the anastomosis based on a visual depiction of the location of the target site as provided by an imaging modality providing a medical imaging procedure (e.g., ultrasound (US), wavelength detection, X-ray-based imaging, illumination, computed tomography (CT), radiography, and fluoroscopy, or a combination thereof). The surgeon may advance the distal tip 104 of the delivery device 100 through adjacent walls of a pair of organs (i.e., through a wall of the duodenum and a wall of the common bile duct), in any manner previously described herein. Upon advancing distal end 104, including the slot 106, into the first organ (i.e., common bile duct), the surgeon may utilize the placement member 108 to manually deliver and deploy a first magnetic assembly 200a into the first organ via the slot. For example, FIG. 43C illustrates delivery of a first magnetic assembly 200a into the common bile duct. As shown, the placement member 108 include a connection member 110 at a distal end of the placement member 108, which is configured to be releasably coupled to a corresponding connection member of the central portion 208 of the exoskeleton 206 (indicated by attachment point arrow). Upon advancing and extending the placement member 108 towards the distal end 104 of the delivery device 100, the first magnetic assembly passes from the working channel of the delivery device 100 and through the slot 106 to transition into a deployed state, as illustrated in FIG. 43D. As shown, deployment of the first magnetic assembly 200a results in the pair of magnetic segments 202, 204 to exit the slot 106 on opposite respective sides of the body 102 of the delivery device 100 while the central portion 208 of the exoskeleton 206 remains within the slot 106. In other words, the slot 106 extends entirely through the body 102 of the delivery device 100, from one side to the other. Accordingly, when in a deployed state, the first magnetic assembly 200a is positioned into the first organ while remaining retained within the slot 106 of the delivery device 100.

Figure 43E:
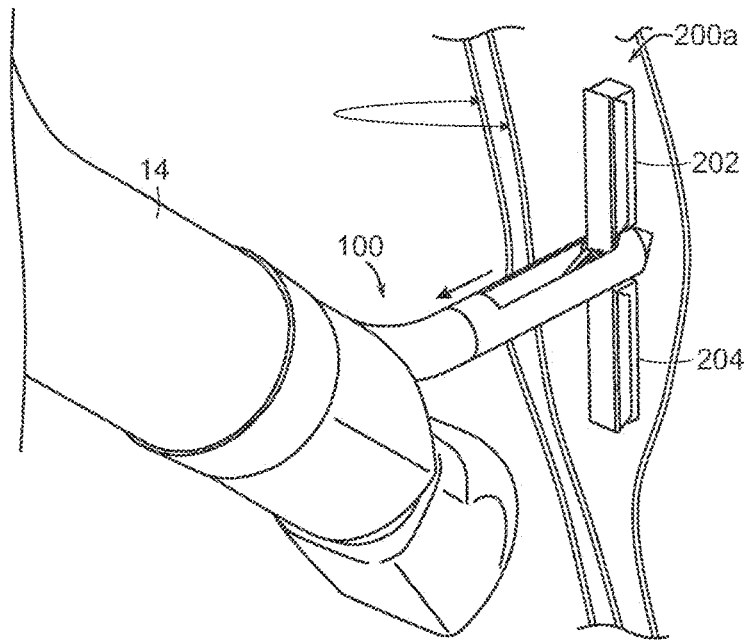
FIG. 43E illustrates a fully deployed first magnetic assembly within the first organ and pulling back of the delivery device to thereby draw the first magnetic assembly against a wall of the first organ in preparation for delivery and deployment of the second magnetic assembly in the second organ.

At this point, the surgeon need only pull back upon the delivery device 100 until the first magnetic assembly 200a engages the tissue of the first organ and the majority of the slot 106 is positioned within the second organ. The surgeon is able to then deliver and deploy the second magnetic assembly 200b into the second organ (i.e., the duodenum). FIG. 43E illustrates a fully deployed first magnetic assembly 200a within the first organ and pulling back of the delivery device 100 to thereby draw the first magnetic assembly 200a against a wall of the common bile duct in preparation for delivery and deployment of the second magnetic assembly 200b in the duodenum.

Figure 43F:
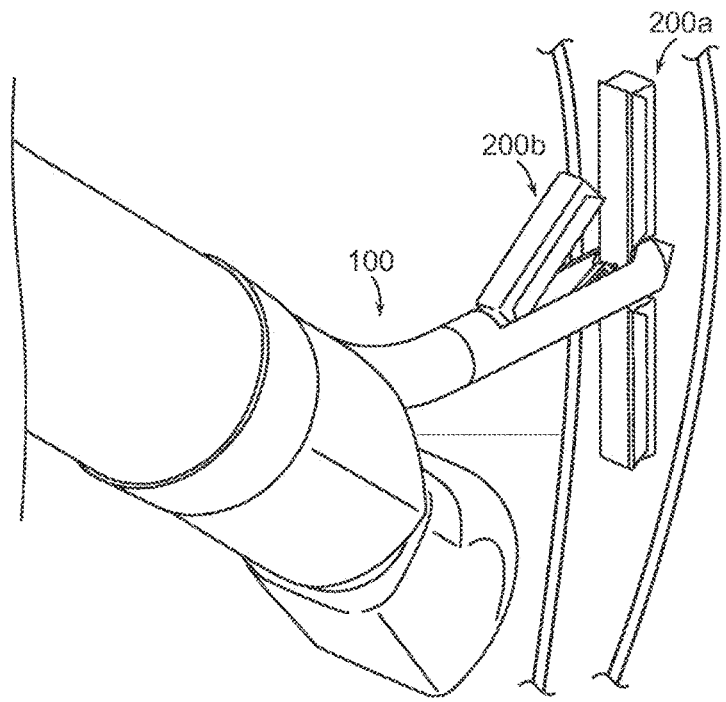
FIG. 43F illustrates delivery of the second magnetic assembly into the second organ.
Figure 43G:
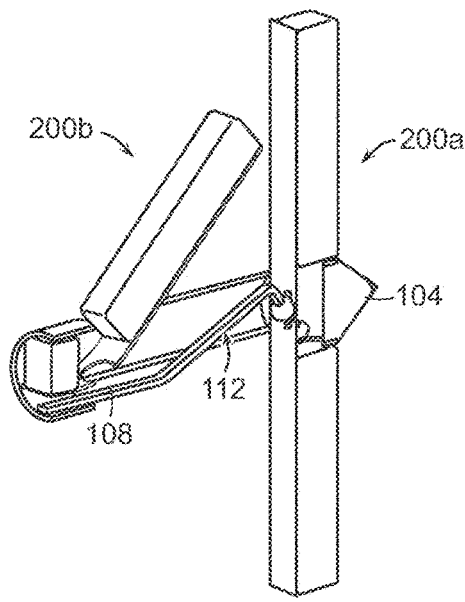
FIG. 43G is an enlarged view, partly in section, of the second magnetic assembly advancing to a deployed state.
Figure 43H:
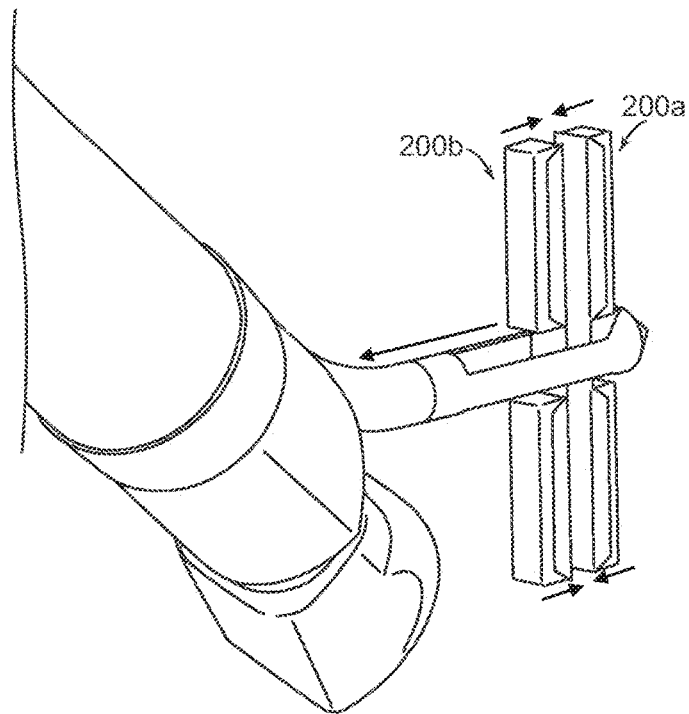
FIG. 43H illustrates the first and second magnetic assemblies in fully deployed states and coupled to one another as a result of attractive magnetic forces therebetween.

The second magnetic assembly 200b deploys in a similar fashion as the first magnetic assembly 200a, in that magnetic segments 202, 204 of the second magnetic assembly 200b exit the slot 106 on opposite respective sides of the body 102 of the delivery device 100 while a central portion 208 of an exoskeleton 206 remains retained within the slot 106. FIG. 43F illustrates delivery of the second magnetic assembly 200b into the duodenum. FIG. 43G is an enlarged view, partly in section, of the second magnetic assembly 200b advancing to a deployed state. As shown, as the second magnetic assembly 200b is advanced through the working channel and towards the slot 106, the assembly 200b is configured to engage a ramped section 112 of the placement member which assisted in directing at least one of the segments of the assembly 200b into place, as shown. FIG. 43H illustrates the first and second magnetic assemblies 200a, 200b in fully deployed states. The first and second magnetic assemblies 200a, 200b are substantially aligned with one another and, due to attractive magnetic forces, the first and second magnetic assemblies 200a, 200b will couple to one another.

Figure 43I:
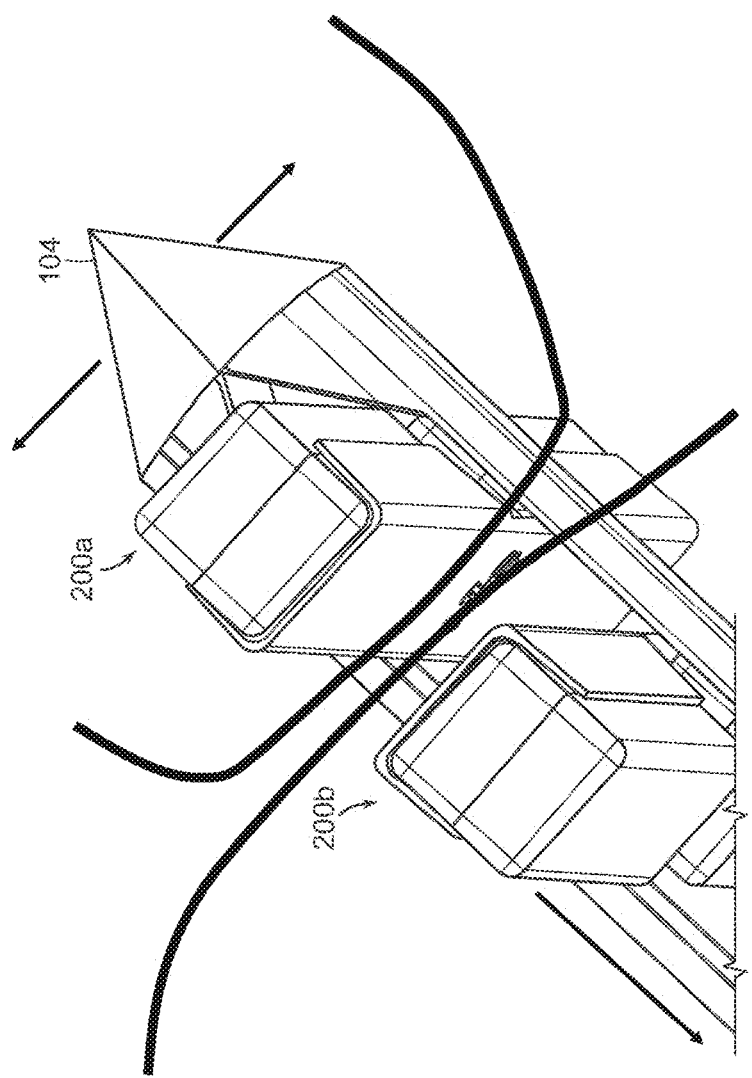
FIG. 43I illustrates the distal end of the delivery device constructed from two halves and configured to split apart to allow the delivery device to be removed from the target site while the pair of magnetic assemblies remain coupled to one another to form anastomosis at the target site.
Figure 44A:
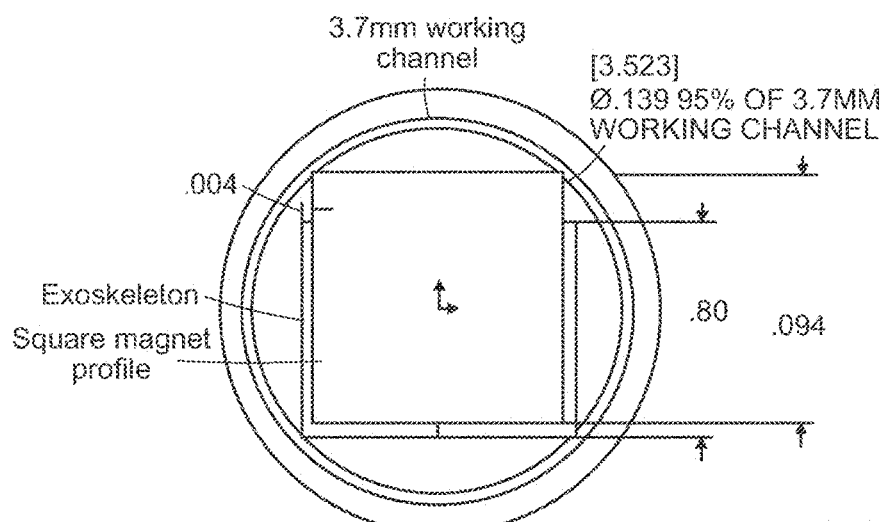
FIGS. 44A, 44B, 44C, and 44D are cross-sectional views of various profiles of magnet segments of magnetic assemblies within a working channel of a standard scope.
Figure 44B:
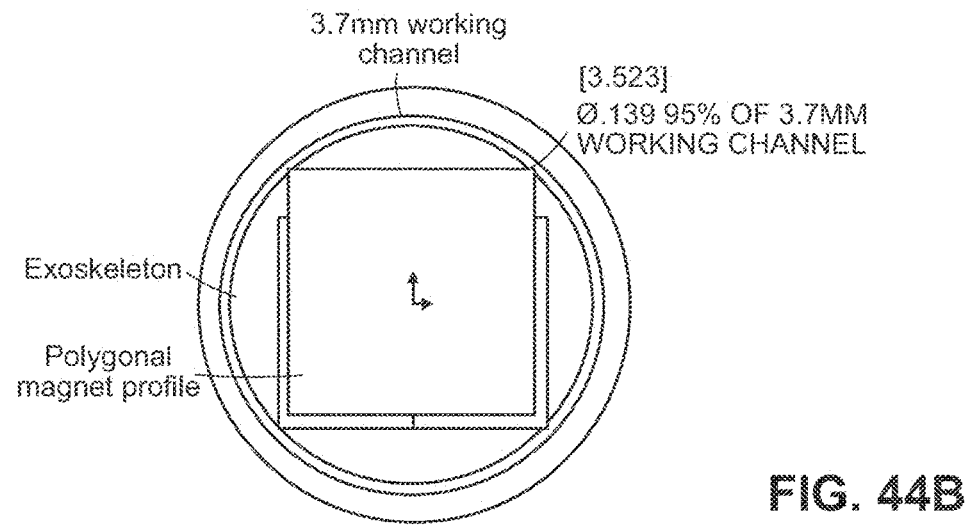
Figure 44C:
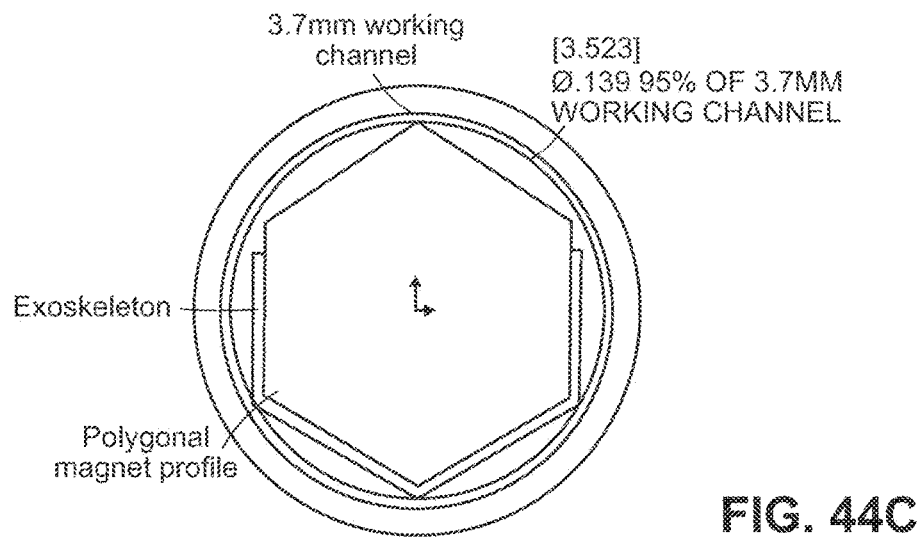
Figure 44D:
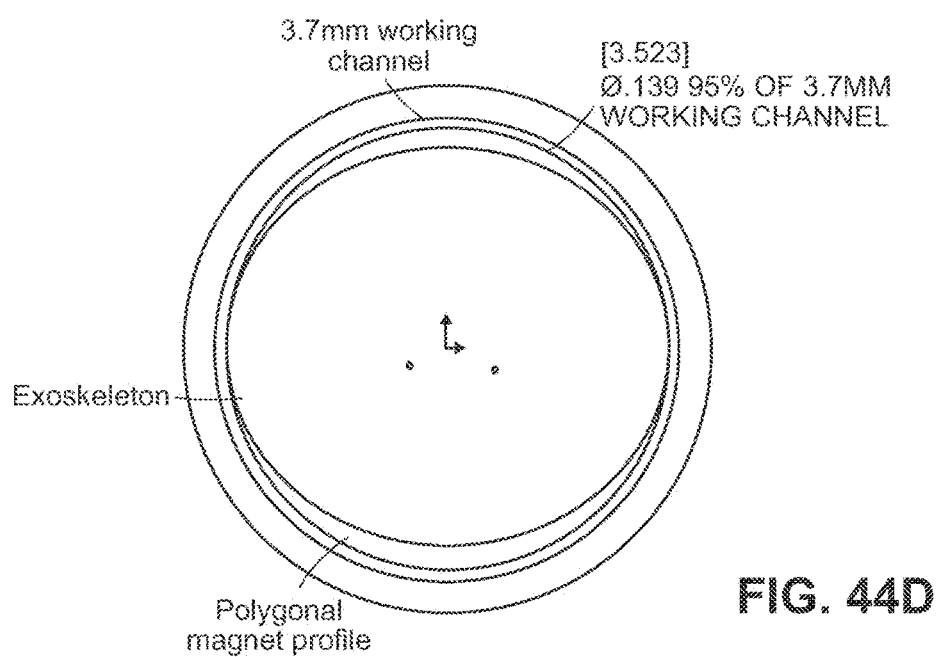

As shown in FIG. 43I, the distal end 104 of the delivery device 100 is comprised of two halves that, when in a default state, form a relatively uniform tip shape. However, the distal end comprises a deformable material (i.e., shape memory material), such that, upon application of sufficient force, the two halves will split apart. As such, once both the first and second magnetic assemblies 200a, 200b have been delivered and are effectively coupled to one another (but are still retained within the slot 106), the surgeon need only pull back on the delivery device 100 which then causes the magnetic assemblies 200a, 200b to make contact with the distal end 104 and force the two halves of the distal end 104 to split apart, allowing the distal end of the delivery device to be withdrawn from the target site while the pair of magnetic assemblies 200a, 200b remain in place. The pair of magnetic assemblies 200a, 200b compress the walls of each respective organ therebetween, subsequently forming an anastomosis between the organs (i.e., anastomosis between the duodenum and the common bile duct).

Upon deployment, each magnetic assembly has a width and a length generally corresponding to a width of a respective segment and a length that is approximately twice the length of each segment. As a result, the pair of magnetic assemblies, when coupled to one another, generally form a substantially linear package and the resulting anastomosis formed may generally be rectangular in shape, but may naturally form a round or oval shape. The resulting anastomosis may have a 1:1 aspect ratio relative to the dimensions of the magnetic assemblies. However, exemplary embodiments allow for larger aspect ratios (i.e., a larger anastomosis to form relative to the dimensions of the magnetic assemblies). In particular, prior art systems and methods that include the use of magnets for creating anastomosis are generally limited based on the dimensions of the working channel of the scope or catheter used for delivering such magnets, which, in turn, limits the resulting size of the anastomosis. The magnetic assembly design overcomes such limitations.

For example, the design of the magnetic assembly, notably the coupling of multiple magnetic segments to one another via an exoskeleton, allow for any number of segments to be included in a single assembly, and thus the resulting anastomosis has a greater size relative to the dimensions of the working channel of the scope. For example, in some embodiments, the resulting anastomosis may include an aspect ratio in the range of 2:1 to 10:1 or greater.

FIGS. 44A-44D are cross-sectional views of various profiles of magnet segments of magnetic assemblies within a working channel of a standard scope. The cross-sectional areas of magnets are illustrated, showing polygons as well as ellipses and circles taking between 10 and 95 percent of the annular space of the working channel. With the guidelines for the magnetic profile being in place, the next constraint for the device is the axial ratio of a minimum of 6:1 and a maximum of 50:1. This segmented length once assembled in the body can have either a regular or irregular shape.

FIG. 45 provides a listing of some exemplary working channel sizes considered usable/feasible to deploy a magnetic array with a cage to produce an anastomosis. These sizes do not limit future capabilities as scope channel sizes increase/decrease with market and device changes. The summary of sizing can be summarized into: 1.0 mm-6.0 mm (including a bleed scope called the "clot buster") with one particular sized device designed around the 3.7 mm.

Accordingly, the delivery device of the present disclosure produces a low-profile linear anastomosis that would allow certain complications, particularly those associated with blockage of the common bile duct, to be mitigated. In particular, patients experiencing a blockage of the common bile duct often undergo some sort of procedure to either remove the blockage or allow drainage to provide relief of jaundice/infection and hepatic portal complications. A common procedure is a sphincterotomy, or some sort of draining stent placement procedure. There are procedures which present decompression of the bile duct in a traditional way, but are not possible in a minimally-invasive manner. Such procedures include, for example, a sphincterotomy, which is not possible due to inability to cannulate the common bile duct, inability to account for anatomical alterations, particularly when during heavily diseased states. Utilizing the magnetic closure force profile as described herein would allow minimal bleeding and create a semi-permanent slit profile. This slit profile would help to resist "sump syndrome" and help to create a drainage point which would remain effectively infection free.

Another concept (referred to as the "Shish Kabob" concept) allows multiple magnetic segments to be delivered via a single conduit that effectively punctures through target tissue and delivers segments.

Figure 46:
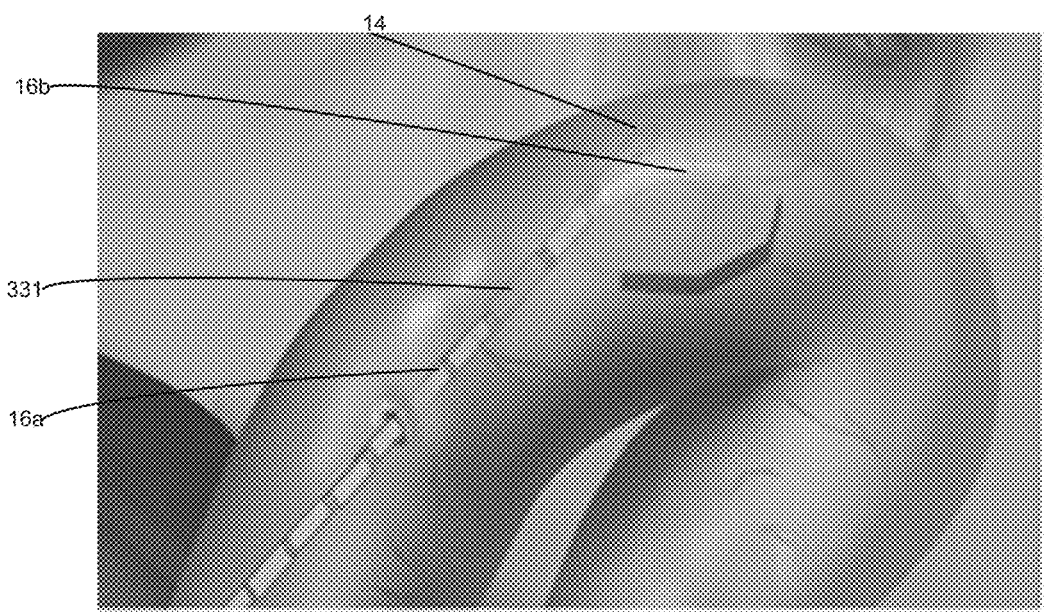
FIG. 46 is a schematic diagram showing multiple magnetic segments being delivered via a single conduit, in accordance with one exemplary embodiment.

FIG. 46 is a schematic diagram showing multiple magnetic segments 16a, 16b being delivered via a single conduit, in accordance with one exemplary embodiment. This example shows two magnetic segments 16a and 16b being delivered via a single conduit 14 such as, for example, a laparoscope or other delivery device having an elongated body and a lumen extending therethrough and shaped and/or sized to receive and allow multiple magnetic segments to pass therethrough. Generally speaking, each of these magnetic segments 16a, 16b, when delivered, forms a magnetic compression anastomosis device 16 (sometimes referred to herein simply as a "magnet") such as through self-assembly or other mechanism as described herein. Generally speaking, different magnetic segments (e.g., magnetic compression anastomosis devices) would be delivered to different body cavities such as for capturing two separate lumens for anastomosis as discussed further below, although technically the different magnetic segments could be delivered to the same body cavity. In certain exemplary embodiments, the magnetic segments are separated by one or more separator segments 331, which may be magnetic or non-magnetic and which facilitate delivery of, for example, magnetic segment 16b while retaining magnetic segment 16a in the conduit for later delivery. It should be noted that while the "Shish Kabob" concept is depicted here in the context of esophagojejunostomy, this concept is not limited to any particular procedure or number of magnetic segments to be delivered. Thus, for example, this concept can be used to deliver two, three, or more magnetic segments.

Figure 47:
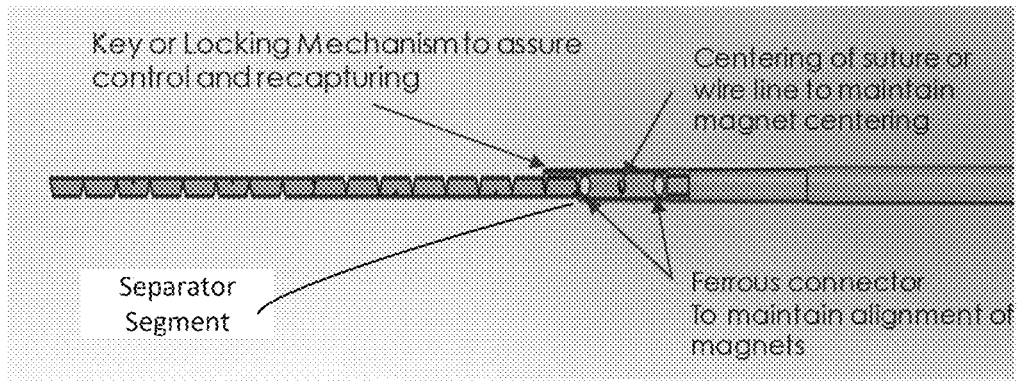
FIG. 47 is a schematic diagram showing details of a separator segment, in accordance with one exemplary embodiment.

FIG. 47 is a schematic diagram showing details of a separator segment 331, in accordance with one exemplary embodiment. Among other things, the separator segment 331 includes a ferrous connector 343 at each end to maintain alignment of the magnetic compression anastomosis device segments 16a, 16b (magnets), a key or locking mechanism 342 to assure control and recapturing, and a centering mechanism for centering of suture 320 or wire line to maintain magnet 16 centering. The key or locking mechanism is shown in more detail in FIG. 56. As the magnet is deployed from the delivery device, the key or locking mechanism is extended through the distal end of the delivery device. Sutures attached to the magnet are centered by the centering mechanism, and controlled by the surgical handle shown in FIG. 49. After the magnet is deployed and self-assembled, the key is capable of magnetically connecting to the magnet due to the ferrous connectors. The connectors engage the magnet, and allow the key to manipulate it for proper placement at a target site as shown in FIGS. 57A-57J. Once the distal and proximal magnets are paired, the key may be removed due to the key's magnetic force being less than the attractive force between the magnets. The key is then retracted into the delivery device for removal from the patient.

Figure 48:
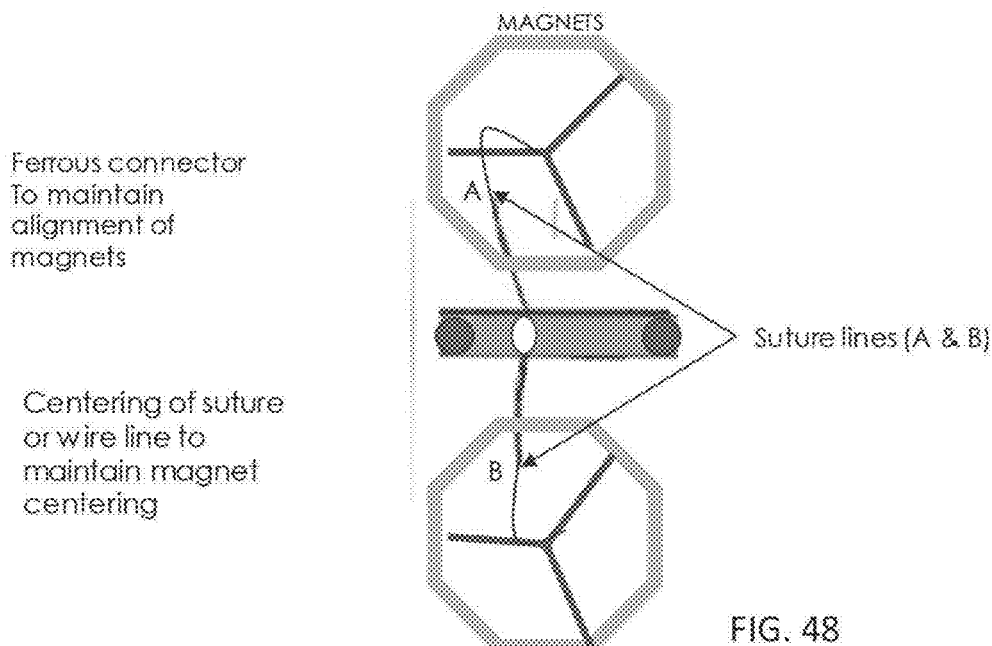
FIG. 48 is a schematic diagram showing how the separator segment of FIG. 47 can be used for deployment and control of the magnetic segments of two magnetic compression anastomosis devices (magnets), in accordance with one exemplary embodiment.
Figure 49:
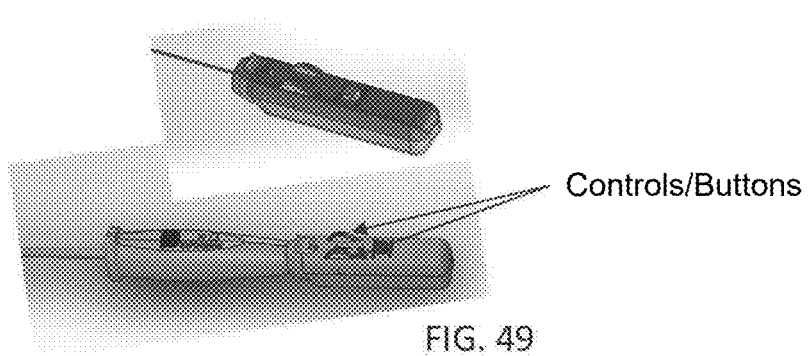
FIG. 49 is a schematic diagram showing a laparoscopic handle having controls to control multiple (e.g., two) independent lines simultaneously.

FIG. 48 is a schematic diagram showing how the separator segment of FIG. 47 can be used for deployment and control of the magnetic segments of two magnetic compression anastomosis devices (magnets), in accordance with one exemplary embodiment. Here, separate suture/control lines A and B extend from a device handle to the two magnets through the centering mechanism of the separator segment. When the two magnets are deployed, the separate suture/control lines can be used to control the magnets via a surgical handle device as shown in FIG. 49 and to draw the magnets into proximity for magnetic coupling of the magnets, e.g., to capture tissue of two lumens such as for anastomosis. Ferrous or magnetic elements on the separator segment can engage with the magnets for additional control and placement of the magnetic devices.

Figure 55:
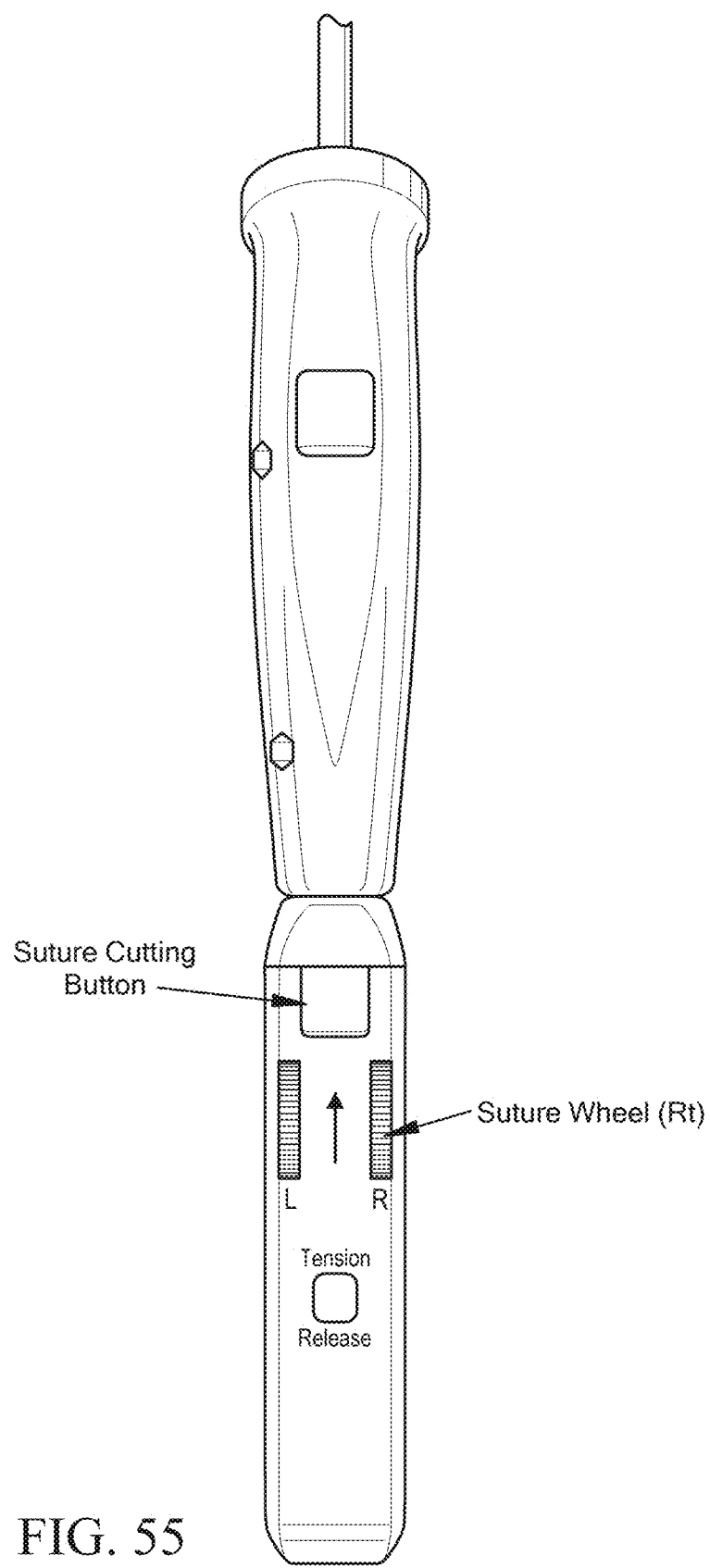
FIG. 55 schematically shows a concept of a surgical handle featuring suture control buttons.

FIG. 49 is a schematic diagram showing a laparoscopic handle having controls to control multiple (e.g., two) independent lines simultaneously. In this exemplary embodiment, the handle is attached to a laparoscope, though it may be attached to an endoscope or other similar device in other embodiments. Exemplary embodiments provide the ability to independently pull and/or push the lines such as to effectuate and maintain capture of laparoscopic "otomies" (holes). The handle may also include buttons to sever the lines, and buttons to catch the lines to maintain tension in the lines, as shown in FIG. 55.

Figure 50A:
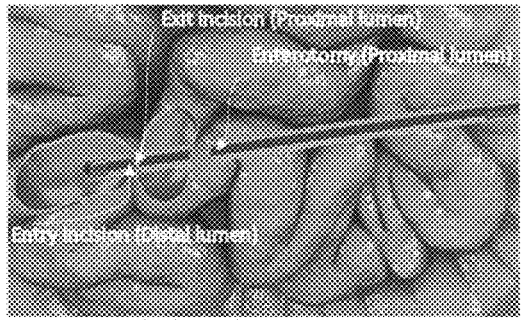
FIGS. 50A-50E schematically show one exemplary procedure using the "Shish Kabob" concept.
Figure 50B:
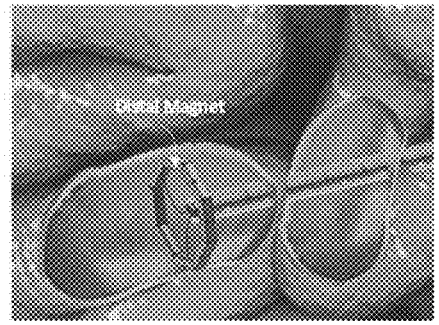
Figure 50C:
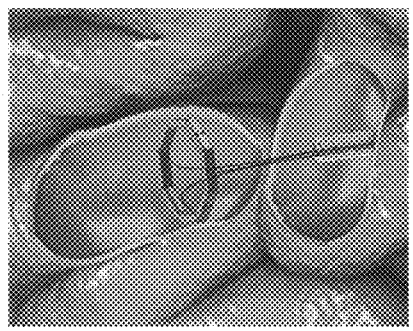
Figure 50D:
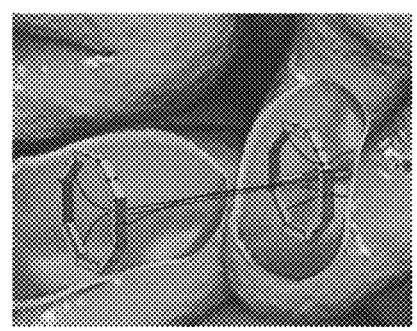
Figure 50E:
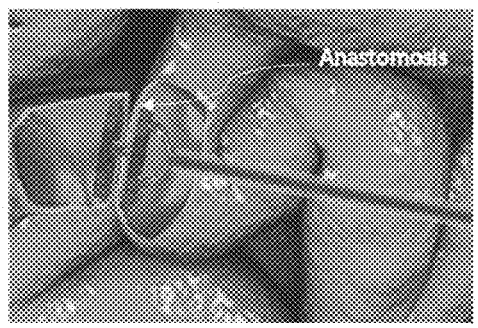

One exemplary procedure using the "Shish Kabob" concept is now described with reference to FIGS. 50A-50E. In FIG. 50A, the shaft member punctures, by means of a piercing or cutting element, through target tissue from the patient's body cavity into a proximal lumen creating an enterotomy. The shaft then proceeds through an opposing tissue wall of the proximal lumen creating an exit incision, and through the tissue wall of a distal lumen, creating an entry incision, as seen in FIG. 50A. The shaft member contains two self-forming compression members in a linear shape. In FIG. 50B, a surgical handle device is used to deliver a first self-forming compression member into the distal lumen. The first self-forming compression member is deployed and controlled by the handle device as well as an articulable tensioning member such as sutures and/or guide wires. The tension control member is attached to the compression anastomosis devices and runs through the shaft of the delivery device from the distal end to the surgical handle at the proximal end. The tension control member is manipulated by the surgical handle device at the proximal end of the delivery device. In FIG. 50C, the shaft member is pulled back into the proximal lumen through the entry and exit incisions while the first self-forming compression magnet stays in the distal lumen. In FIG. 50D, a surgical handle device is used to deliver a second self-forming compression member into the proximal lumen. The second self-forming compression member is deployed and controlled by the surgical handle device and a basket control member at the distal end of the shaft. The basket engages with the proximal magnet in order to align it with the distal magnet and bring it against a target site at a tissue wall. FIG. 50E schematically shows a surgical handle device preparing to couple two deployed self-forming members such as by manipulation of tethers or tension devices between the two self-forming compression members to pull them into proximity with one another until the two self-forming compression members couple automatically and magnetically, thereby forming an anastomosis. The tension control member is then severed, releasing the anastomosis devices to be left inside the patient while the tension control member is retracted into the delivery device for removal from the patient. The exit and entry incisions remain open to allow for the passage of fluid and other material through the resulting anastomosis. The delivery device is then retracted through the first created enterotomy for subsequent removal from the patient. The first enterotomy may be closed using sutures or the like.

The proximal anastomosis device may be deployed before the distal anastomosis device. Once initially in the proximal lumen, the delivery device may deploy the proximal anastomosis device prior to exiting the proximal lumen and entering the distal lumen. Once the proximal anastomosis device is deployed, the delivery device is advanced into the distal lumen wherein the distal anastomosis device is deployed.

The following is an example of the "Shish Kabob" concept in the context of performing duodenal/ileal junction, in accordance with one exemplary embodiment. First, the surgeon finds the area of the ileum that is desired to join to the duodenum, crags the ilium up to the duodenal area in the foregut, and pierces through the ileal tissue wall with the delivery device to enter the ileum with the delivery device, e.g., using monopolar energy to burn through the ileal tissue wall (e.g., FIG. 50A). While inside the ileum, the surgeon selects the exit point of the ileum on the opposing ileal wall and pierces through the ileal tissue wall, e.g., using monopolar energy to burn through the ileal tissue wall (e.g., FIG. 50A). Next, the surgeon selects the area of the duodenum to enter and pierces through the duodenal tissue wall to enter the duodenum (e.g., FIG. 50A). Once inside the duodenum, the surgeon deploys the first magnetic segment (e.g., FIG. 50B). Next, the surgeon retracts the delivery device back into the ileum (e.g., FIG. 50C), slides the ileum up against the duodenum, and deploys the second magnetic segment in the ileum (e.g., FIG. 50D). Once both magnetic segments have been deployed, the surgeon can position the two magnetic segments such as by pulling the two magnetic segments together using one or more tethers (e.g., FIG. 50E) or otherwise the two magnetic segments can be aligned or can self-align and magnetically couple, thereby capturing the two enterotomies. The delivery device can then be removed through the original ileal enterotomy.

Thus, certain exemplary embodiments include laparoscopic delivery and control of capturing multiple holes within the digestive system in a compression anastomosis device and/or laparoscopic or endoscopic delivery and ability to recapture compression anastomosis device during deployment, including control of self-assembling compression anastomosis device during deployment. A key or locking mechanism may be included to provide the ability to deploy or retract the magnetic segment at any time. The key or locking mechanism fits into a linear compression anastomosis device prior to the self-assembling.

Additionally, in certain exemplary embodiments, a surgical handle device with multiple self-forming compression members can be delivered via a single conduit that effectively punctures through target tissue and delivers self-forming compression members. The surgical handle device may have various elements creating a control system connected to self-forming compression members to deploy, control, and release the self-forming compression members. The surgical handle device may contain an actuatable tensioning member to allow continued contact between the two or more self-forming compression members. The surgical handle device may create alignment between two or more self-forming compression members.

Figure 51A:
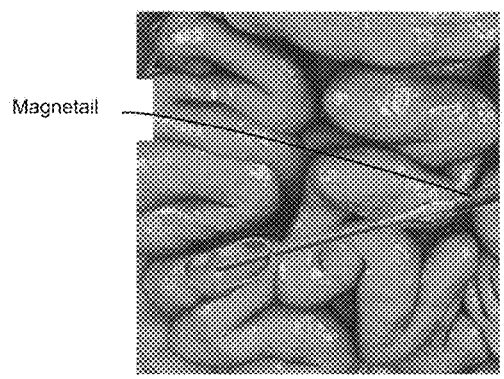
FIGS. 51A-51F schematically show another concept using two engageable delivery devices (referred to herein for convenience as a "magnetail" and a "capture device"), in accordance with one exemplary embodiment.
Figure 51B:
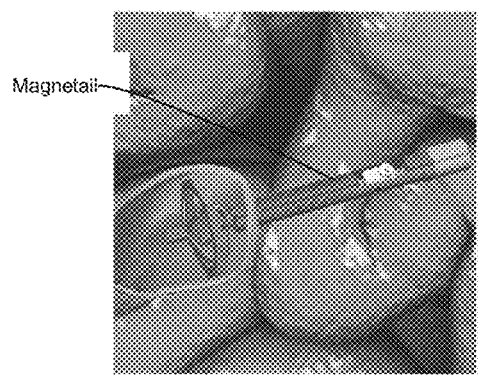
Figure 51C:
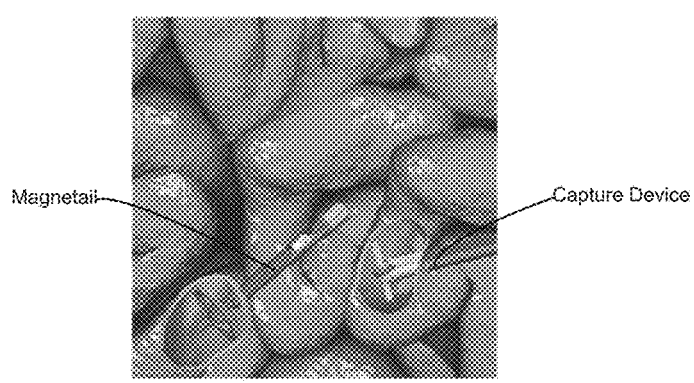
Figure 51D:
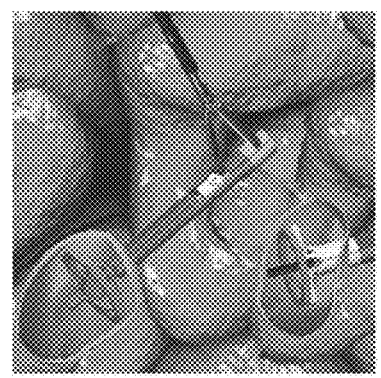
Figure 51E:
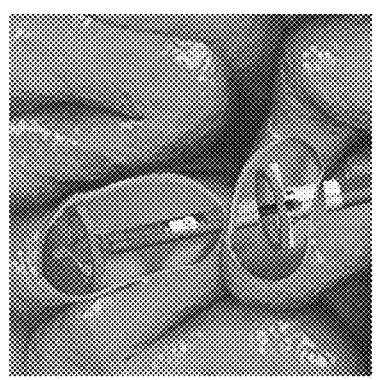
Figure 51F:
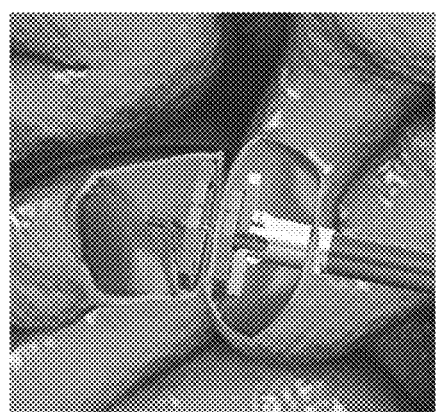

Another concept using two engageable delivery devices is now described with reference to FIGS. 51A-51F. In this exemplary embodiment, the delivery device is a laparoscope. FIG. 51A schematically shows the magnetail device with multiple magnetic compression anastomosis device segments loaded into the distal lumen, prior to deployment of the compression anastomosis device into the lumen. The delivery device pierces into the distal lumen from the body cavity by means of a piercing and/or cutting element at the distal end of the delivery device and advances into the distal lumen. FIG. 51B schematically shows the distal magnetail device and magnetic segments after deployment and control of the compression anastomosis device into the distal lumen. The distal magnetic anastomosis device is deployed with the magnetail device into the distal lumen through the distal end of the delivery device. By pulling back on the delivery device, the magnetic anastomosis device is deployed into the distal lumen, while the magnetail is attached to the distal magnetic anastomosis device but positioned within the body cavity as shown in FIG. 51B. FIG. 51C schematically shows the delivery device loaded and deployed into the proximal lumen, which in this example includes a capture mechanism for capturing an as-yet-undeployed magnetic compression anastomosis device. The distal end of the delivery device, having been removed from the distal lumen, pierces a proximal tissue wall of the proximal lumen and advances into the proximal lumen, therein deploying a capture mechanism. In certain exemplary embodiments, this capture mechanism is self-deploying (e.g., spring-loaded) when extended past the distal opening of the delivery device and includes one or more magnets for capturing a compression anastomosis device, although other types of capture mechanisms may be used (e.g., a mechanism for grasping and releasing the anastomosis device). FIG. 51D schematically shows a magnetic compression anastomosis device deployed and captured by the capture mechanism of the delivery device within the proximal lumen. In this example, the magnetic compression anastomosis device may be deployed through a channel extending through the capture device. As shown in FIG. 51D, the proximal end of the magnetail device within the body cavity is manipulated using a second laparoscopic device. The distal end of the delivery device pierces a distal tissue wall of the proximal lumen, thereby creating an enterotomy. The magnetail device is manipulated by the second laparoscopic device into the formed enterotomy into the proximal lumen where it engages with the capture device inside the proximal lumen. FIG. 51E schematically shows the magnetail device captured by the capture device in a concentric arrangement, i.e., where the magnetail device can be retracted into the delivery device in order to pull the two compression anastomosis devices into close proximity in a substantially coaxial manner. FIG. 51F schematically shows the magnetail device at least partially retracted into the delivery device such that the two compression anastomosis devices are close proximity and couple to one another magnetically to capture and compress the walls of the distal and proximal lumens such as for anastomosis. It should be noted that, in some exemplary embodiments, the magnetail device can be delivered using the capture device and then recaptured by the capture device.

Figure 52:
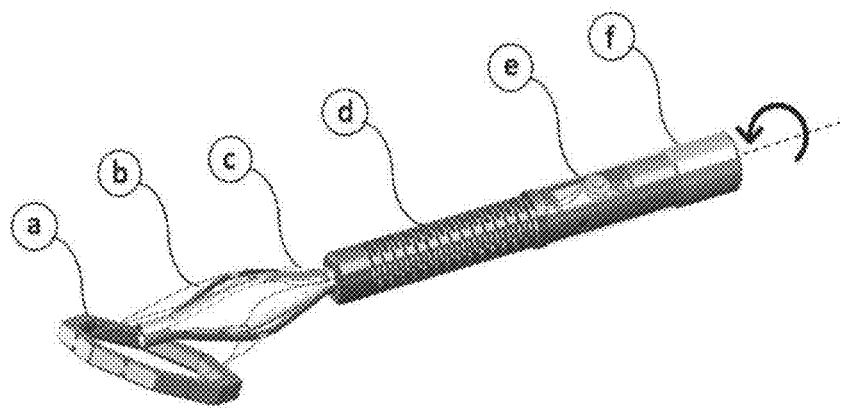
FIG. 52 schematically shows components of the disposable magnetail, in accordance with one exemplary embodiment.

FIG. 52 schematically shows components of the disposable magnetail device, in accordance with one exemplary embodiment. Among other things, the magnetail device includes (a) a magnetic compression anastomosis device, (b) one or more sutures, (c) one or more control members that support the sutures, (d) a shaft member (which may be flexible or rigid), (e) a pulley mechanism member that is part of the suture control mechanism, and (f) a rotatable radial pulley translation member that can be used to extend or retract the sutures and hence also the magnetic compression anastomosis device.

Figure 53:
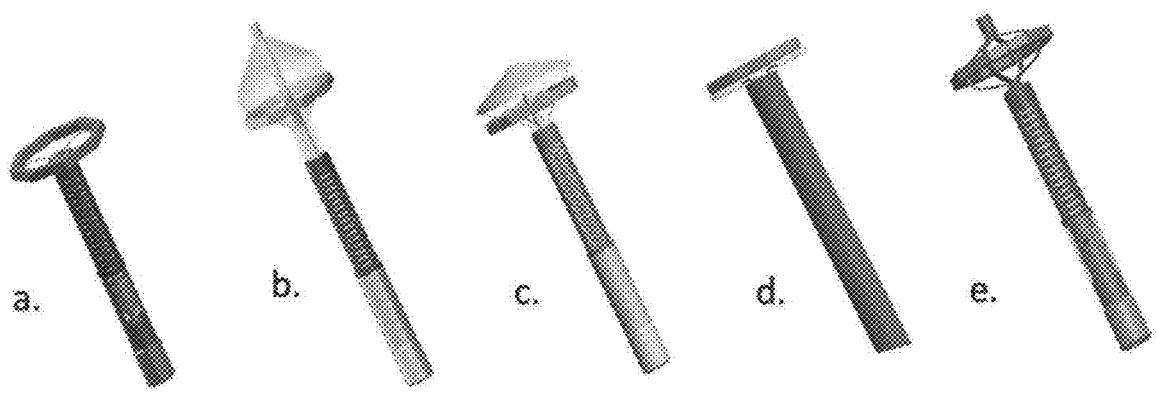
FIG. 53 schematically shows a number of magnetail configurations in accordance with various exemplary embodiments.

FIG. 53 schematically shows a number of magnetail configurations in accordance with various exemplary embodiments. Among other things, the magnetail can include (a) one or more sutures, (b) a balloon, (c) a deployable/retractable umbrella, (d) a cap, and/or (e) a basket for use in deploying and controlling the magnetic compression anastomosis device.

Thus, certain exemplary embodiments include a disposable magnetail assembly within a channel of a magnetic compression system device containing a capture mechanism that is selectively actuatable in the axial and/or radial direction. Such a disposable magnetail generally allows for controlling, deployment, and releasing magnetic compression anastomosis devices and also allows for separation of the anastomosis devices while at the same time maintaining connectivity by using single conduit. The disposable magnetail may be flexible to allow easier maneuverability. The magnetail can be configured to support various implementations such as suture, balloon, basket, umbrella, and/or cap such as for providing a mechanical force of compressing tissues in addition to magnetic energy resulting from the interaction between two magnetic compression anastomosis devices. The magnetail may be delivered by the capture mechanism, may be separable from the capture mechanism, and may be recapturable by the capture mechanism.

Figure 54:
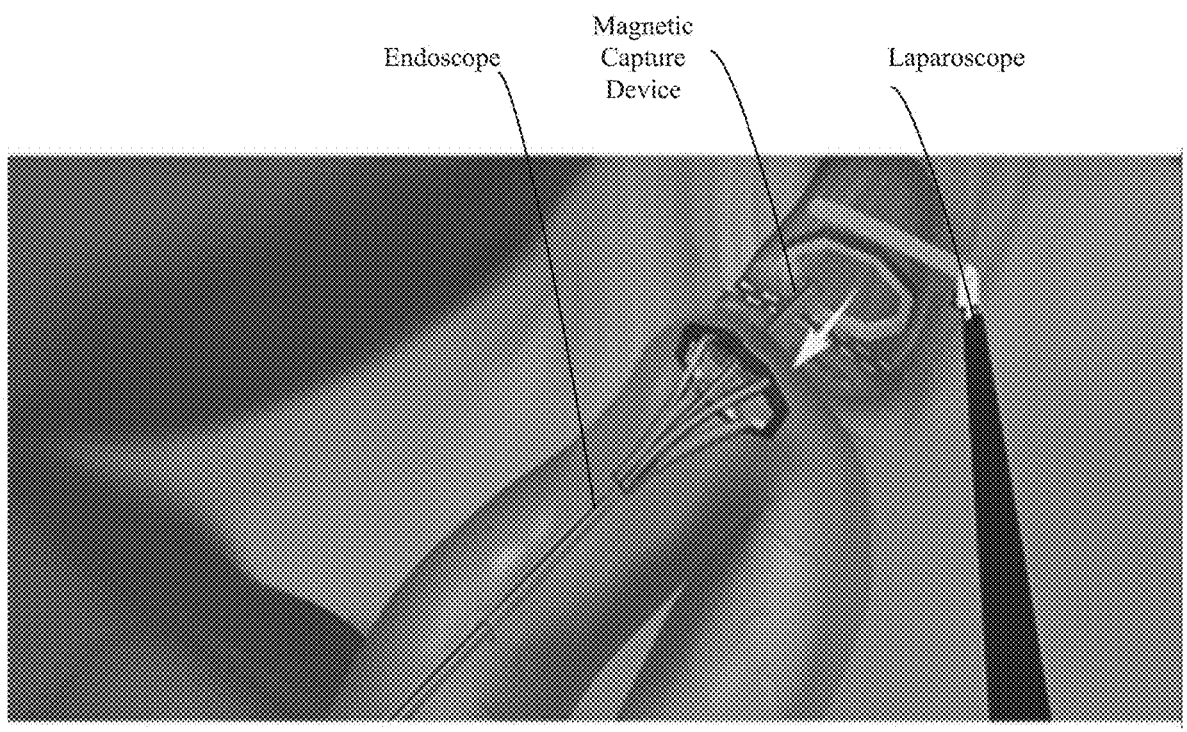
FIG. 54 schematically shows another concept (referred to as a "hybrid" approach) using one endoscope and one laparoscope (as opposed to two endoscopes), in accordance with one exemplary embodiment.

Another concept (referred to as a "hybrid" approach) using one endoscope and one laparoscope (as opposed to two endoscopes) is depicted schematically in FIG. 54. In this example, a first magnetic compression anastomosis in the distal lumen is captured by a magnetic capture device controlled through the endoscope in the proximal lumen. The first magnetic compression anastomosis device is brought into proximity with a second magnetic compression anastomosis device in the proximal lumen via the magnetic capture device using the laparoscope in the distal lumen for guidance and optionally for mechanical manipulation of the first magnetic compression anastomosis device. The first magnetic compression anastomosis device may be delivered via the endoscope or via another mechanism, e.g., directly into the distal lumen.

FIG. 55 schematically shows a suture control handle for a delivery device such as an endoscope or laparoscope in which the suture control handle is designed for one-handed suture manipulation, in accordance with various exemplary embodiments. Among other things, the suture control handle includes one or more suture wheels that allow for manipulation of one or more sutures through the delivery device (e.g., tightening and/or loosening), one or more suture cutting buttons that controls one or more suture cutting tools to sever the suture(s), and a catch/release and/or locking mechanism that can hold the sutures in place, maintaining the tension applied to the sutures. In some embodiments, each suture is attached to a separate magnet, and each suture wheel manipulates each individual magnet.

Figure 56:
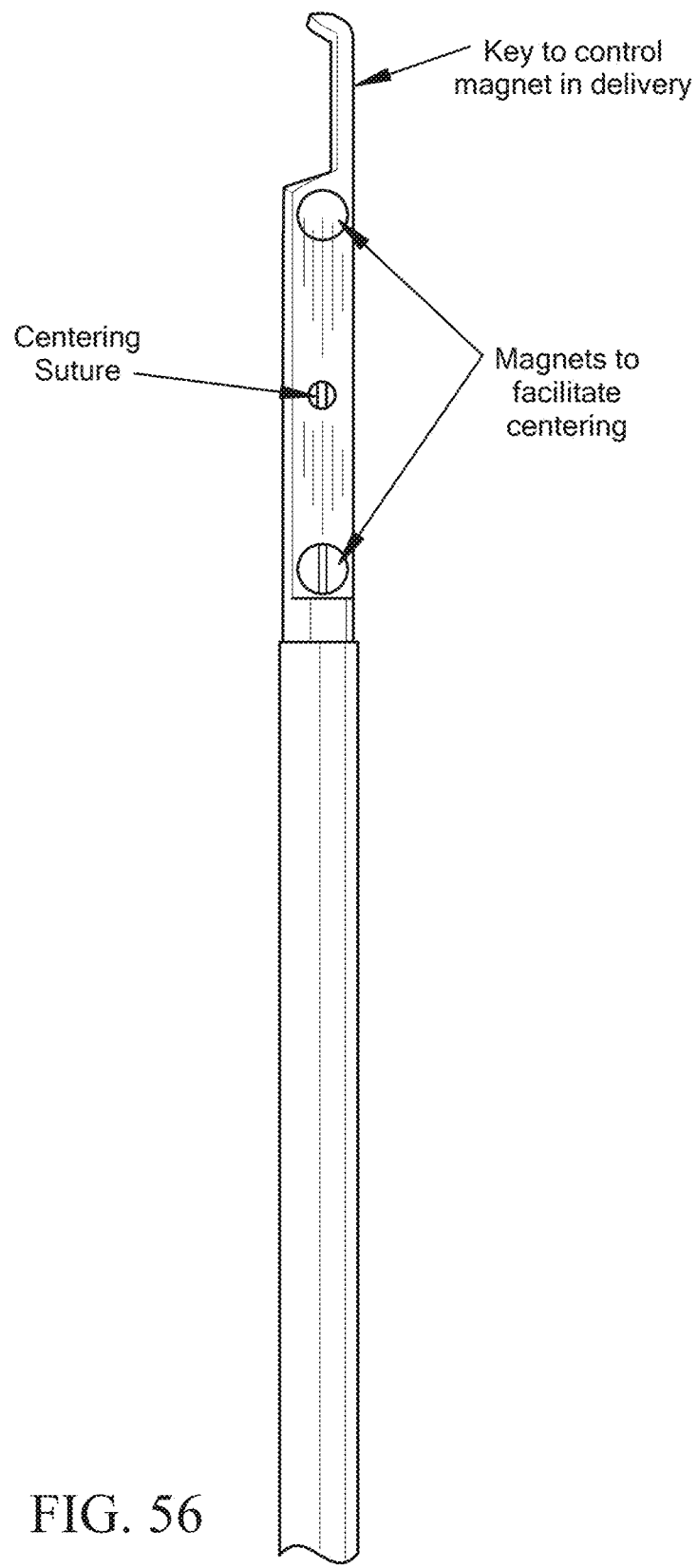
FIG. 56 schematically shows a concept of a control key for manipulation of anastomosis devices in accordance with one embodiment.

FIG. 56 schematically shows a manipulation tool or "wand" that can be used to manipulate anastomosis magnets (e.g., magnetic compression anastomosis devices) as described herein, in accordance with various exemplary embodiments. Among other things, this manipulation tool includes a key to control the anastomosis magnet during delivery. This manipulation tool also includes a number of control magnets (two control magnets in this example, although alternative embodiments can include other numbers of control magnets) that can facilitate capture, centering, and manipulation of the anastomosis magnet. This manipulation tool also includes a centering hole through which one or more centering sutures can be connected to the anastomosis magnets prior to delivery to assist with centering and capture of the anastomosis magnets. The centering suture(s) could be connected to, and manipulated by, a suture control handle of the type described with reference to FIG. 55 above, e.g., using the suture wheel to "reel in" the anastomosis magnet toward the manipulation tool until captured by the control magnets and then using the suture cutting button to sever the centering suture(s). The wand manipulation tool is extended from the delivery device after deployment of the magnetic anastomosis devices. The wand may be manipulated inside the body cavity of the patient, utilizing the ferrous elements or magnets on the wand to engage with the proximal or distal magnetic anastomosis device, and bring it in proximity with the other magnetic anastomosis device. The wand also has a key or hook shaped distal end in order to manipulate the magnets during deployment. The centering suture may be manipulated by the suture control handle to "reel in" the distal anastomosis device to bring it into contact with the proximal anastomosis device. Once the magnets are paired, the wand may be removed due to the magnetic attractive force of the wand being less than the magnetic attractive forces of the anastomosis devices. The wand is then retracted into the delivery device for removal from the patient.

Figure 57A:
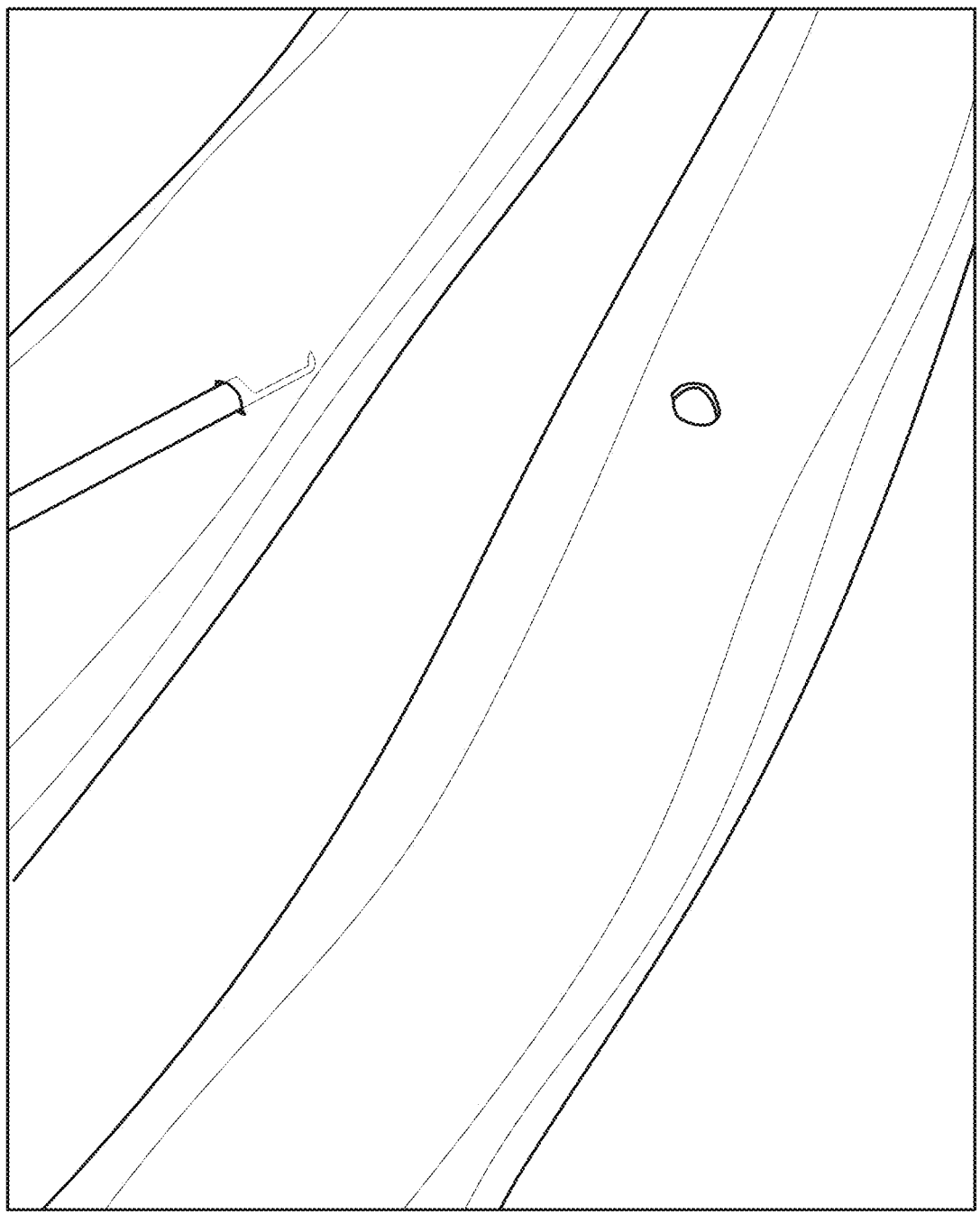
FIGS. 57A-57J schematically show a concept of a control key manipulating two magnetic anastomosis devices within two lumens in accordance with one embodiment.
Figure 57B:
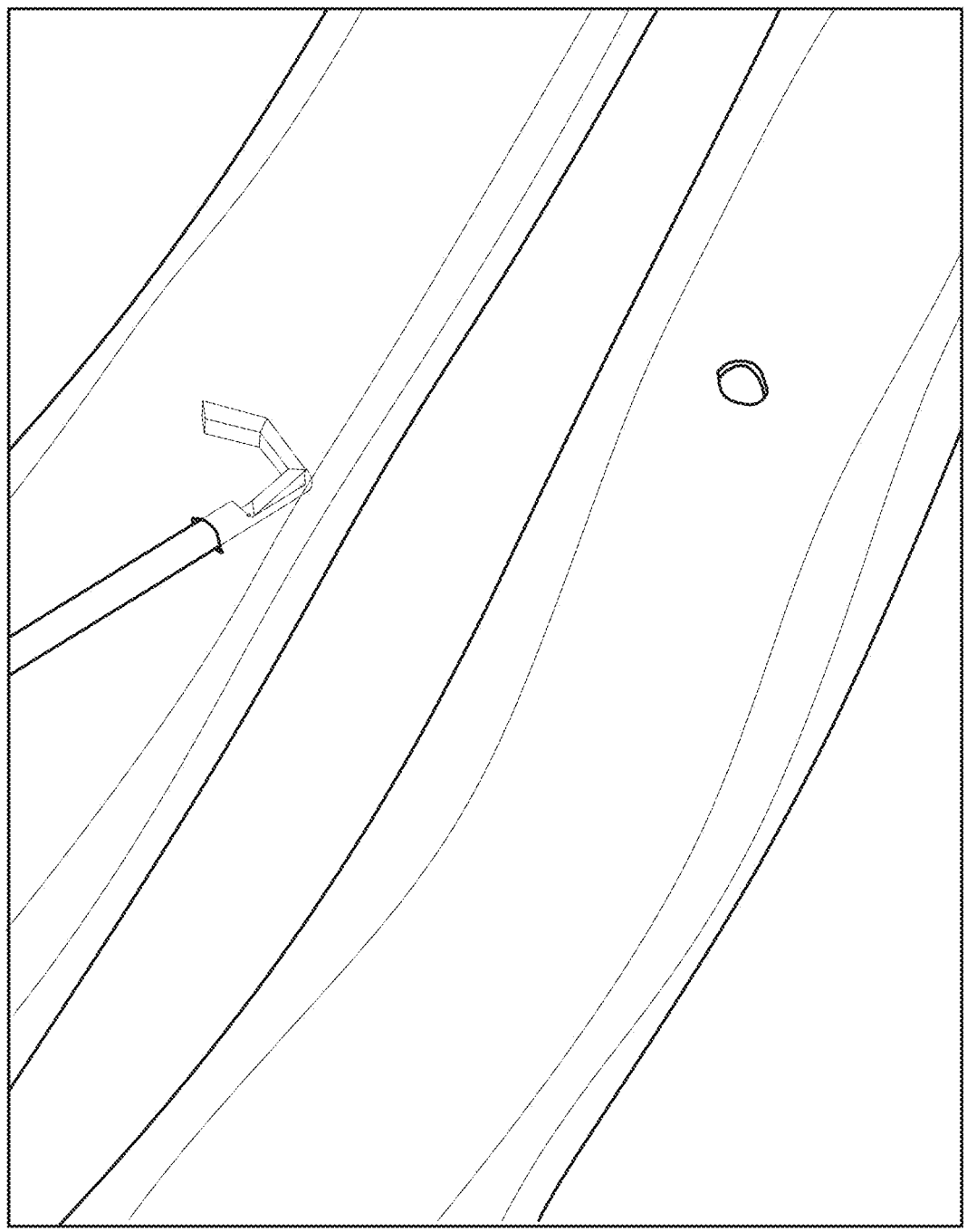
Figure 57C:
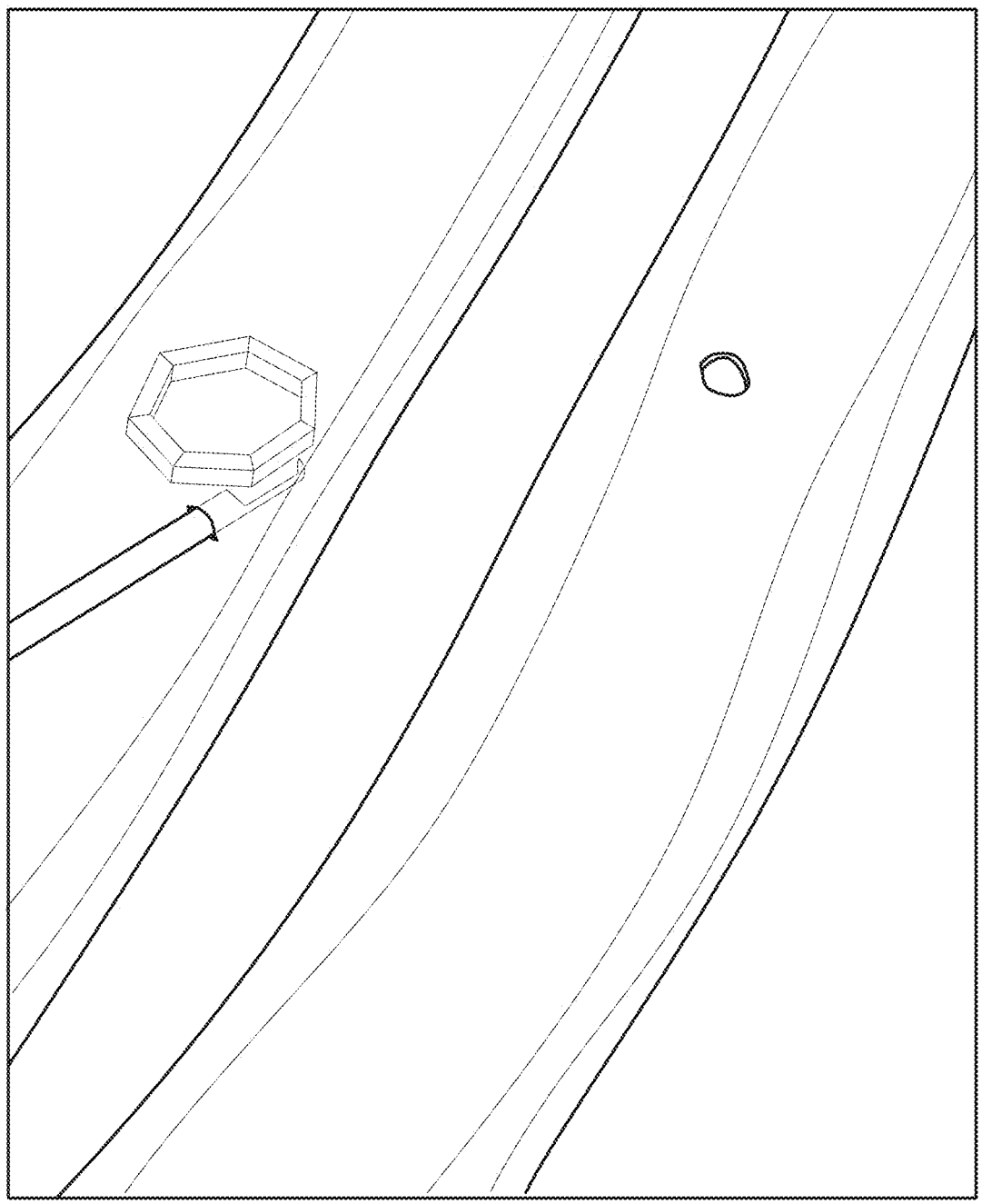
Figure 57D:
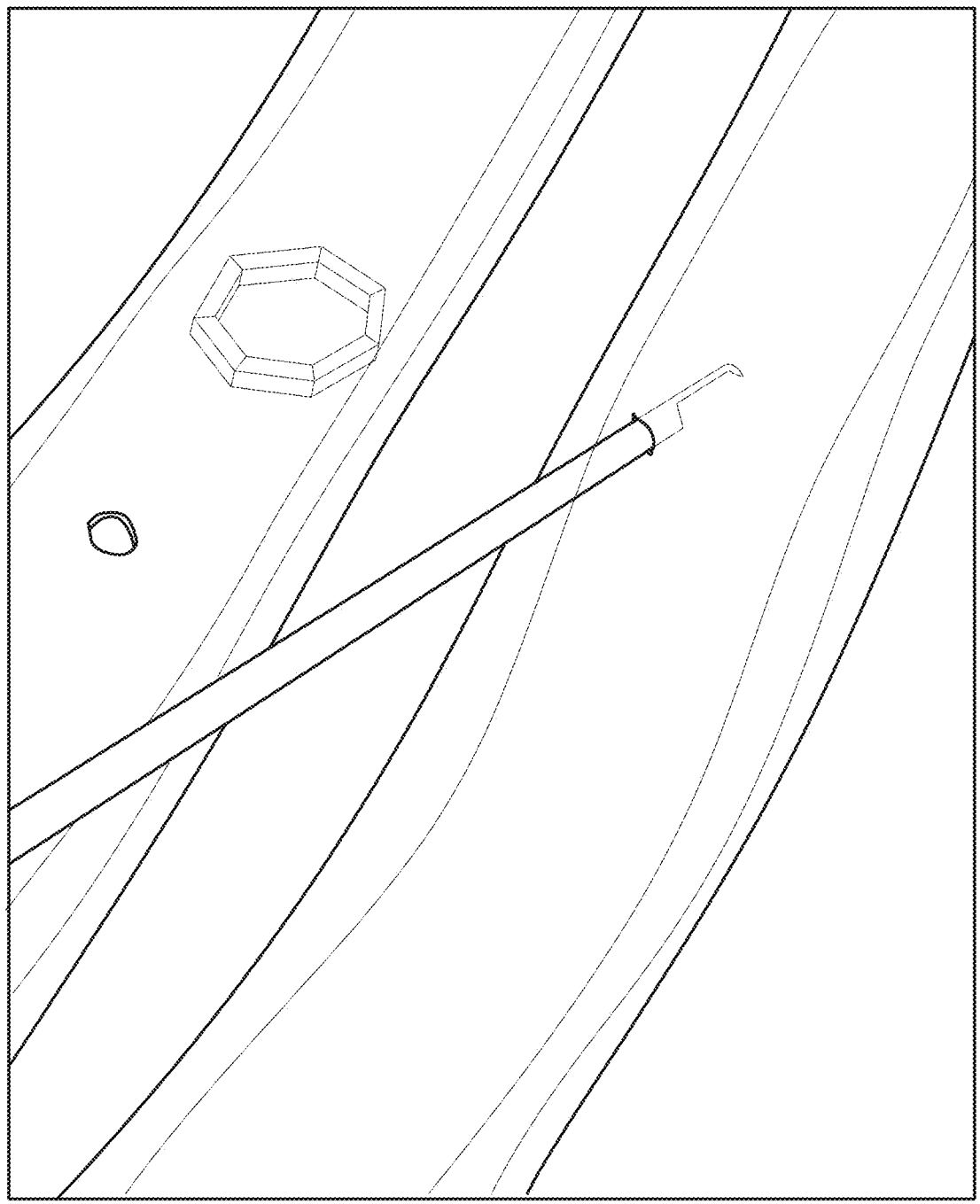
Figure 57E:
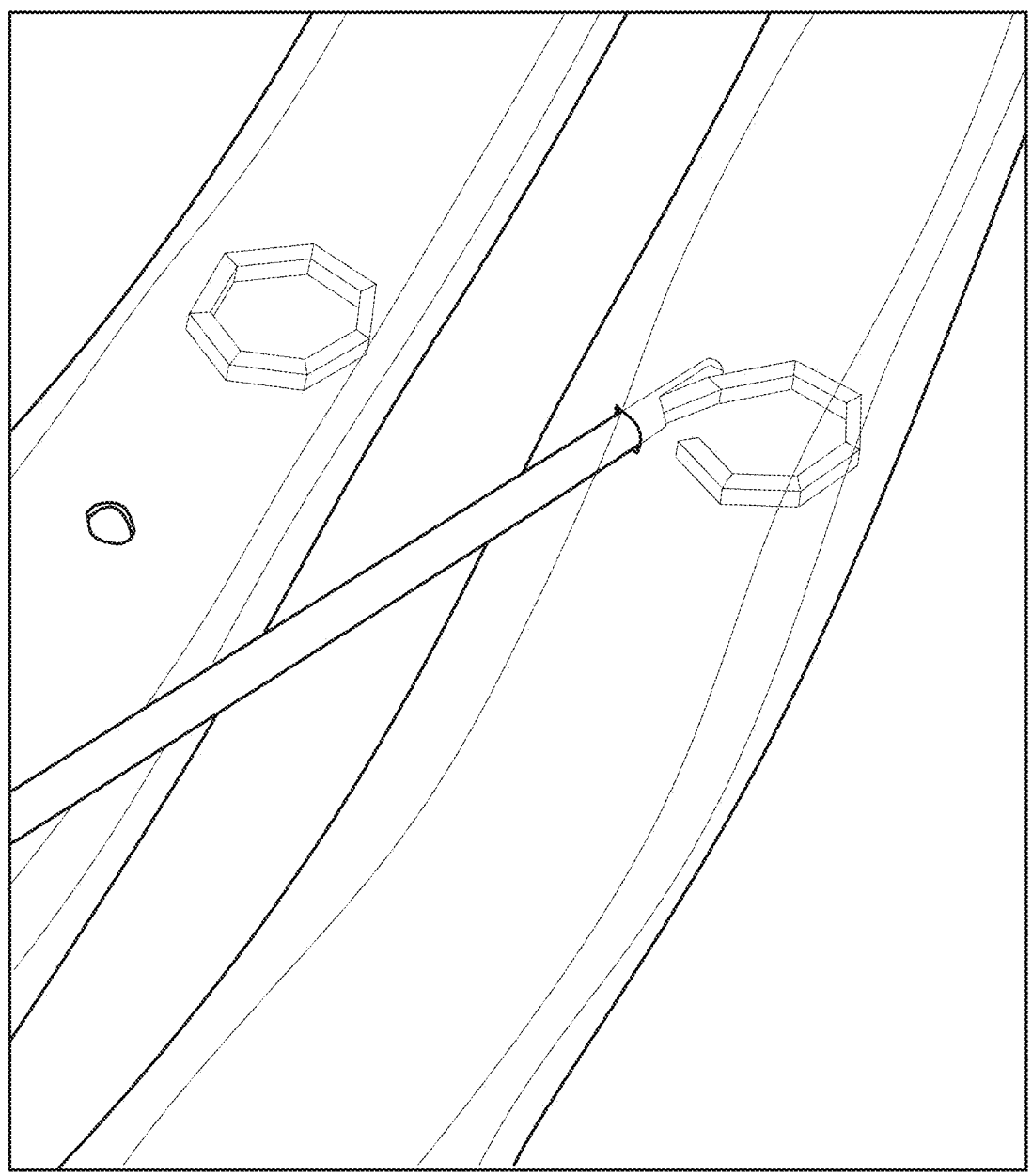
Figure 57F:
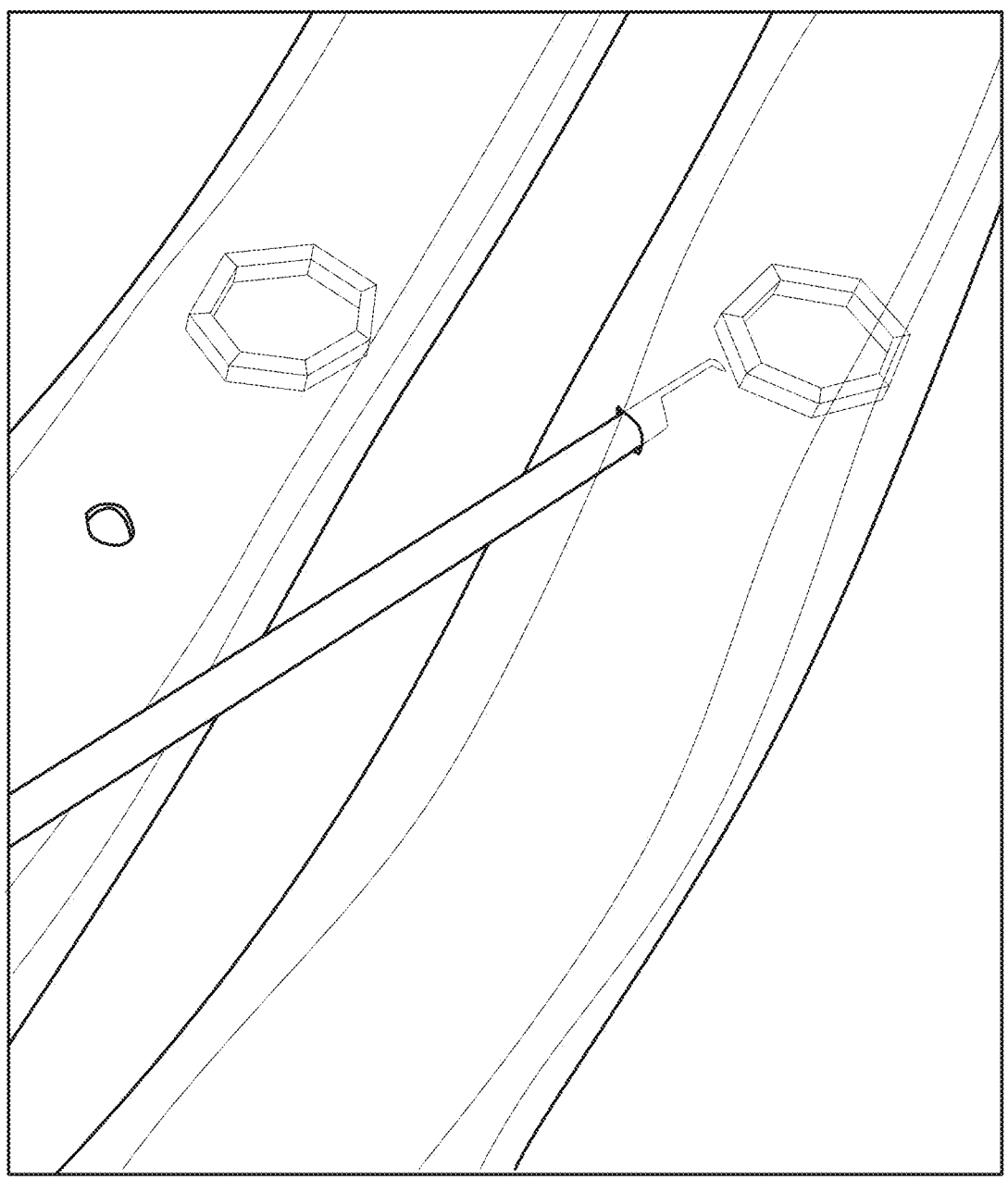
Figure 57G:
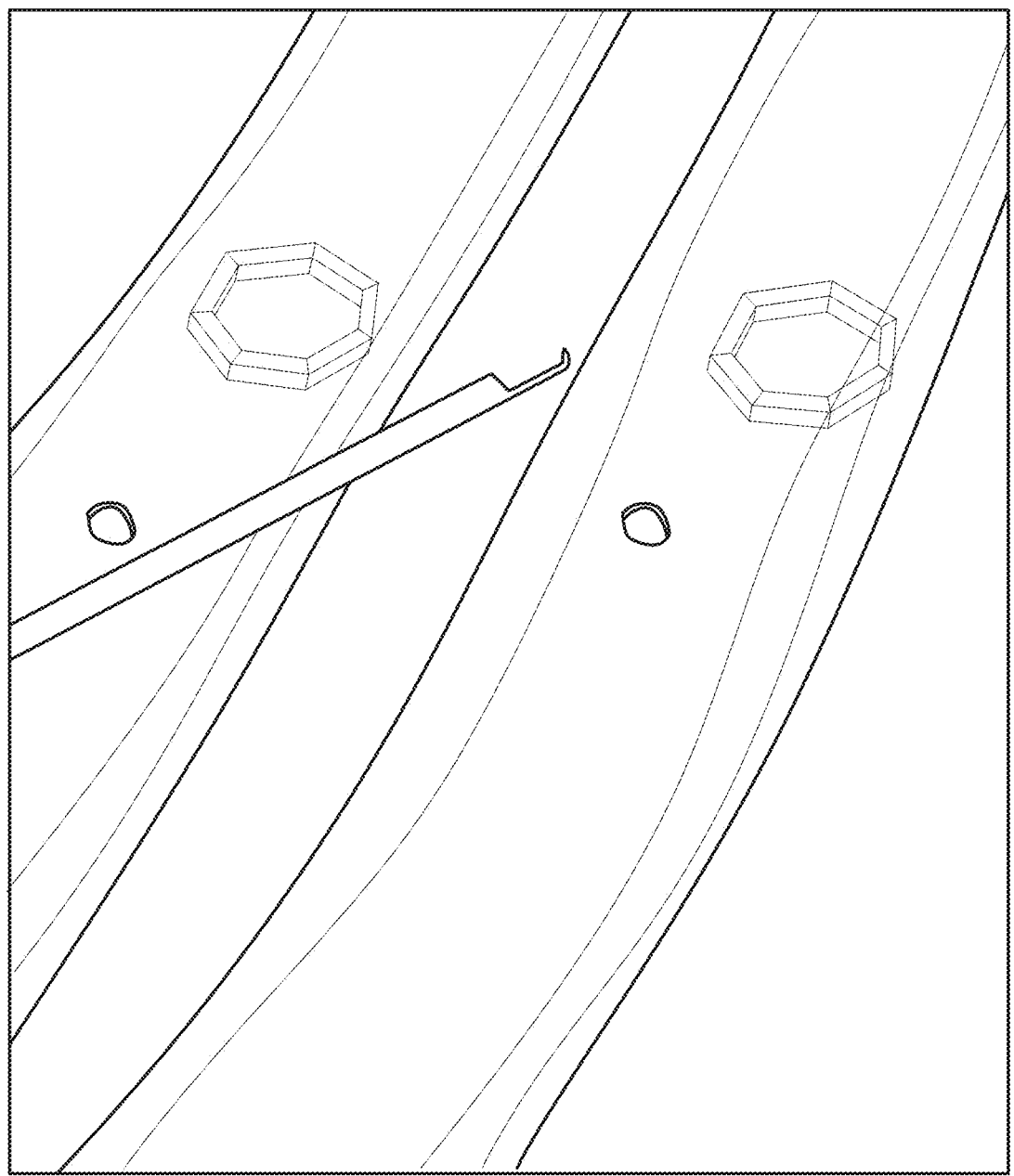
Figure 57H:
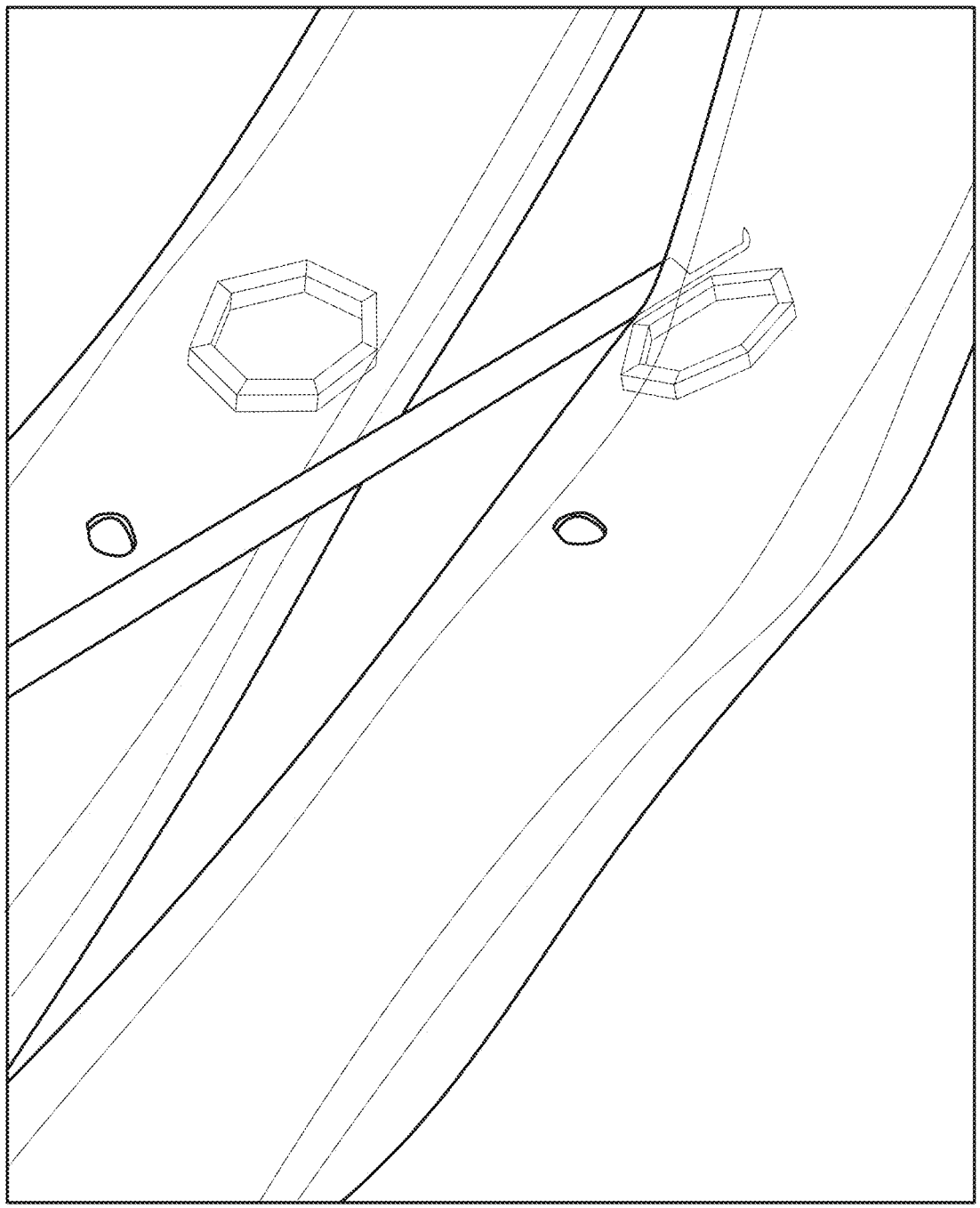
Figure 57I:
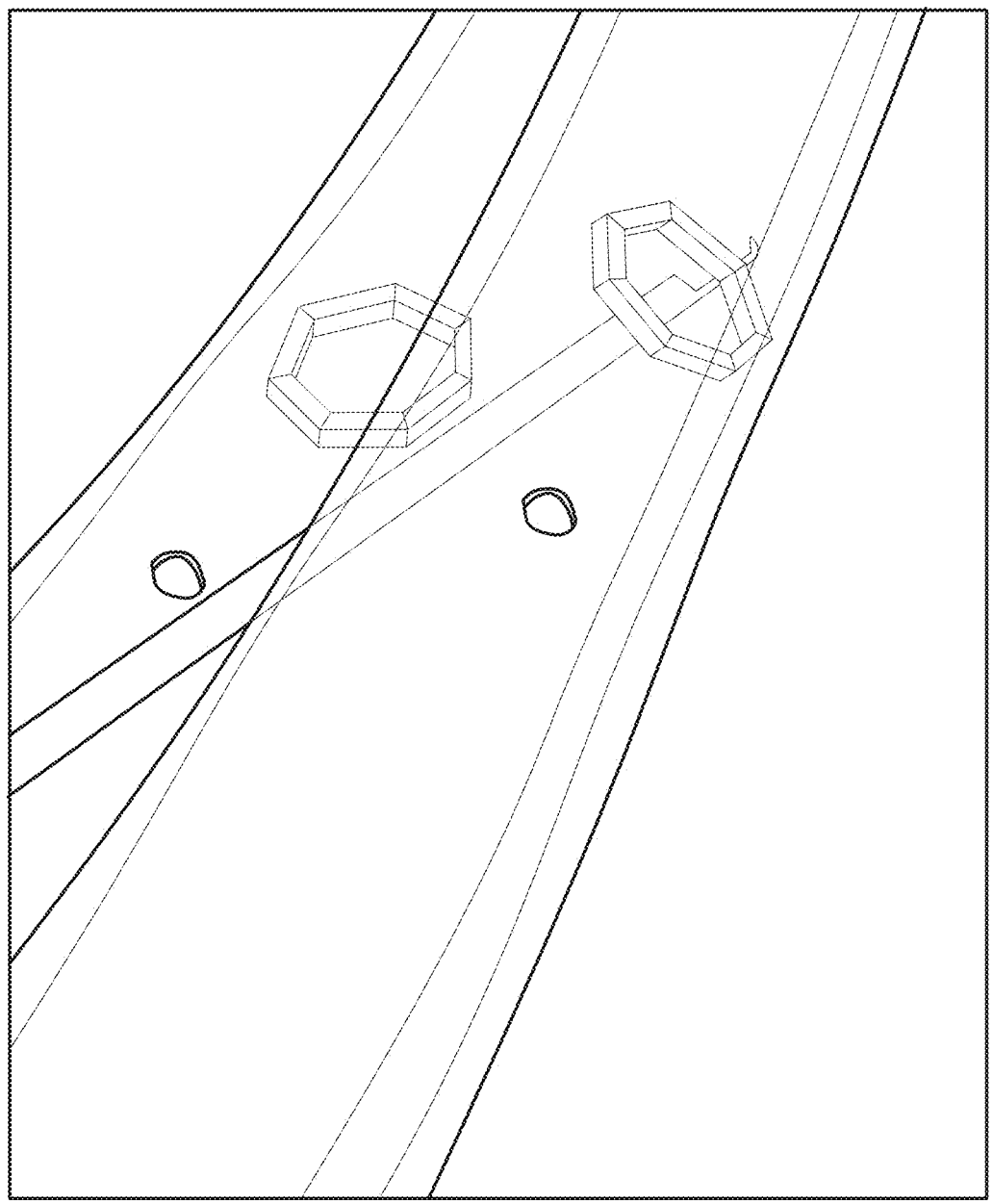
Figure 57J:
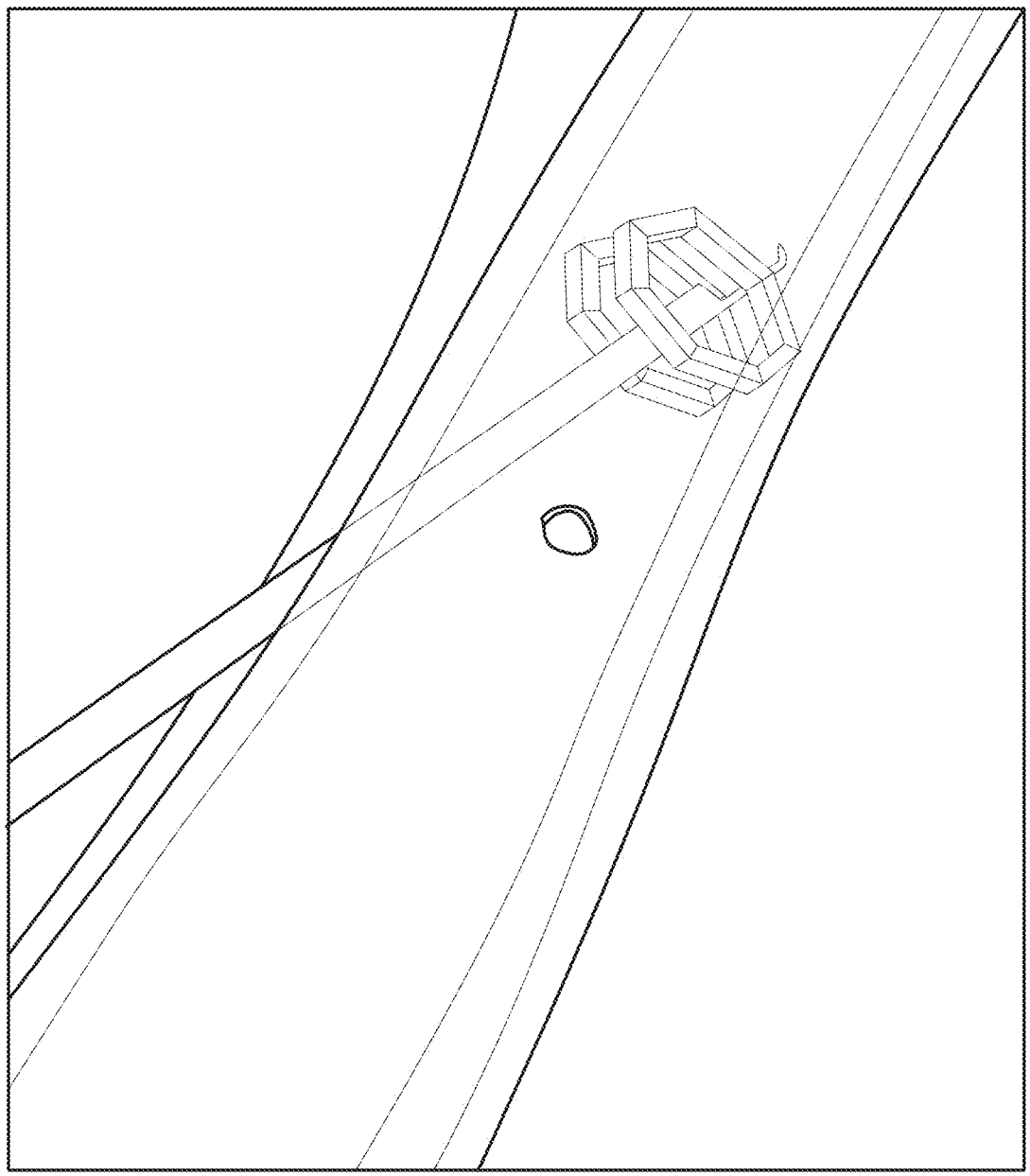

An exemplary use of such a manipulation tool is now described with reference to FIGS. 57A-57J. FIG. 57A is a photograph showing the distal end of a delivery device inserted into a first lumen. FIG. 57B is a photograph showing partial deployment of a first anastomosis magnet into the first lumen. FIG. 57C is a photograph showing the first anastomosis device fully deployed in the first lumen. FIG. 57D is a photograph showing the distal end of the delivery device inserted into a second lumen. Sutures connect the first anastomosis device connected to the delivery device and ultimately to the suture control handle. FIG. 57E is a photograph showing partial deployment of a second anastomosis magnet into the second lumen. FIG. 57F is a photograph showing the second anastomosis device fully deployed in the second lumen. FIG. 57G is a photograph showing remote manipulation of the second anastomosis magnet using the manipulation tool (e.g., in this example, the second anastomosis device has been moved relative to its location in FIG. 57F via the magnetic attraction between the second anastomosis device and the manipulation tool). Sutures connect the first and second anastomosis devices to the delivery device and ultimately to the suture control handle. FIG. 57H is a photograph showing capture of the second anastomosis device by the manipulation tool from outside of the second lumen, i.e., captured through the wall of the second lumen and being manipulable from outside of the second lumen. The manipulation tool engages with the second anastomosis device via magnets on the manipulation tool. FIG. 57I is a photograph showing movement of the second anastomosis device into proximity with the first anastomosis device using the manipulation tool. FIG. 57J is a photograph showing coupling of the first and second anastomosis devices using the manipulation tool to guide coupling. While not shown, the manipulation tool is disengaged from the magnetic anastomosis devices due to the attractive force of the magnets or ferrous elements on the manipulation tool being less than the attractive force between the magnetic anastomosis devices. The manipulation tool is then retracted into the delivery device for removal from the patient.

POTENTIAL CLAIMS: Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims. Without limitation, potential subject matter that may be claimed (prefaced with the letter "P" so as to avoid confusion with the actual claims presented below) includes:

P1. Laparoscopic delivery and control of capturing multiple holes within the digestive system in a compression anastomosis device.

P2. Laparoscopic or endoscopic delivery and ability to recapture compression anastomosis device during deployment.

P3. A key capability to assure control as self-assembling compression anastomosis device during deployment. Ability to integrate into implant design in linear position to allow the ability to deploy or retract device at any time. Design in drawing is one example of a "key" concept that fits into a linear compression anastomosis device prior to the self-assembling.

P4. Multiple magnetic compression anastomosis devices delivered via a single conduit.

P5. Ability to capture enterotomy.

P6. Ability to provide magnetic force in addition to magnetic energy.

P7. A surgical handle device with multiple self-forming compression members which delivered via a single conduit that effectively punctures through target tissue and delivers self-forming compression members.

P8. The surgical handle device may have various elements creating a control system connected to self-forming compression members to deploy, control, and release the self-forming compression members.

P9. The surgical handle device may contain an actuatable tensioning member to allow continued contact between the two or more self-forming compression members.

P10. A surgical handle device that creates alignment between two or more self-forming compression member.

P11. A method for delivering compression anastomosis devices, the method comprising:
piercing a delivery device through a proximal tissue wall into a proximal lumen creating an enterotomy,
piercing the delivery device through a distal tissue wall of the proximal lumen into a body cavity creating an exit incision,
piercing the delivery device through a tissue wall of a distal lumen, creating an entry incision and entering the distal lumen;
deploying into the distal lumen, through the delivery device, a distal compression anastomosis device;
retracting the delivery device from the distal lumen through the entry incision and through the exit incision into the proximal lumen;
deploying a proximal compression anastomosis device through the delivery device into the proximal lumen;
deploying a control member through the delivery device into the proximal lumen;
manipulating the proximal compression anastomosis device with the control member so as to push the proximal anastomosis device to a first target site against a tissue wall of the proximal lumen and align the proximal anastomosis device with the distal anastomosis device;
applying tensile force to an articulable tensioning member to bring the distal compression anastomosis device to a second target site against a tissue wall of the distal lumen, therefore bringing the anastomosis devices together to form an anastomosis;
cutting the articulable tensioning member and retracting the articulable tensioning member into the delivery device, releasing the compression anastomosis devices;
retracting the delivery device from the proximal lumen into the body cavity through the enterotomy for removal from a patient.

P12. The method described in claim P11, wherein the delivery device is a laparoscope.

P13. The method described in claim P11, wherein the delivery device is an endoscope.

P14. The method described in any one of claims P11-P13, wherein the distal compression anastomosis device is manipulated using a laparoscope.

P15. The method described in any one of claims P11-P14, wherein the proximal compression anastomosis device is deployed before the distal compression anastomosis device.

P16. A method for deploying and placing a compression anastomosis device, the method comprising:
piercing a delivery device through a tissue wall of a distal lumen and advancing into the distal lumen;
deploying a distal compression anastomosis device into the distal lumen from the distal end of the delivery device;
deploying a magnetail device from the distal end of the delivery device such that the magnetail is connected to the distal compression anastomosis device inside the distal lumen at a distal end of the magnetail, and the magnetail is outside the distal lumen in a body cavity at a proximal end of the magnetail;
retracting the distal end of the delivery device from the distal lumen into the body cavity;
piercing a proximal tissue wall of a proximal lumen with the distal end of the delivery device and advancing the delivery device into the proximal lumen;
deploying a proximal compression anastomosis device into the proximal lumen from the distal end of the delivery device;
piercing a distal tissue wall of the proximal lumen with the distal end of the delivery device, creating a distal enterotomy;
utilizing a laparoscope within the body cavity to manipulate the proximal end of the magnetail device,
manipulating the proximal end of the magnetail device through the distal enterotomy, and
attaching the proximal end of the magnetail device to the distal end of the delivery device;
retracting the delivery device so as to bring the distal magnetic anastomosis device into proximity with the proximal magnetic anastomosis device thereby forming an anastomosis therebetween.

P17. The method described in claim P16, wherein the magnetail device comprises one or more sutures.

P18. The method described in any one of claims P16-P17, wherein the magnetail device comprises a balloon control member.

P19. The method described in any one of claims P16-P17, wherein the magnetail device comprises a deployable/retractable umbrella control member.

P20. The method described in any one of claims P16-P17, wherein the magnetail device comprises a cap control member.

P21. The method described in any one of claims P16-P17, wherein the magnetail device comprises a basket control member.

P22. An apparatus for manipulating placement of a compression anastomosis device comprising:
a magnetail device having a distal end and a proximal end;
a compression anastomosis device at the distal end;
one or more sutures attached to the compression anastomosis device running to the proximal end;
one or more control members supporting the sutures at the distal end;
a shaft member connected to the one or more control members;

a pulley mechanism within the shaft member attached to the sutures;
a pulley translation member at the proximal end attached to the pulley mechanism having capabilities to extend or retract the sutures in order to manipulate the compression anastomosis device.

P23. The apparatus described in claim P22, wherein the control member comprises one or more sutures.

P24. The apparatus described in any one of claims P22-P23, wherein the control member is a balloon.

P25. The apparatus described in any one of claims P22-P23, wherein the control member is a deployable/retractable umbrella.

P26. The apparatus described in any one of claims P22-P23, wherein the control member is a cap.

P27. The apparatus described in any one of claims P22-P23, wherein the control member is a basket.

P28. An apparatus for manipulation of sutures and or guide elements within a patient, the apparatus comprising:
a handle having a proximal end and a distal end;
the distal end attached to a conduit including but not limited to an endoscope or laparoscope;
the handle having a conduit through the center along the axis from the distal end to the proximal end;
sutures and/or guidewires running through the conduit from the distal end to the proximal end;
one or more suture wheels attached to the handle, the suture wheels capable of manipulating the tension applied to the sutures;
a suture cutting button attached to the handle, the suture cutting button capable of severing the sutures;
a catch/release and/or locking mechanism attached to the handle, the locking mechanism capable of maintaining the applied tension to the sutures, holding them in place.

P29. An apparatus for placement and control of a compression anastomosis device, the apparatus comprising:
a wand member capable of being deployed from a distal end of a delivery device,
the wand member having a distal end and a proximal end,
the distal end of the wand member being key or hook shaped capable of engaging a compression anastomosis device;
the wand member having a conduit running from the distal end to the proximal end creating a hollow opening at both ends;
the wand member having a centering suture running from the distal end to the proximal end capable of controlling deployment of a compression anastomosis device;
the wand member having one or more magnets on the face of the wand member on the proximal side of the hook, arranged linearly along a proximal to distal axis of the wand member,
the magnets capable of engaging with a compression anastomosis device to manipulate placement of the device at a target site within a patient;
the magnets having a magnetic force less than a magnetic force of the compression anastomosis device so as to disengage with the compression anastomosis device;
the wand member capable of being retracted into the delivery device for removal from the patient.

INCORPORATION BY REFERENCE: References and citations to other documents, such as patents, patent applications, patent publications, journals, books, papers, web contents, have been made throughout this disclosure. All such documents are hereby incorporated herein by reference in their entirety for all purposes.

EQUIVALENTS: The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A system for delivering compression anastomosis devices, the system comprising:
a delivery device including a distal compression anastomosis device and a proximal compression anastomosis device separated by a separator segment within a single conduit of the delivery device, the delivery device further including an articulable tensioning member coupled to the distal compression anastomosis device and passing through the separator segment within the single conduit to center the articulable tensioning member for maintaining centering of the distal compression anastomosis device during deployment of the compression anastomosis devices.

2. The system of claim 1, wherein the delivery device is a laparoscope.

3. The system of claim 1, wherein the delivery device is an endoscope.

4. The system of claim 1, wherein the articulable tensioning member includes a suture.

5. The system of claim 1, wherein the articulable tensioning member includes a wire.

6. The system of claim 1, wherein the separator segment is magnetic.

7. The system of claim 1, wherein the separator segment is non-magnetic.

8. The system of claim 1, wherein the separator segment is configured to maintain alignment between the distal and proximal compression anastomosis devices within the conduit of the delivery device.

9. The system of claim 1, wherein the separator segment is configured to control and/or recapture at least one of the compression anastomosis devices during or after delivery.

10. The system of claim 1, wherein the delivery device includes a control to control the tensile force applied to the articulable tensioning member.

11. The system of claim 10, wherein the control is a wheel.

12. A method for delivering compression anastomosis devices, the method comprising:
providing a delivery device according to claim 1;
piercing the delivery device through a proximal tissue wall into a proximal lumen creating an enterotomy;
piercing the delivery device through a distal tissue wall of the proximal lumen into a body cavity creating an exit incision;
piercing the delivery device through a tissue wall of a distal lumen, creating an entry incision and entering the distal lumen;
deploying the distal compression anastomosis device into the distal lumen through the delivery device;

retracting the delivery device from the distal lumen through the entry incision and through the exit incision into the proximal lumen;

deploying the proximal compression anastomosis device into the proximal lumen through the delivery device;

applying tensile force to the articulable tensioning member passing through the separator segment to bring the distal compression anastomosis device to a target site against a tissue wall of the distal lumen for coupling with the proximal compression anastomosis device for forming an anastomosis;

cutting the articulable tensioning member and retracting the articulable tensioning member into the delivery device to release the distal compression anastomosis device; and retracting the delivery device from the proximal lumen into the body cavity through the enterotomy for removal from a patient.

13. The method of claim 12, wherein the delivery device is a laparoscope.

14. The method of claim 12, wherein the delivery device is an endoscope.

15. The method of claim 12, wherein the articulable tensioning member includes a suture.

16. The method of claim 12, wherein the articulable tensioning member includes a wire.

17. The method of claim 12, wherein the separator segment is magnetic.

18. The method of claim 12, wherein the separator segment is non-magnetic.

19. The method of claim 12, wherein the separator segment is configured to maintain alignment between the distal and proximal compression anastomosis devices within the conduit of the delivery device.

20. The method of claim 12, wherein the separator segment is configured to control and/or recapture at least one of the compression anastomosis devices during or after delivery.

21. The method of claim 12, wherein the delivery device includes a control to control the tensile force applied to the articulable tensioning member.

22. The method of claim 21, wherein the control is a wheel.

23. The method of claim 12, further comprising:
removing the separator segment from the patient.

24. The method of claim 12, further comprising:
deploying a control member through the delivery device into the proximal lumen; and
manipulating the proximal compression anastomosis device with the control member so as to push the proximal anastomosis device to a target site against a tissue wall of the proximal lumen for alignment of the proximal anastomosis device with the distal anastomosis device.

* * * * *